(12) United States Patent
Kondo et al.

(10) Patent No.: US 11,544,127 B2
(45) Date of Patent: Jan. 3, 2023

(54) SYSTEM MANAGEMENT METHOD, NON-TRANSITORY COMPUTER-READABLE STORAGE MEDIUM FOR STORING SYSTEM MANAGEMENT PROGRAM, AND SYSTEM MANAGEMENT DEVICE

(71) Applicant: FUJITSU LIMITED, Kawasaki (JP)

(72) Inventors: Reiko Kondo, Yamato (JP); Takeshi Yasuie, Kawasaki (JP); Masahiro Asaoka, Kawasaki (JP); Kazuhiro Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 176 days.

(21) Appl. No.: 16/935,933

(22) Filed: Jul. 22, 2020

(65) Prior Publication Data

US 2021/0034444 A1 Feb. 4, 2021

(30) Foreign Application Priority Data

Aug. 2, 2019 (JP) .............................. JP2019-142838

(51) Int. Cl.
*G06F 11/00* (2006.01)
*G06F 9/455* (2018.01)

(52) U.S. Cl.
CPC ........ *G06F 11/008* (2013.01); *G06F 9/45558* (2013.01); *G06F 11/004* (2013.01);
(Continued)

(58) Field of Classification Search
CPC .. G06F 11/008; G06F 11/004; G06F 11/3051; G06F 11/3058; G06F 9/45558;
(Continued)

(56) References Cited

U.S. PATENT DOCUMENTS

| 2009/0217101 A1* | 8/2009 | Becker ............... G05B 23/0283 714/39 |
| 2009/0292948 A1* | 11/2009 | Cinato ................... H04L 43/50 714/E11.029 |

(Continued)

FOREIGN PATENT DOCUMENTS

| JP | 2011-008780 A | 1/2011 |
| JP | 2017-506776 A | 3/2017 |

(Continued)

*Primary Examiner* — Sarai E Butler
(74) *Attorney, Agent, or Firm* — Fujitsu Patent center

(57) ABSTRACT

A method includes: acquiring, based on status information, a failure risk of each of a plurality of devices including physical devices and virtual machines, each of the virtual machines being operated on any of the physical devices, the status information indicating the statuses of the plurality of devices; acquiring an influence range based on route information indicating a link in a range affected by a failure; acquiring a first influence risk based on a failure risk acquired for a first device, the first physical device being any of the physical devices; acquiring a second influence risk based on a failure risk of a second device, the second influence risk indicating a possibility of a target device being affected by a failure in another device; and determining the second physical devices as a destination candidate of the target device when the second influence risk is lower than the first influence risk.

8 Claims, 50 Drawing Sheets

(52) U.S. Cl.
CPC ............. *G06F 2009/45591* (2013.01); *G06F 2009/45595* (2013.01)

(58) Field of Classification Search
CPC ................. G06F 9/5077; G06F 9/5088; G06F 2009/45591; G06F 2009/45595; G06F 2009/4557; G06F 2201/81; G06F 2201/815
USPC ........................................................ 714/1–57
See application file for complete search history.

(56) References Cited

U.S. PATENT DOCUMENTS

| | | | |
|---|---|---|---|
| 2010/0205474 A1* | 8/2010 | Stich ................... | G06F 11/1484 714/1 |
| 2010/0332889 A1 | 12/2010 | Shneorson et al. | |
| 2015/0358215 A1* | 12/2015 | Maeno .................. | G06F 11/008 709/223 |
| 2015/0370886 A1* | 12/2015 | Maeno .................. | G06F 16/285 707/737 |
| 2016/0359683 A1 | 12/2016 | Bartfai-Walcott et al. | |
| 2017/0212815 A1* | 7/2017 | Yushina ................ | G06F 11/203 |
| 2018/0351840 A1 | 12/2018 | Kondo et al. | |

FOREIGN PATENT DOCUMENTS

| | | |
|---|---|---|
| JP | 2017-106651 A | 6/2017 |
| JP | 2018-205811 A | 12/2018 |

\* cited by examiner

FIG. 12

```
                                    ┌─ 111
┌──────────────────────────────────┐
│ SYSTEM CONFIGURATION MODEL       │
│                                  │
│ DEVICE        FUNCTION           │
│ VM1           vm                 │
│ Storage1      datastore          │
│ VM2           vm           ⎫
│ VM5           vm           ⎬ DEVICE INFORMATION
│ VM6           vm           ⎭
│ Volume1       datastore          │
│ SV1           SV                 │
│   :             :                │
│                                  │
│ DEVICE NAME   DEVICE NAME  ⎫
│ VM1           Volume2      ⎬ COUPLING INFORMATION
│ Volume1       VM2          ⎭
│   :             :                │
└──────────────────────────────────┘
```

FIG. 14

| ASSUMED FAILURE DEVICE | FAILURE RISK | DEVICE WITHIN INFLUENCE RANGE |
|---|---|---|
| VM1 | 0.01 | VM11, VM4, VM6, VM7, VM8, VM3, VM9, Volume2, Volume3, Volume5, Storage1, SV1 |
| SV1 | 0.13 | VM1, VM11 |
| Volume2 | 0.05 | VM1, VM4, VM6, VM7, VM8, VM3, VM9, Storage1, Volume3, Volume5 |
| Storage1 | 0.02 | VM1, VM4, VM6, VM7, VM8, VM3, VM9, Volume2, Volume3, Volume5 |
| Switch2 | 0.10 | VM1, VM4, VM6, VM7, VM8, VM3, VM9, Storage1, Volume2, Volume3, Volume5 |
| ⋮ | ⋮ | ⋮ |

FIG. 15

| ANALYSIS TARGET DEVICE | INFLUENCE RISK | CONSTRUCTED PHYSICAL SERVER | COUPLED STORAGE | ASSUMED FAILURE DEVICE |
|---|---|---|---|---|
| VM1 | 0.45 | SV2 | Storage1 | SV1, Volume2, Storage1, Switch2, ... |
| ⋮ | ⋮ | ⋮ | ⋮ | ⋮ |

| ASSUMED FAILURE DEVICE | SEARCH DEVICE TYPE | INFLUENCE RANGE SEARCH ROUTE |
|---|---|---|
| VM | STORAGE-RELATED DEVICE | VM→Volume→Storage→Volume→VM |
| VM | SERVER-RELATED DEVICE | VM→SV→VM |
| Volume | STORAGE-RELATED DEVICE | Volume→Storage→Volume→VM |
| storage | STORAGE-RELATED DEVICE | Storage→Volume→VM |
| SV | SERVER-RELATED DEVICE | SV→VM |
| Switch | STORAGE-RELATED DEVICE | Switch→Storage→Volume→VM |
| Switch | SERVER-RELATED DEVICE | Switch→SV→VM |

114

FIG. 21
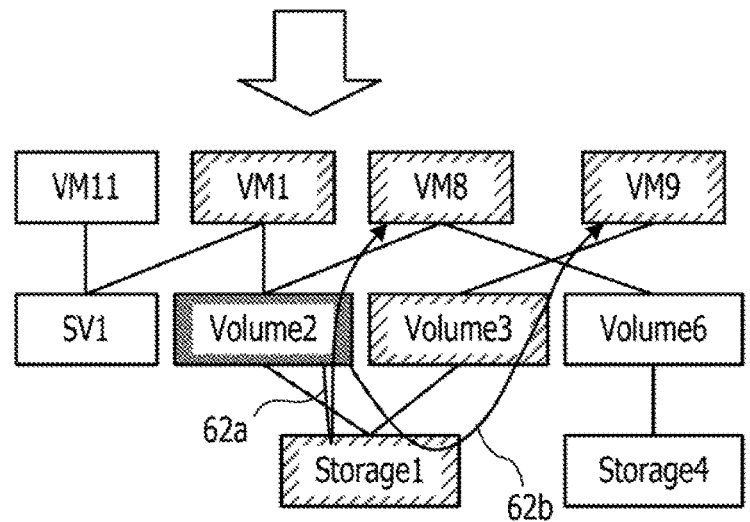
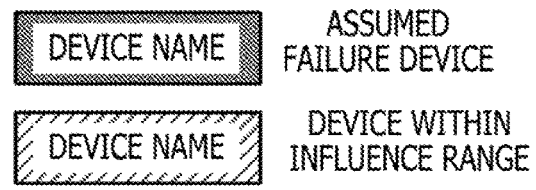

FIG. 35

| ANALYSIS TARGET DEVICE | INFLUENCE RISK | CONSTRUCTED PHYSICAL SERVER | COUPLED STORAGE | ASSUMED FAILURE DEVICE |
|---|---|---|---|---|
| VM1 | 0.45 | SV2 | Storage1 | SV1, Volume2, Storage1, Switch2, ⋯ |

113

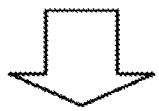

| DESTINATION CANDIDATE PHYSICAL SERVER | POST-MOVEMENT INFLUENCE RISK | NUMBER OF INTER-ROUTE NODES | INTER-ROUTE NODE FAILURE RISK TOTAL VALUE |
|---|---|---|---|
| SV11 | 0.12 | 6 | 0.015 |
| SV12 | 0.22 | 7 | 0.011 |
| SV18 | 0.18 | 8 | 0.012 |
| SV21 | 0.20 | 6 | 0.021 |

73

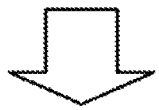

FIRST, SMALL NUMBER OF INTER-ROUTE NODES
SECOND, SMALL INTER-ROUTE NODE FAILURE RISK TOTAL VALUE
THIRD, SMALL POST-MOVEMENT INFLUENCE RISK OF ANALYSIS TARGET DEVICE
SELECT DESTINATION CANDIDATE PHYSICAL SERVER

RECOMMENDED DESTINATION PHYSICAL SERVER:SV11

FIG. 39

| ANALYSIS TARGET DEVICE | INFLUENCE RISK | CONSTRUCTED PHYSICAL SERVER | COUPLED STORAGE | ASSUMED FAILURE DEVICE |
|---|---|---|---|---|
| VM1 | 0.45 | SV2 | Storage1 | SV1, Volume2, Storage1, Switch2, ⋯ |

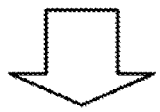

| DESTINATION CANDIDATE STORAGE | POST-MOVEMENT INFLUENCE RISK | NUMBER OF INTER-ROUTE NODES | INTER-ROUTE NODE FAILURE RISK TOTAL VALUE |
|---|---|---|---|
| Storage11 | 0.12 | 6 | 0.015 |
| Storage12 | 0.22 | 7 | 0.011 |
| Storage18 | 0.18 | 8 | 0.012 |
| Storage21 | 0.20 | 6 | 0.021 |

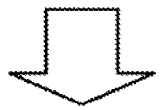

FIRST, SMALL NUMBER OF INTER-ROUTE NODES
SECOND, SMALL INTER-ROUTE NODE FAILURE RISK TOTAL VALUE
THIRD, SMALL POST-MOVEMENT INFLUENCE RISK OF ANALYSIS TARGET DEVICE
SELECT DESTINATION CANDIDATE STORAGE

RECOMMENDED DESTINATION STORAGE: Storage11

SYSTEM MANAGEMENT METHOD, NON-TRANSITORY COMPUTER-READABLE STORAGE MEDIUM FOR STORING SYSTEM MANAGEMENT PROGRAM, AND SYSTEM MANAGEMENT DEVICE

CROSS-REFERENCE TO RELATED APPLICATION

This application is based upon and claims the benefit of priority of the prior Japanese Patent Application No. 2019-142838, filed on Aug. 2, 2019, the entire contents of which are incorporated herein by reference.

FIELD

The embodiments disclosed herein are related to a system management method, a non-transitory computer-readable storage medium for storing a system management program, and a system management device.

BACKGROUND

A computer system in a data center or a cloud computing system has many devices mixed therein and has a complicated system configuration. The devices mentioned here include virtual devices. In a large-scale system, failures occur due to various causes such as physical device failure and resource shortage. In a system having a complicated configuration, when a failure occurs in one device, the influence of the failure affects peripheral related devices, which in turn may lead to chain reaction failures of the peripheral devices. When a failure occurs in some devices, the influence of the failure may be stopped from spreading by moving a virtual machine (VM) that is affected by the failure due to fail-over or the like, for example, to another physical machine.

As a technique for determining a possibility of being affected by a failure, for example, an influence range specification program has been proposed to enable determination of a difference in the possibility of being affected by the failure.

Examples of the related art include Japanese Laid-open Patent Publication No. 2018-205811.

SUMMARY

According to an aspect of the embodiments, a system management method implemented by a computer, includes: acquiring, based on operation status information, a failure risk for each of a plurality of devices coupled to a network, the plurality of devices including a plurality of physical devices and a plurality of virtual machines, each of the plurality of virtual machines being operated on any of the plurality of physical devices, the operation status information indicating the operation statuses of the plurality of devices, the failure risk indicating a possibility of failure; acquiring an influence range for each of the plurality of devices by using search route information associated with the each of the plurality of devices, the search route information indicating a link in a range to be affected by the failure, the influence range corresponding to a range based on the link indicated by search route information; acquiring a first influence risk based on the failure risk acquired for a first device among the plurality of devices, the first device being a device associated with an analysis target device in the influence range among the plurality of devices, the analysis target device being a virtual device operated on a first physical device, the first influence risk indicating a possibility of the analysis target device being affected by a failure in another device, the first physical device being any of the plurality of physical devices; acquiring a second influence risk for a second physical device among the plurality of devices by using the failure risk acquired for a second device, the second physical device being a device other than the first physical device among the plurality of physical devices, the second device being a device to be associated with the analysis target device in the influence range when the analysis target device is moved from the first physical device to the second physical device, the second influence risk indicating a possibility of the analysis target device being affected by a failure in another device after being moved; and determining the second physical devices as a destination candidate of the analysis target when the second influence risk is lower than the first influence risk.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 illustrates an example of a system configuration model;

FIG. 14 illustrates an example of a failure risk table;

FIG. 15 illustrates an example of an influence risk table;

FIG. 16 illustrates an example of influence range search route information;

FIG. 21 illustrates a second example of influence range search;

FIG. 35 illustrates an example of selecting a recommended destination physical server;

FIG. 39 illustrates an example of selecting a recommended destination storage;

DESCRIPTION OF EMBODIMENT(S)

Even if a fail-over such as moving a VM is performed after a failure has actually occurred, the fail-over may fail due to the influence of the failure that has occurred. Therefore, when a failure occurs in any of the devices, the device that is at high risk (with high probability) of being affected by the failure is moved to a physical server that is at low risk of being affected by the failure before the actual occurrence of the failure, thereby making it possible to suppress function of the device from crashing.

There has heretofore been no technology for correctly calculating the risk of each device being affected by a failure (failure yet to occur) that may occur in any of a plurality of other devices. For example, it is not possible to properly determine a device that is at high risk of being affected by a failure before the failure occurs. Therefore, it is difficult to reduce the risk of being affected by a failure in another device by moving a device at high risk of being affected by the failure to a physical server at low risk of being affected by the failure before the occurrence of the failure.

According to an aspect of the embodiments, provided are a solution to reduce the risk of being affected by a failure in another device.

Hereinafter, embodiments are described with reference to the drawings. Each of the embodiments may be implemented by combining multiple embodiments with each other without any contradiction.

First Embodiment

First, a first embodiment is described. The first embodiment is a system management method for managing a computer system so that a virtual device such as a VM is realized by a physical device with a low risk (influence risk) of being affected by a failure in another physical device or virtual device.

Figure 1:
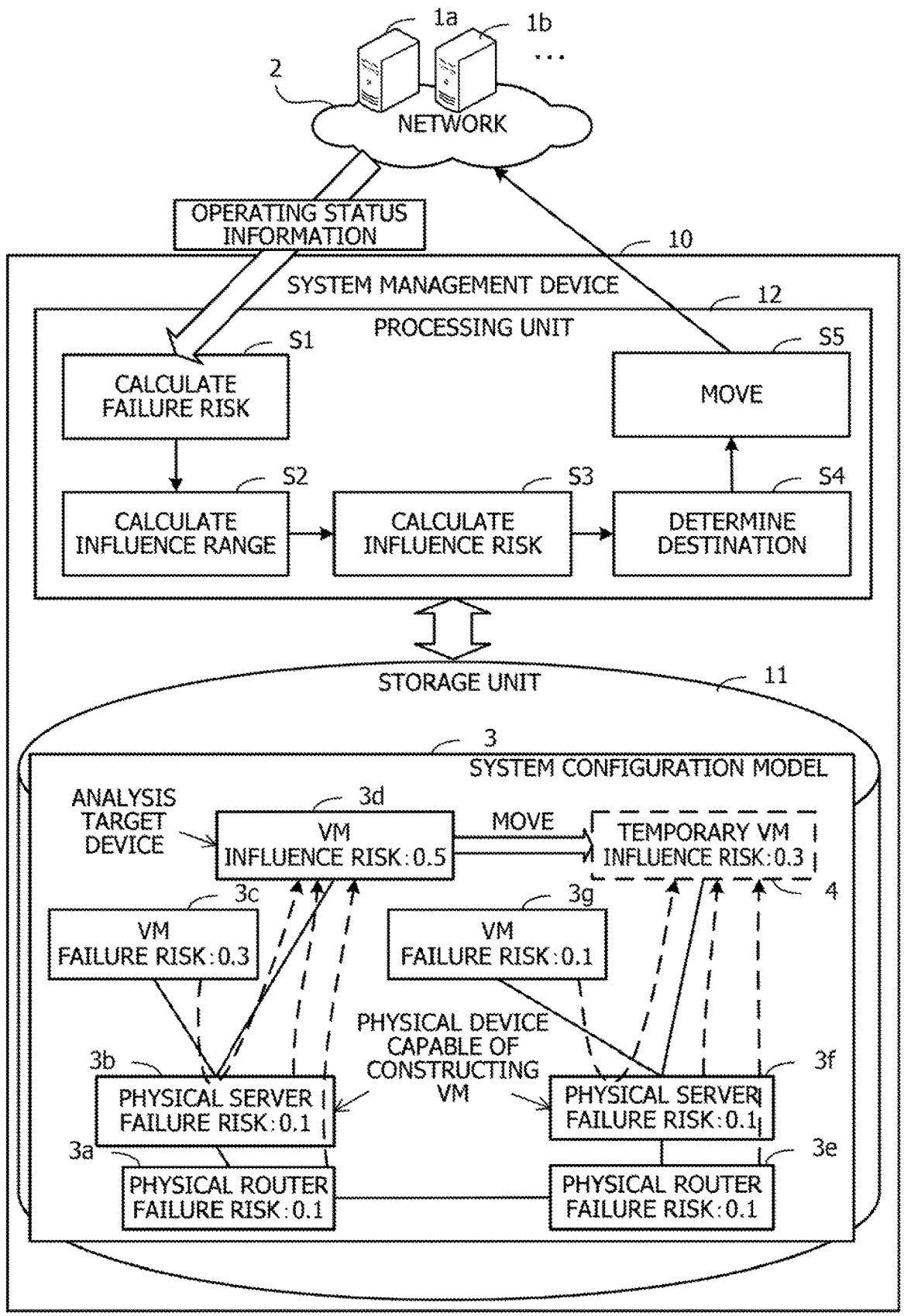
FIG. 1 illustrates an example of a system management method according to a first embodiment.

FIG. 1 illustrates an example of a system management method according to the first embodiment. FIG. 1 illustrates an example where a system management device 10 is used to implement the system management method. For example, the system management device 10 may implement the system management method by executing a system management program describing a processing procedure of the system management method.

The system management device 10 includes a storage unit 11 and a processing unit 12 to realize the system management method. The storage unit 11 is, for example, a memory included in the system management device 10 or a storage device. The processing unit 12 is, for example, a processor included in the system management device 10 or an arithmetic circuitry. In the following description, the storage device may be simply referred to as "storage".

The system management device 10 is coupled to a network 2. A plurality of physical devices 1a, 1b, . . . are coupled to the network 2. The plurality of physical devices 1a, 1b, . . . construct assigned virtual devices. The virtual devices constructed in the plurality of physical devices 1a, 1b, . . . include VMs and volumes. For example, when the physical device is a physical server, a VM is constructed in the physical device, and when the physical device is a storage, a volume is constructed in the physical device.

The storage unit 11 stores, for example, a system configuration model 3. The system configuration model 3 represents a coupling relationship between a plurality of devices included in the system. The plurality of devices include the plurality of physical devices 1a, 1b, . . . coupled to the network 2 and the virtual devices constructed in the plurality of physical devices 1a, 1b, . . . . The example of FIG. 1 illustrates that the network 2 includes physical routers 3a and 3e and physical servers 3b and 3f as the physical devices 1a, 1b, . . . and that VMs 3c, 3d, and 3g exist as the virtual devices constructed in the physical devices 1a, 1b, . . . .

The processing unit 12 refers to the system configuration model 3 to determine the physical device to be the destination for moving the virtual device so that the risk of a device to be subjected to risk analysis (analysis target device) being affected by a failure in another device may be reduced. The processing unit 12 sets a device designated by a system administrator, for example, as the analysis target device. The processing unit 12 may also move a virtual device among the devices to the determined physical device. For example, the processing unit 12 executes the following processing.

The processing unit 12 first calculates a failure risk indicating a possibility of failure for each of the plurality of physical devices 1a, 1b, . . . (Step S1). For example, the processing unit 12 acquires operation status information indicating operation statuses of the plurality of physical devices 1a, 1b, . . . and the virtual devices constructed in the plurality of physical devices 1a, 1b, . . . from the plurality of physical devices a, 1b, . . . coupled to the network 2, respectively. The operation status information includes, for example, information indicating time series changes in central processing unit (CPU) utilization, memory utilization, disk utilization, and the like. Next, the processing unit 12 calculates a failure risk indicating the possibility of failure for each of the plurality of physical devices and virtual devices based on the operation status information. For example, the processing unit 12 may set the ratio of the time during which the CPU utilization is equal to or higher than a predetermined value to the operating time as the failure risk.

Next, the processing unit 12 calculates, for each of the plurality of physical devices and the virtual devices constructed in the plurality of physical devices, the influence range of the device (assumed failure device) when a failure occurs in the device (step S2). For example, the processing unit 12 determines a physical device or a virtual device in the influence range based on the search route information indicating the search route within the failure influence range for each device type. The search route information indicates searching for a virtual device that is, if the search starting point is a physical device, for example, constructed in the physical device. The virtual device found by the search is a device within influence range of the physical device at the search starting point. The search route information indicates searching for a physical device that, if the search starting point is a virtual device such as a VM or a volume, for example, constructs the virtual device, and for another virtual device constructed in the physical device. The device found by the search is a device within the influence range of the virtual device of the search starting point.

Next, the processing unit 12 calculates an influence risk (first influence risk) indicating a possibility of the analysis target device being affected by the failure of another device, based on the failure risk of the device including the analysis target device, which is a virtual device constructed in the first physical device, within the influence range of the failure (step S3). For example, the processing unit 12 sets the sum of failure risks of the devices including the analysis target device in the failure influence range as the influence risk of the analysis target device. For example, when the failure risk of the physical router 3a is "0.1", the failure risk of the physical server 3b is "0.1", and when the failure risk of the VM 3c is "0.3", the influence risk of the VM 3d is "0.5".

The processing unit 12 calculates an influence risk (second influence risk) indicating a possibility of the analysis target device being affected by a failure of another device after being moved to the second physical device, for each second physical device other than the first physical device. For example, the processing unit 12 specifies a device to include the analysis target device in the failure influence range when the analysis target device is moved from the first physical device to the second physical device. The processing unit 12 calculates the second influence risk indicating the possibility of the analysis target device being affected by the failure of another device after the movement, based on the failure risk of the specified device. For example, it is assumed that the processing unit 12 constructs a temporary VM 4 corresponding to the analysis target device 3d by using a physical device (physical server 3f) capable of constructing the VM. The processing unit 12 sets the sum of failure risks of the devices including the temporary VM 4 within the failure influence range as the influence risk of the temporary VM 4. When the failure risk of the physical router 3e is "0.1", the failure risk of the physical server 3f is "0.1", and when the failure risk of the VM 3g is "0.1", the influence risk of the temporary VM 4 is "0.3". The influence risk of the temporary VM 4 is the influence risk after the movement when the analysis target device 3d is moved from the physical server 3b to the physical server 3f.

The processing unit 12 determines one of the second physical devices having the second influence risk being set to a value lower than the first influence risk as the destination of the analysis target device (step S4). For example, the processing unit 12 determines the second physical device having the smallest influence risk of the analysis target device as the destination of the analysis target device. The processing unit 12 may also determine any one of the second physical devices having the influence risk not more than a predetermined threshold as the destination of the analysis target device. In the example of FIG. 1, the temporary VM 4 has a smaller influence risk than the VM 3d. In this case, the processing unit 12 determines the physical server 3f as the destination of the analysis target device (VM3d).

The processing unit 12 moves the analysis target device to the determined second physical device (step S5). For example, when the VM 3d constructed in the physical server 3b is the analysis target device, the processing unit 12 moves the VM 3d to the physical server 3f. For example, the processing unit 12 instructs the physical server 3b via the network 2 to migrate the VM 3d to the physical server 3f. The processing unit 12 also instructs the physical server 3f to construct the migrated VM 3d.

Thus, the influence risk of the analysis target device being affected by the failure of another device may be reduced. For example, the system management device 10 may determine the physical device to construct the virtual device, in consideration of not only the failure risk of the physical device having the virtual device constructed therein but also the failure risk of another virtual device in the physical device or another physical device coupled to the physical device. As a result, the possibility that the virtual device may be stably operated is improved as compared with the case where the physical device to construct the virtual device is determined considering only the failure risk of the physical device to construct the virtual device, for example.

The processing unit 12 determines, as the destination, the second physical device having the smallest number of other physical devices over a route of the network 2 with the physical device having the analysis target device constructed therein among the physical devices with the influence risk of the temporary device not more than the threshold. Thus, the processing load of the system when moving the virtual device (for example, the communication load of the network) may be reduced.

The processing unit 12 may determine, as the destination, the second physical device having the smallest sum of failure risks of other physical devices over the route of the network 2 with the physical device having the analysis target device constructed therein among the physical devices with the influence risk of the temporary device not more than the threshold. Accordingly, the possibility of being affected by a failure when moving the virtual device may be reduced, thus ensuring reliable movement of the virtual device.

The processing unit 12 may also regularly determine whether or not it is possible to reduce the influence risk for each of the existing virtual devices constructed in any of the plurality of physical devices, and automatically move the virtual device capable of reducing the influence risk to a physical device that reduces the influence risk. In that case, the processing unit 12 determines, for each virtual device constructed in one of the plurality of physical devices, an assumed failure device that affects the existing virtual device, based on the search route information. Next, the processing unit 12 calculates, for each existing virtual device, an influence risk indicating the possibility of the virtual device being affected by the failure of the assumed failure device, based on the failure risk of the assumed failure device. The processing unit 12 determines the destination of the virtual device having the influence risk exceeding the pre-movement influence risk threshold, and moves the virtual device to another physical device. As a result, the entire system may be kept in a low-risk state and the stability of the system is improved.

Second Embodiment

Next, a second embodiment is described. In the second embodiment, a user specifies a particularly important device such as a VM (for example, a device having a large social responsibility such as a bank), thus making it possible to reduce the risk of the device being affected by the failure due to peripheral devices.

Figure 2:
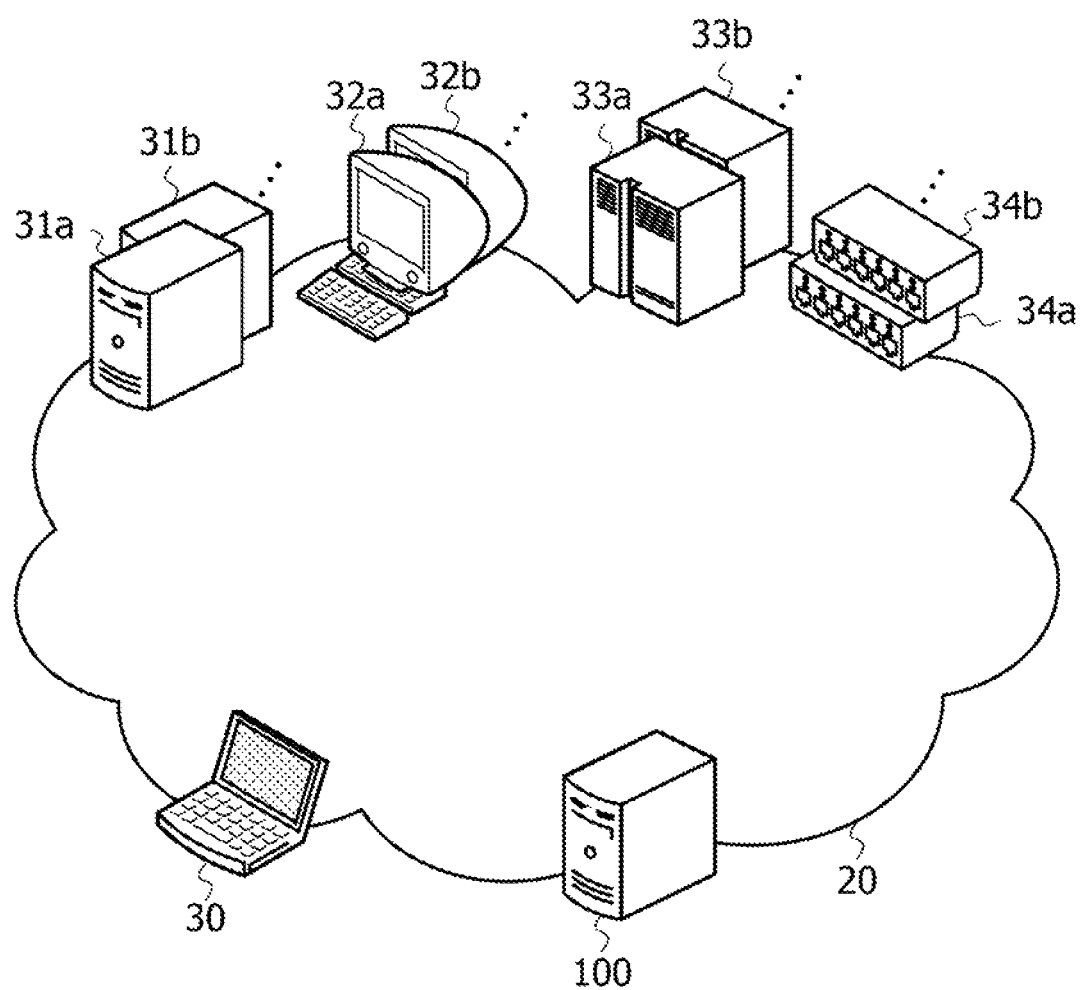
FIG. 2 illustrates an example of a system configuration according to a second embodiment.

FIG. 2 illustrates an example of a system configuration according to the second embodiment. A network 20 includes, as devices to be monitored, servers 31a, 31b, . . . , terminal devices 32a, 32b, . . . , storage devices 33a, 33b, . . . , network devices 34a, 34b, . . . , and the like, for example. A managing server 100 and a management terminal device 30 are further coupled to the network 20. The managing server 100 acquires information from the monitored device, detects a device at high risk of being affected by a failure, and moves the device to a physical server at low risk. The management terminal device 30 is a computer used by a system administrator.

Figure 3:
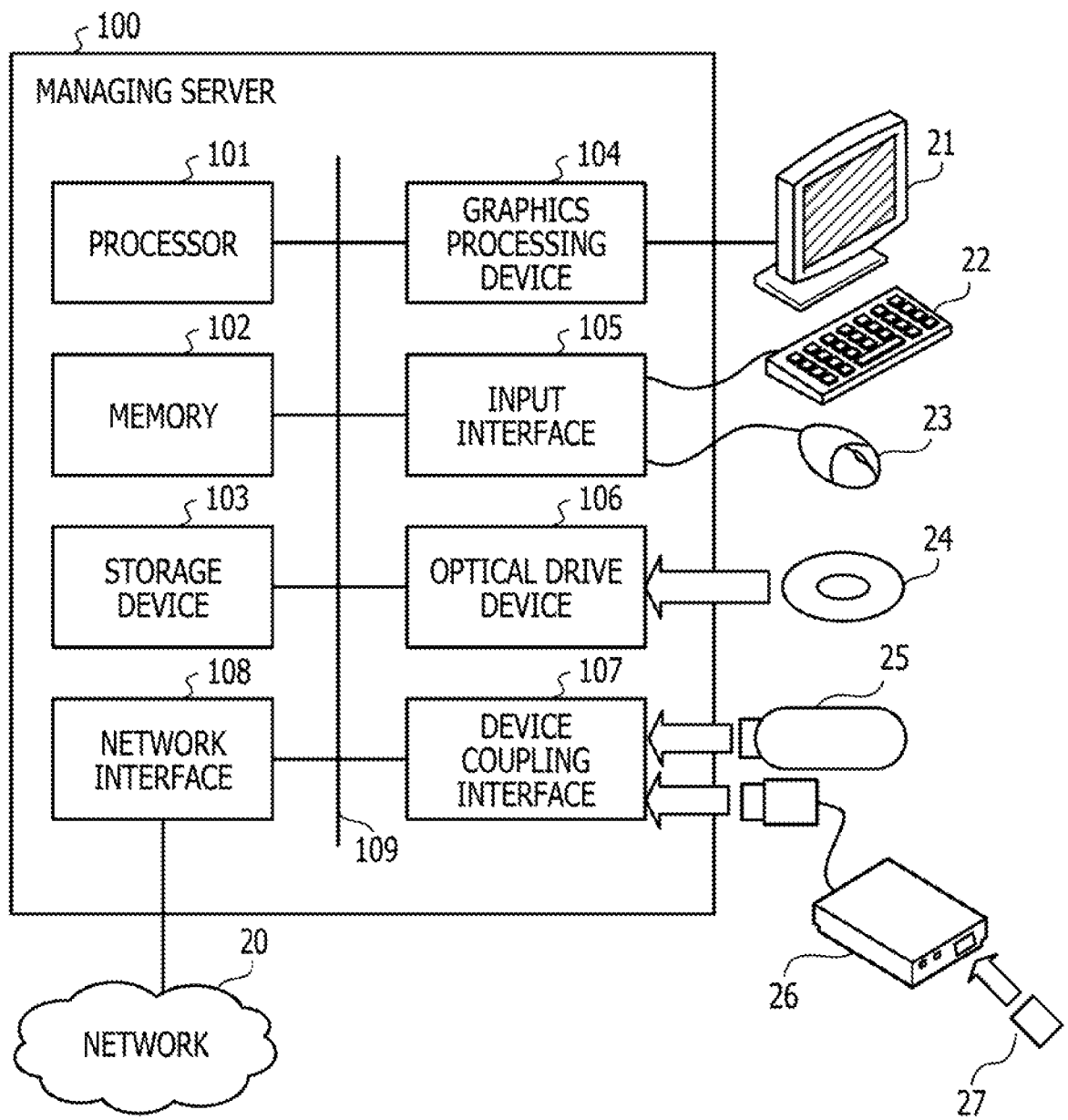
FIG. 3 illustrates an example of a hardware configuration of a managing server.

FIG. 3 illustrates an example of a hardware configuration of the managing server. The managing server 100 is entirely controlled by a processor 101. The processor 101 is coupled to a memory 102 and a plurality of peripheral devices via a bus 109. The processor 101 may be a multiprocessor. The processor 101 is, for example, a central processing unit (CPU), a microprocessor unit (MPU), or a digital signal processor (DSP). Some or all of functions that are realized by causing the processor 101 to execute a program may be realized by electronic circuitry, such as an application-specific integrated circuit (ASIC) or a programmable logic device (PLD).

The memory 102 is used as a main storage device of the managing server 100. In the memory 102, a portion or all of an operating system (OS) program to be executed by the processor 101 and an application program are temporarily stored. In the memory 102, various data to be used for a process by the processor 101 is stored. As the memory 102, a volatile semiconductor storage device, such as a random-access memory (RAM), is used, for example.

As the peripheral devices coupled to the bus 109, there are a storage device 103, a graphics processing device 104, an input interface 105, an optical drive device 106, a device coupling interface 107, and a network interface 108.

The storage device 103 electrically or magnetically writes and reads data to and from an in-built recording medium. The storage device 103 is used as an auxiliary storage device of the computer. In the storage device 103, the OS program, the application program, and various data are stored. As the storage device 103, for example, a hard disk drive (HDD) or a solid state drive (SSD) may be used.

The graphics processing device 104 is coupled to a monitor 21. The graphics processing device 104 displays an image on a screen of the monitor 21 in accordance with a command from the processor 101. As the monitor 21, there is an organic electroluminescence (EL) display device, a liquid crystal display device, or the like.

The input interface 105 is coupled to a keyboard 22 and a mouse 23. The input interface 105 transmits, to the processor 101, signals transmitted from the keyboard 22 and the mouse 23. The mouse 23 is an example of a pointing device, and another pointing device may be used. As the other pointing device, there is a touch panel, a tablet, a touch pad, a trackball, or the like.

The optical drive device 106 uses laser light or the like to read data recorded in an optical disc 24. The optical disc 24 is a portable recording medium in which data is recorded so that the data is readable by light reflection. As the optical disc 24, there is a digital versatile disc (DVD), a DVD-RAM, a compact disc read-only memory (CD-ROM), a CD-recordable (R), a CD-rewritable (RW), or the like.

The device coupling interface 107 is a communication interface for coupling the peripheral devices to the managing server 100. For example, the device coupling interface 107 is coupled to a memory device 25 and a memory reader writer 26. The memory device 25 is a recording medium having a function of communicating with the device coupling interface 107. The memory reader writer 26 is a device that writes data to a memory card 27 or reads data from the memory card 27. The memory card 27 is a card-type recording medium.

The network interface 108 is coupled to the network 20. The network interface 108 transmits and receives data to and from another computer or another communication device via the network 20.

The managing server 100 may realize processing functions according to the second embodiment by means of the foregoing hardware configuration. The system management device 10 described in the first embodiment may be also realized by the same hardware as the managing server 100 illustrated in FIG. 3.

The managing server 100 realizes the processing functions according to the second embodiment by executing a program stored in, for example, a computer-readable recording medium. The program that describes details of processes to be executed by the managing server 100 may be recorded in various recording media. For example, the program to be executed by the managing server 100 may be stored in the storage device 103. The processor 101 loads a portion or all of the program stored in the storage device 103 into the memory 102 and executes the program. The program to be executed by the managing server 100 may be recorded in a portable recording medium, such as the optical disc 24, the memory device 25, or the memory card 27. After the program stored in the portable recording medium is installed in the storage device 103 under control by, for example, the processor 101, the program is able to be executed. The processor 101 may read the program directly from the portable recording medium to run the program.

In such a system, the managing server 100 calculates the possibility (influence risk) that the VM specified by the user may be affected by the failure of another device. The influence risk is a value representing the possibility of being affected by a failure of a peripheral device. The managing server 100 uses the value of the influence risk to move the VM to a physical server that is unlikely to be affected by the failure before the failure occurs, and suppresses the VM from being affected by the failure. Hereinafter, the device for which the influence risk is calculated is referred to as the analysis target device.

The managing server 100 calculates not only the failure risk of the device itself to be analyzed but also the influence risk from the peripheral device by superimposing the failure risk of the peripheral device and the influence range, for example. The failure risk is a value representing the possibility of failure occurring in each device. The influence range means devices that are affected by the failure occurring in a certain device. The managing server 100 compares the influence risk of the analysis target device in the current configuration with the influence risk assuming that the analysis target device is moved to another physical server, and moves the analysis target device to the physical server where the influence risk is reduced.

Figure 4:
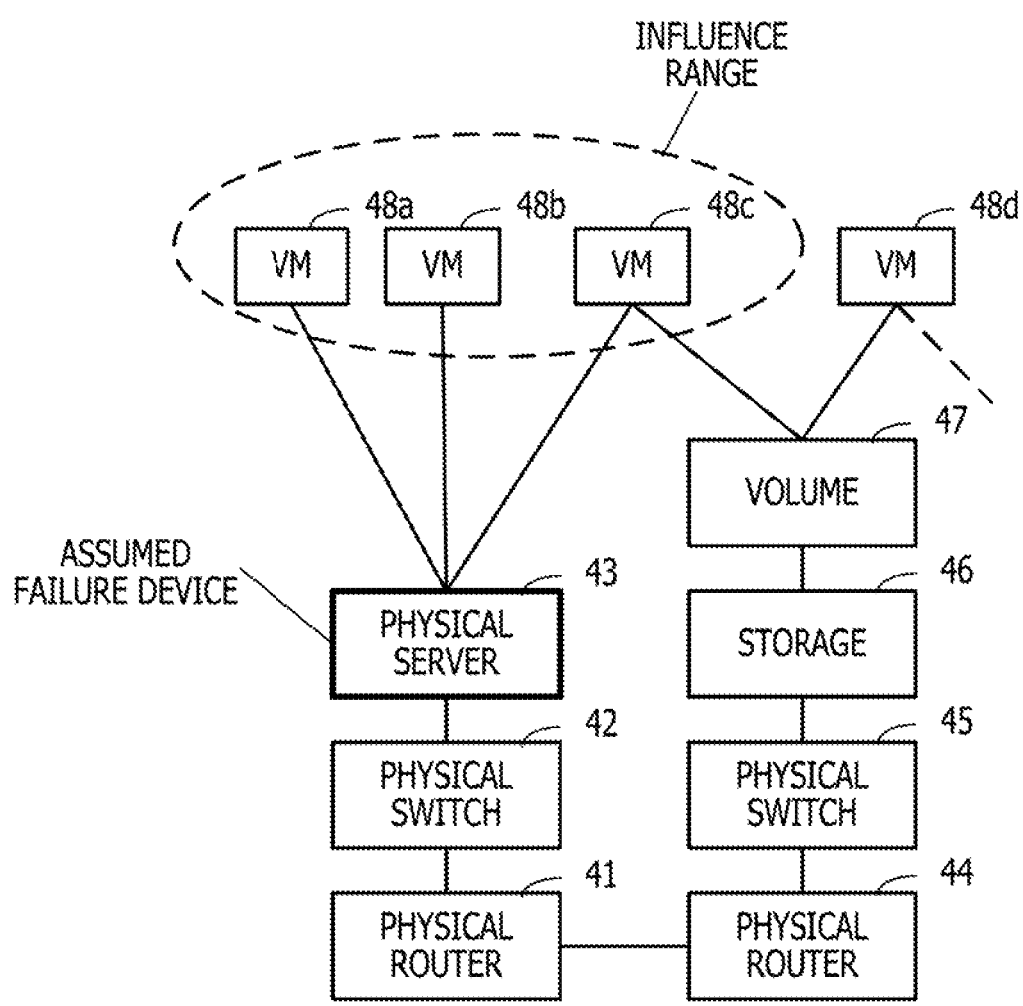
FIG. 4 illustrates an example of an influence range of a failure that has occurred in a physical server.

FIG. 4 illustrates an example of an influence range of a failure that has occurred in a physical server. In the example of FIG. 4, a physical switch 42 is coupled to a physical router 41. A physical server 43 is coupled to the physical switch 42. VMs 48*a* to 48*c* are operating in the physical server 43. A physical switch 45 is coupled to a physical router 44. A storage 46 is coupled to the physical switch 45. A volume 47 is used to construct VMs 48*c* and 48*d*. The two physical routers 41 and 44 are coupled to each other. The volume 47 is a management unit of a storage area in the storage 46. It is also possible to create a plurality of volumes in one storage 46.

It is assumed that a failure occurs in the physical server 43. A device assumed to have a failure in the extraction process of the influence range is referred to as an assumed failure device. When the assumed failure device is the physical server 43, the managing server 100 sets the VMs 48*a* to 48*c* In the physical server 43, for example, as the influence range.

Figure 5:
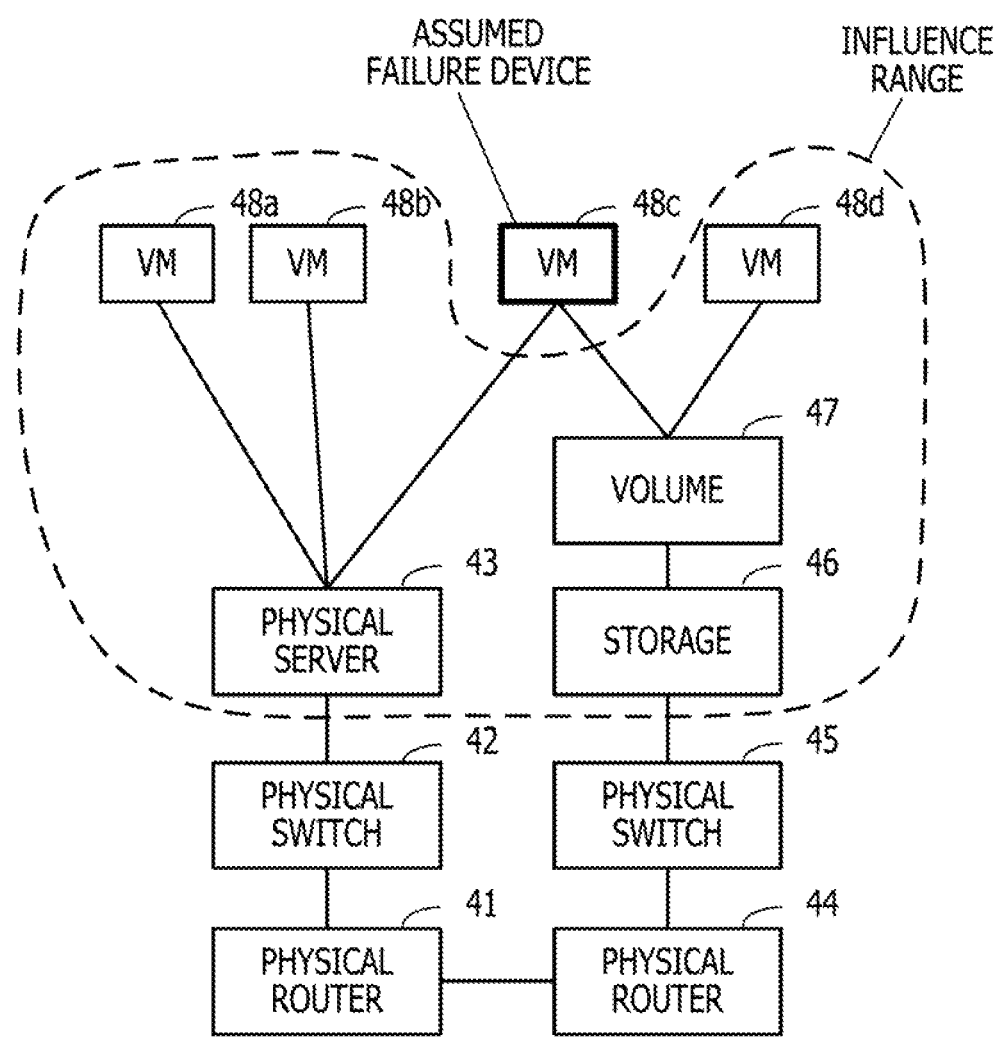
FIG. 5 illustrates an example of an influence range of a failure that has occurred in a VM.

FIG. 5 illustrates an example of an influence range of a failure that has occurred in a VM. It is assumed, in the example of FIG. 5, that the VM 48*c* is the assumed failure device. When the assumed failure device is the VM 48*c*, the managing server 100 includes the physical server 43 having the VM 48*c* constructed therein and the other VMs 48*a* and 48*b* in the physical server 43, for example, in the influence range. The managing server 100 also includes the volume 47 having the VM 48*c*, which is the assumed failure device, constructed therein, the storage 46 having the volume 47, and the other VM 48*d* using the volume 47 and the storage 46 in the influence range.

Besides the physical servers and VMs, physical switches, physical routers, volumes, and storages are assumed as the assumed failure devices. The managing server 100 defines a method of extracting an influence range for each device type, and extracts an influence range according to the device type for each device. The managing server 100 regularly extracts the influence range of each device, for example, at intervals of about one hour. The managing server 100 may extract the influence range of each device at the timing when a change in the system configuration information is detected. The managing server 100 may extract the influence range of each device at the timing of analyzing the influence risk on the analysis target device.

In the example of FIG. 5, when the assumed failure device is a VM, another VM in the same physical server is included in the influence range. One of the reasons for this is that the CPU utilization of a VM in the same host may affect the performance of other VMs at the time of overcommitment. Another reason for including another VM in the same physical server in the influence range is that a human setting error on the VM that is the assumed failure device may occupy a communication band of the physical server and affect another VM.

The managing server 100 extracts, for each device, a device including the device in the influence range. This makes it possible to see, when a certain device is set as the analysis target device, which one of the other devices includes the analysis target device in the influence range. Therefore, the managing server 100 extracts a device (assumed failure device) including the analysis target device in the range affected by the failure.

Figure 6:
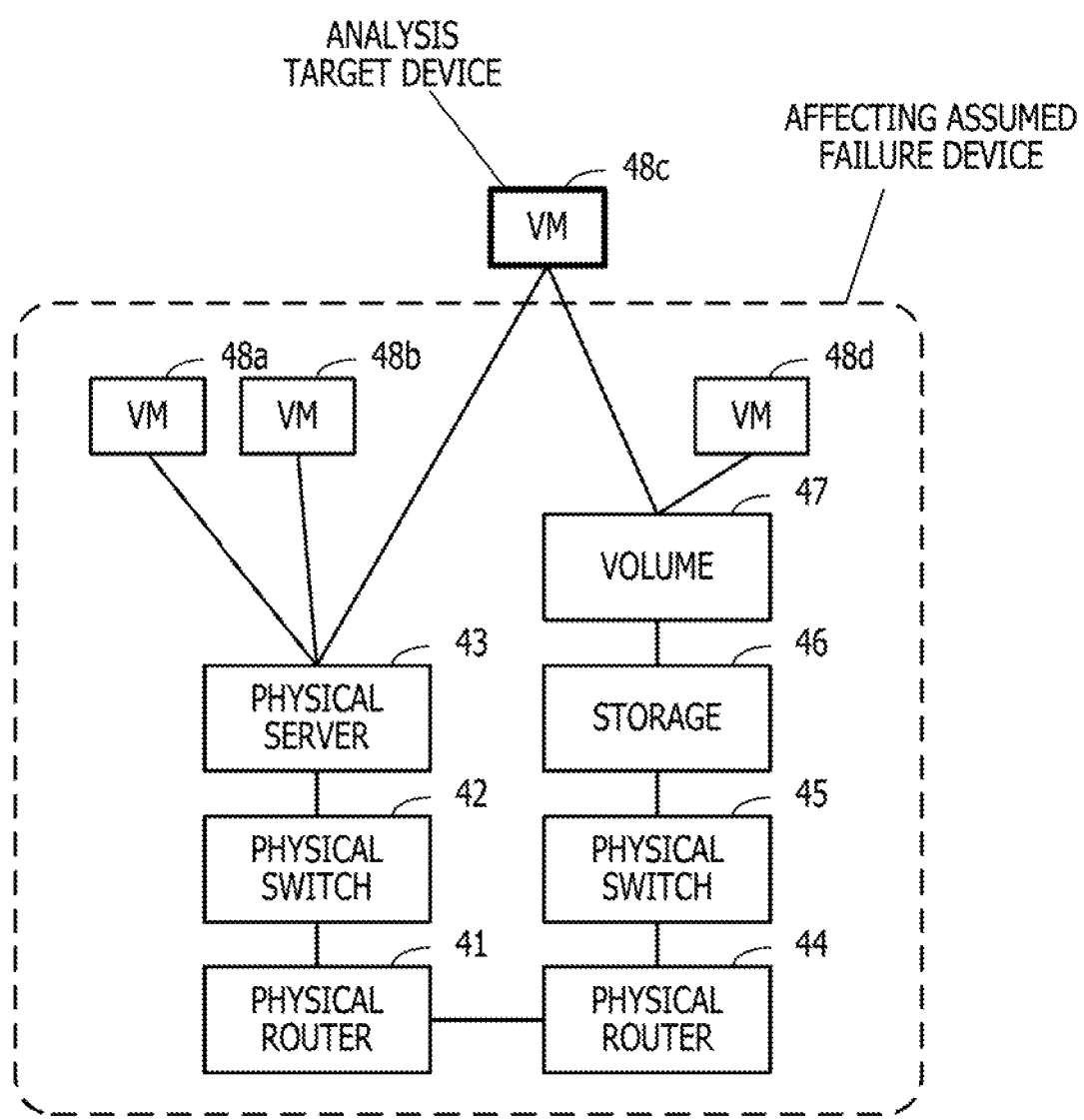
FIG. 6 illustrates an example of an assumed failure device that affects an analysis target device.

FIG. 6 illustrates an example of an assumed failure device that affects an analysis target device. For example, when the analysis target device is the VM 48*c*, the physical server 43 having the VM 48*c* constructed therein and the other VMs 48*a* and 48*b* constructed in the physical server 43 are included in the assumed failure devices. The volume 47 in which the VM 48*c* as the analysis target device is constructed, the storage 46, another VM 48*d* constructed in the volume 47, and another volume (not illustrated) provided in the storage 46 are also included in the assumed failure devices. The physical switches 42 and 45 and the physical routers 41 and 44 coupled to the physical server 43 and the storage 46 in which the VM 48*c* as the analysis target device is constructed are also included in the assumed failure devices. When a failure occurs in any of the assumed failure device groups, the failure affects the VM 48*c* that is the analysis target device.

The managing server 100 also calculates the failure risk of the device itself for each device. Such failure risks include resource failure risk, user failure risk, service failure risk, environmental failure risk, and the like.

For example, the managing server 100 calculates a resource failure risk and a user failure risk as failure risks related to virtual devices (VMs and volumes).

The resource failure risk is the risk of failure caused by insufficient resource capacity. For example, the managing server 100 sets a value, as the resource failure risk of a VM, obtained by dividing the time when the usage status of the resources (CPU, memory, and storage device) allocated to the VM reaches 100% or close to 100% by the operating time of the VM. Although the resource failure risk may be reduced by automatically adjusting the amount of resources allocated to VMs, automatic adjustment of the resource amount may take time and effort, leading to possible deterioration in performance. Therefore, frequent automatic adjustment of resources is likely to result in inability to maintain stable performance, causing a failure risk of unstable system operation. Therefore, the managing server 100 includes the resource failure risk in one of the device failure risks regardless of the presence or absence of the resource amount automatic adjustment function.

The user failure risk is the risk of failure caused by inappropriate use of device by a user. For example, when there is a failure due to a user's operation error, a setting error, or the like, the managing server 100 calculates a certain failure risk as a user failure risk, since similar errors may occur in the future.

The managing server 100 also calculates a service failure risk and an environmental failure risk as failure risks related to the physical device.

The service failure risk is a failure risk calculated by comparing the usage history (age of service and usage status) of the device with the service life or the usage time guaranteed by the manufacturer. For example, the managing server 100 calculates the target failure risk based on a difference between the general service life of the device and the current service life or the number of device failures.

The environmental failure risk is a failure risk calculated in consideration of the occurrence of failures that have occurred in the past due to the environment in which the device is used. For example, the managing server 100 gives a certain environmental failure risk to a device in which a defect occurs such as a temperature rise or a component failure that is different from the normal service life.

The managing server 100 calculates a failure risk of each type as described above for each device, for example, and sets the sum of the failure risks as the failure risk of the device. Therefore, the failure risk takes an arbitrary value of 0 or more. The managing server 100 may normalize the value of the failure risk within the range of 0 to 1 by dividing the failure risk of each device by the maximum value of the failure risk of each device calculated in the entire system. Assuming that the type of failure risk to be calculated is the same for all the devices included in the system, the managing server 100 sets the failure risk calculation conditions to be the same for all the devices.

Figure 7:
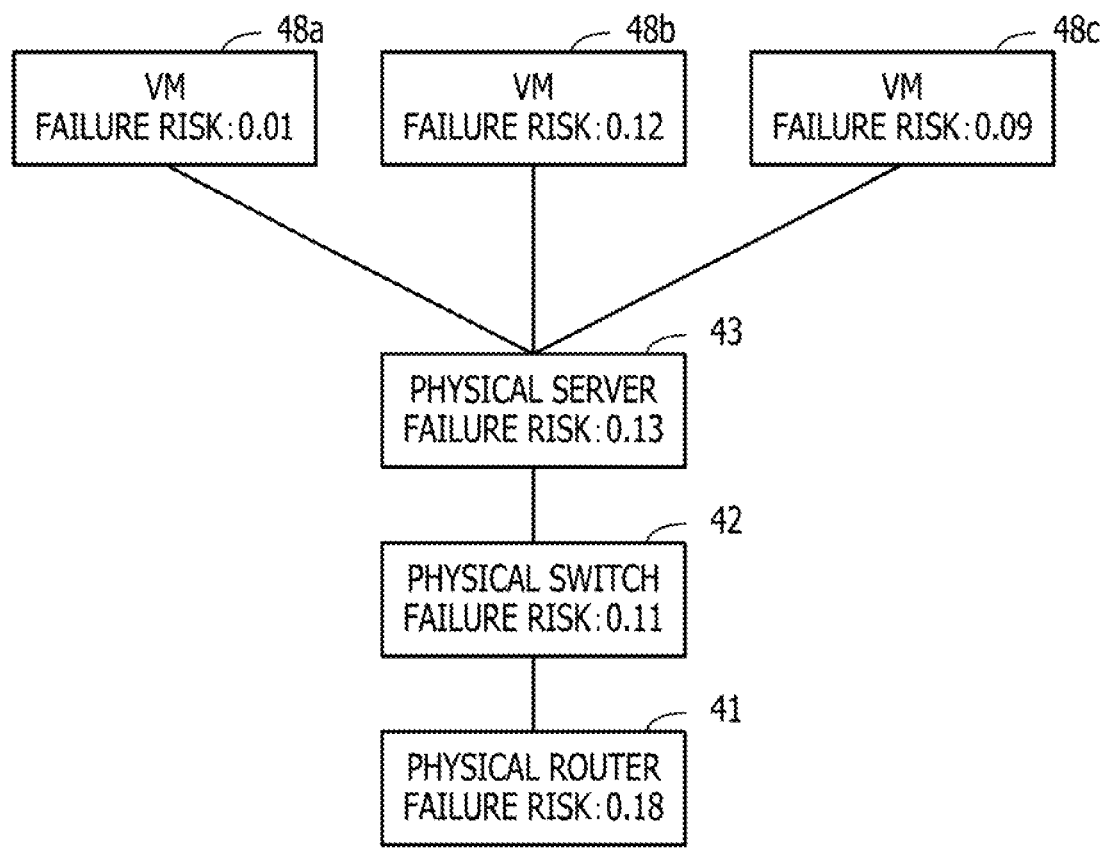
FIG. 7 illustrates an example of a failure risk calculated for each device.

FIG. 7 illustrates an example of a failure risk calculated for each device. In the example of FIG. 7, the value of the failure risk is normalized within the range of 0 to 1.

The managing server 100 calculates the influence risk of the analysis target device based on the failure risk calculated for each device and the influence range of each device. The method of calculating the influence risk is as follows.

The managing server 100 calculates the influence risk of the analysis target device by adding the failure risks of all the devices including the analysis target device in the influence range. Since the influence risk is calculated from the failure risk of the peripheral device, the failure risk of the analysis target device is not included in the influence risk of the analysis target device.

Although the influence risk takes an arbitrary value of 0 or more, the conditions for calculating the failure risk are set to be the same, so that the influence risk for each device may be compared under the same conditions. The managing server 100 may normalize the value of the influence risk within the range of 0 to 1 by dividing each influence risk by the maximum value calculated for the entire system.

Figure 8:
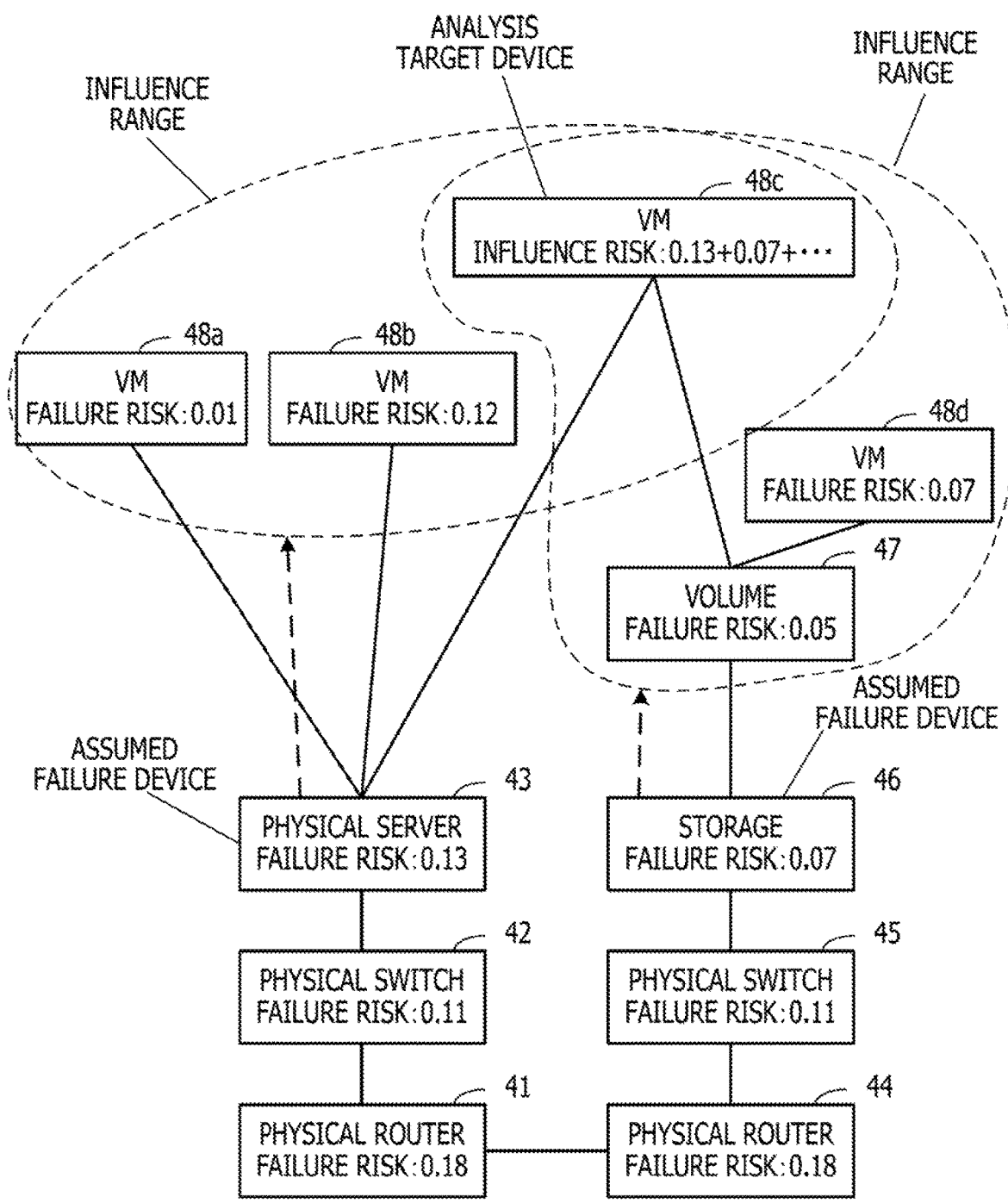
FIG. 8 illustrates a calculation example of an influence risk of the analysis target device.

FIG. 8 illustrates a calculation example of an influence risk of the analysis target device. In the example of FIG. 8, the VM 48c is the analysis target device. The VM 48c is included in the influence range when the physical server 43 is used as the assumed failure device. The VM 48c is also included in the influence range when the storage 46 is used as the assumed failure device. Therefore, when calculating the influence risk of the VM 48c, the managing server 100 adds the failure risk "0.13" of the physical server 43 and the failure risk "0.07" of the storage 46 to the influence risk of the VM 48c. Likewise, when another device is used as the assumed failure device, the managing server 100 sequentially adds the failure risks of the devices including the VM 48c in the influence range to the influence risk of the VM 48c. The sum of the failure risks of all the assumed failure devices including the VM 48c in the influence range is obtained as the influence risk of the VM 48c.

When the influence risk of the analysis target device exceeds a predetermined threshold, the managing server 100 may move the position of the analysis target device on the network. For example, when the analysis target device is a VM, the managing server 100 moves the VM from the physical server that is currently operating the VM to another physical server.

Figure 9:
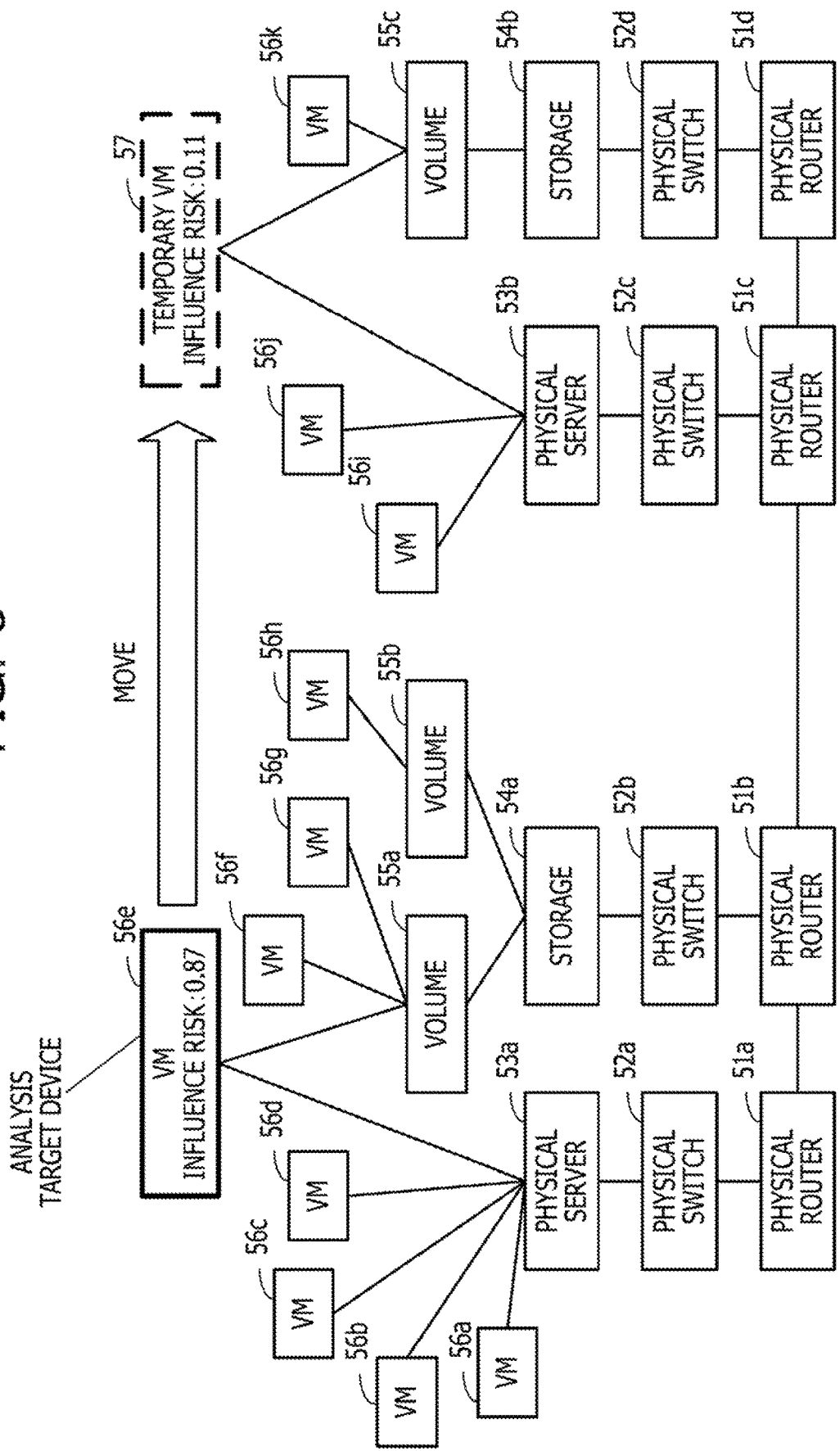
FIG. 9 illustrates an example of moving a device having an excessively large influence risk.

FIG. 9 illustrates an example of moving a device having an excessively large influence risk. A system illustrated in FIG. 9 includes physical routers 51a to 51d, physical switches 52a to 52d, physical servers 53a and 53b, storages 54a and 54b, volumes 55a to 55c, and VMs 56a to 56k.

After calculating the influence risk using the VM 56e constructed in the physical server 53a as the analysis target device and determining that the influence risk exceeds the predetermined threshold, the managing server 100 calculates an influence risk of a temporary VM 57 when the VM 56e is moved to another physical server 53b. The influence risk of the temporary VM57 is sufficiently low, the managing server 100 moves the VM 56e that is the analysis target device to the position of the temporary VM 57. For example, the managing server 100 instructs a virtualization manager of the physical server 53a to migrate the VM 56e to the physical server 53b. The managing server 100 preferentially moves a particularly important device to a physical server having the influence risk reduced.

Although the influence risk of the temporary VM 57 depends on the failure risk of the peripheral device at the position of the temporary VM 57 (in which physical server the VM is constructed and which volume to use), the value of the failure risk of the peripheral device is not used for the calculation of the failure risk of each device. Therefore, even when the VM 56e that is the analysis target device is moved to the position of the temporary VM 57, the failure risk of the peripheral device of the destination does not change.

For example, the managing server 100 sets the position of the VM 56e to be moved as dose as possible as a destination candidate. In this case, the managing server 100 sequentially sets physical servers closer to the physical server 53a having the VM 56e constructed therein over the network as destination candidates, and calculates the influence risk of the temporary VM 57 when the temporary VM 57 is constructed in the physical server set as the destination candidate. The managing server 100 sets the location where the influence risk of the temporary VM 57 is not more than the predetermined threshold as the destination of the VM 56e.

In the example of FIG. 9, the influence risk of the VM 56e that is the analysis target device is "0.87", while the influence risk of the temporary VM 57 is "0.11". Therefore, the managing server 100 moves the VM 56e to the position of the temporary VM 57.

When calculating the influence risk of the temporary VM 57, the managing server 100 may calculate the influence risk when the temporary VM 57 is constructed at any of all the locations to which the VM 56e may be moved, for example. In order to reduce the calculation time, the managing server 100 may preferentially calculate the influence risk when the temporary VM 57 is constructed in the physical server from the physical server with smaller influence risk.

The managing server 100 may also set, as the destination, a location where the number of switches and routers through which the VM 56e that is the analysis target device is moved is reduced as much as possible when moving the VM 56e. For example, when there is another physical server in the same rack that uses the same physical router 51a as the physical server 53a having the VM 56e constructed therein, the managing server 100 may preferentially select that physical server as a destination candidate. This makes it possible to reduce the amount of communication band used for movement, and to suppress a decrease in system efficiency due to the movement of the device.

Next, the function to reduce the risk of failure in the managing server 100 is specifically described.

Figure 10:
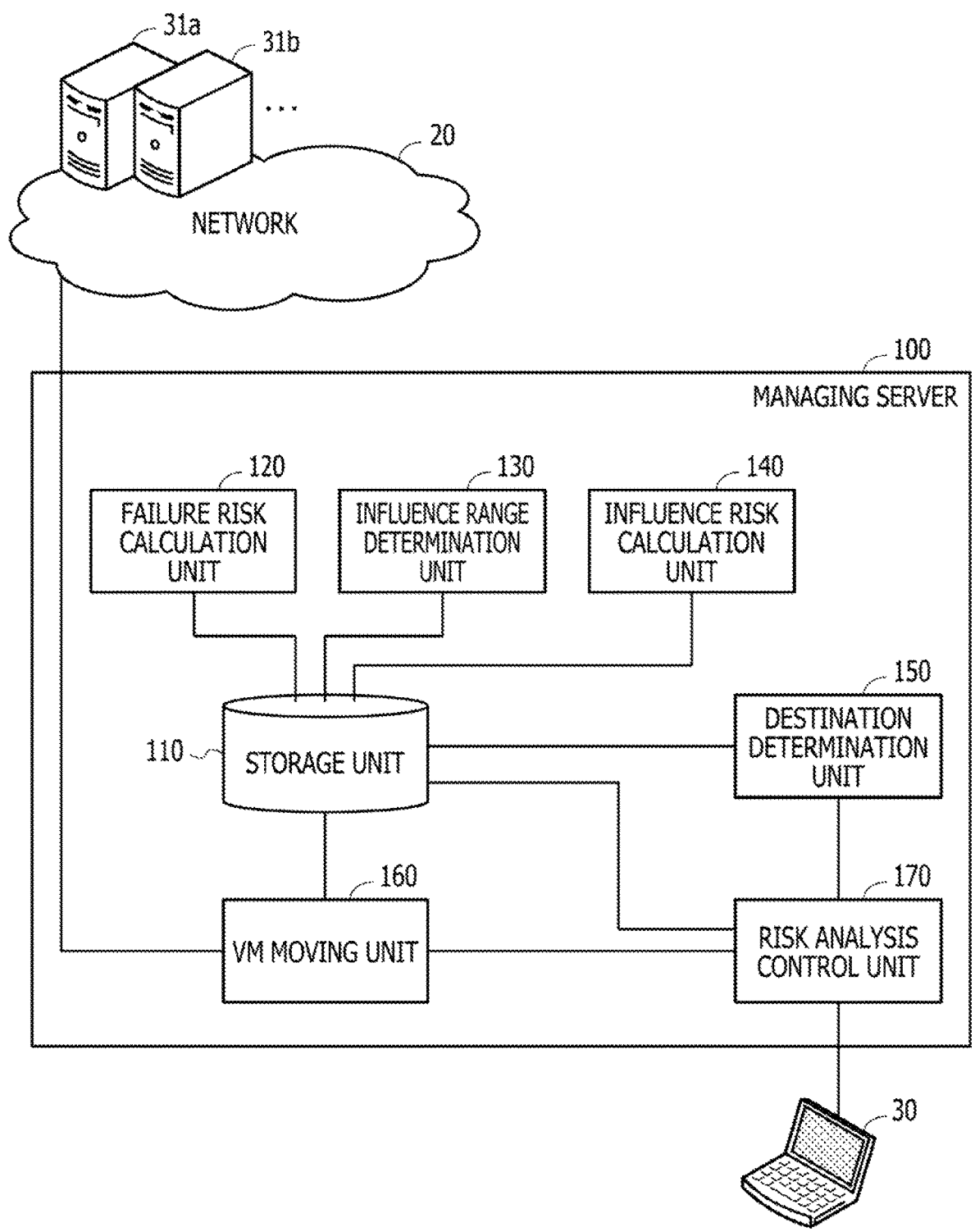
FIG. 10 is a block diagram illustrating functions of the managing server.

FIG. 10 is a block diagram illustrating functions of the managing server. The managing server 100 includes a storage unit 110, a failure risk calculation unit 120, an influence range determination unit 130, an influence risk calculation unit 140, a destination determination unit 150, a VM moving unit 160, and a risk analysis control unit 170.

The storage unit 110 stores information used for calculating the influence risk of the devices in the system. For example, a part of the storage area of the memory 102 or the storage device 103 is used as the storage unit 110.

The failure risk calculation unit 120 calculates the failure risk of each device in the system according to an instruction from the risk analysis control unit 170. The failure risk calculation unit 120 stores the calculated failure risk in the storage unit 110. The failure risk calculation unit 120 monitors the system configuration via the network 20 and stores the system configuration model indicating the system configuration in the storage unit 110.

Once the failure risk of each device is calculated, the influence range determination unit 130 determines the influence range of each device in the system. The influence range determination unit 130 stores information on the determined influence range in the storage unit 110.

Once the influence range of each device is calculated, the influence risk calculation unit 140 calculates the influence risk of the analysis target device designated by the risk analysis control unit 170. The influence risk calculation unit 140 stores the calculated influence risk in the storage unit 110.

When receiving an instruction to determine a recommended destination from the risk analysis control unit 170, the destination determination unit 150 determines a destination capable of reducing the influence risk of the analysis target device. The destination determination unit 150 transmits information indicating the determined destination to the risk analysis control unit 170.

When the movement of the analysis target device is determined, the VM moving unit 160 transmits the activation of the device to the physical device having the device constructed therein.

The risk analysis control unit 170 receives input of information used for risk analysis and displays the analysis result. For example, the risk analysis control unit 170 receives input to designate the analysis target device and an instruction to move a VM having the influence risk exceeding a threshold. The risk analysis control unit 170 controls the function for risk analysis of the managing server 100 to acquire the analysis result. The risk analysis control unit 170 also causes the management terminal device 30 to display the analysis result.

The lines coupling the respective elements illustrated in FIG. 10 represent some of communication routes, and communication routes other than the illustrated communication routes may be set. The function of each of the elements illustrated in FIG. 10 may be realized, for example, by causing a computer to execute a program module corresponding to the element.

Figure 11:
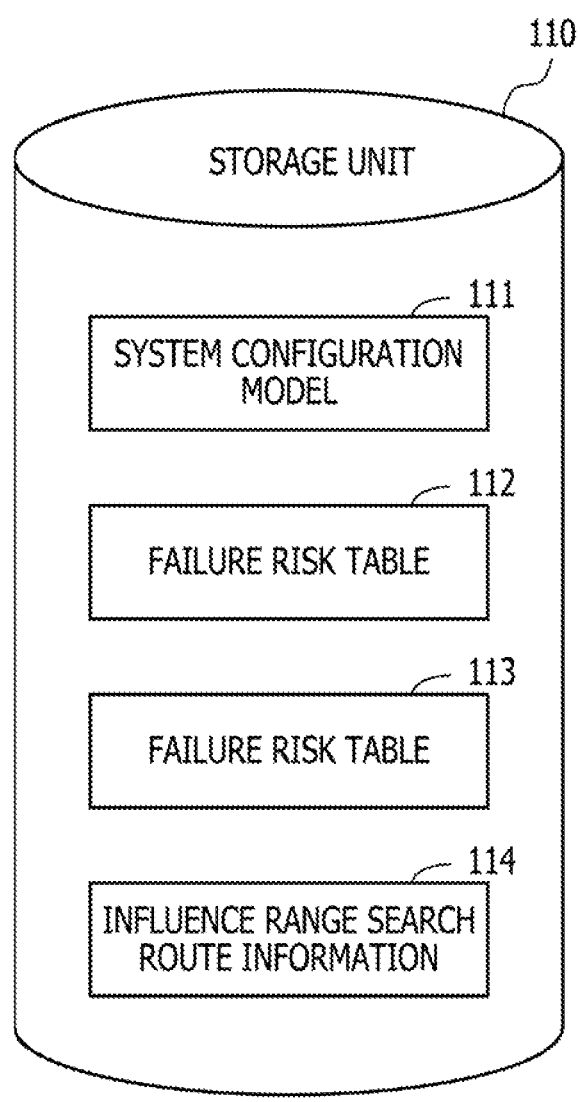
FIG. 11 illustrates an example of information stored in a storage unit.

FIG. 11 illustrates an example of information stored in the storage unit. The storage unit 110 stores, for example, a system configuration model 111, a failure risk table 112, an influence risk table 113, and influence range search route information 114.

The system configuration model 111 is information indicating the devices included in the system and the coupling relationship between the devices. The failure risk table 112 is a data table in which the influence range is set, which is determined for each device when a failure occurs in the device. The influence risk table 113 is a data table in which the influence risk of the analysis target device is set. The influence range search route information 114 is information indicating the search route of the influence range for each device type.

With reference to FIGS. 12 to 16, the information stored in the storage unit 110 is described in detail below.

FIG. 12 illustrates an example of a system configuration model. The system configuration model 111 includes device information and coupling information. In the device information, a name (device name) of a device (including a virtual device such as a VM that is a component element of the system and a function of the device are set. In the coupling information, a list of devices directly coupled on the network is set. The device name of each device may be a name obtained by adding an identification number after the name indicating the function. A device whose device name starts with "SV" is a server. A device whose device name starts with "VM" is a virtual machine (VM). A device whose device name starts with "Storage" is a storage. A device whose device name starts with "Volume" is a volume.

Figure 13:
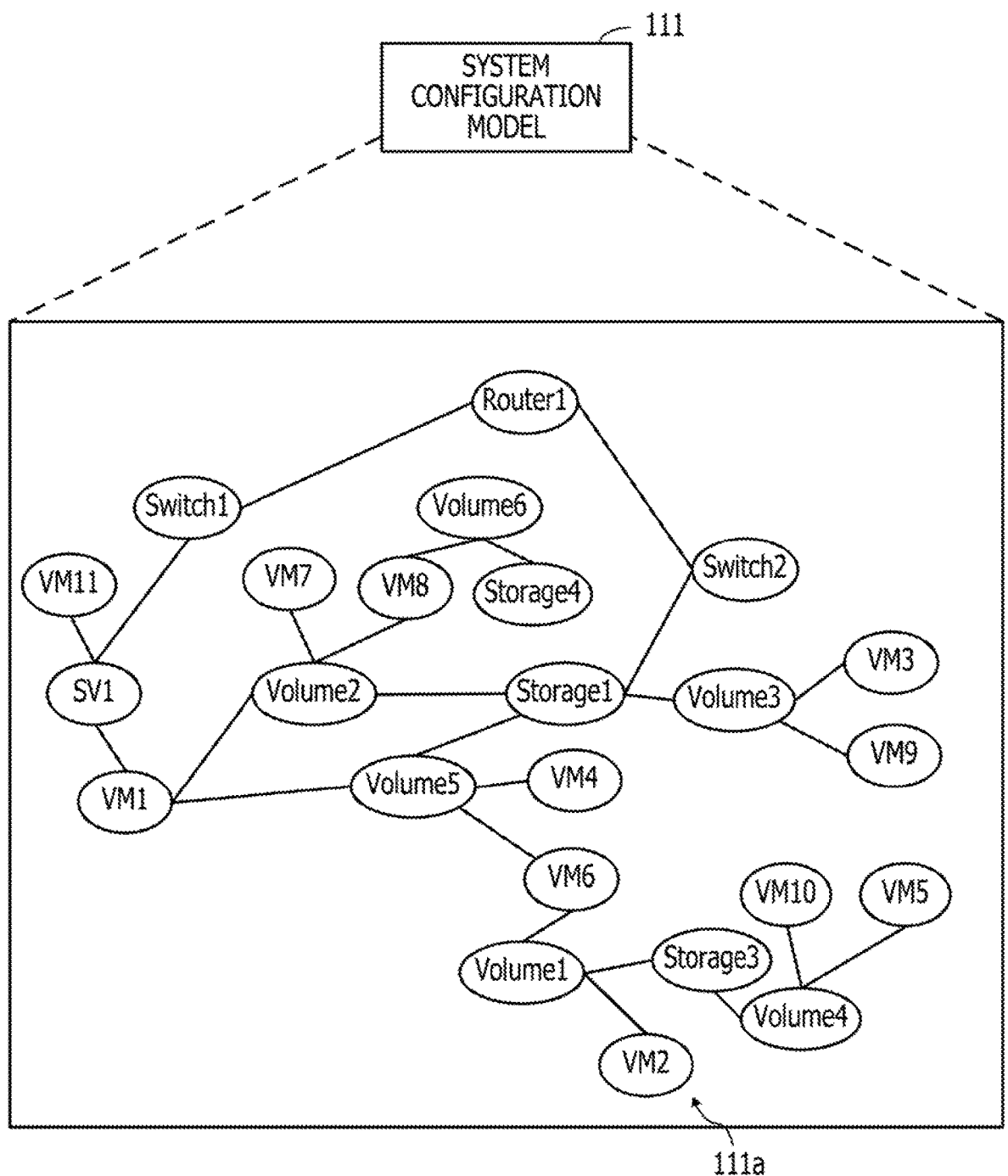
FIG. 13 illustrates an example of a system configuration represented by the system configuration model.

FIG. 13 illustrates an example of a system configuration represented by the system configuration model. As illustrated in the system configuration 111a, a number of devices are complexly related to each other in the system. When a failure occurs in one device, the influence of the failure also affects other devices. A device that is likely to be affected by a number of devices has a high risk of problems such as functional deterioration due to the influence of failures in other devices. Therefore, it is important to correctly calculate the influence risk of each device and reduce the influence risk.

FIG. 14 illustrates an example of a failure risk table. The failure risk table 112 is provided with columns for assumed failure device, failure risk, and devices within the influence range. In the assumed failure device column, the device name is set, that is a device assumed to have a failure and is the starting point of the search for the influence range. In the failure risk column, the failure risk of the assumed failure device is set. In the column of the devices within the influence range, the device names of the devices are set, which are included in the range affected by the failure when the failure occurs in the assumed failure device.

FIG. 15 illustrates an example of an influence risk table. The influence risk table 113 is provided with columns for the analysis target device, influence risk, constructed physical server, coupled storage, and assumed failure device. In the analysis target device column, the device name of the device to be analyzed is set. In the influence risk column, the influence risk calculated for the analysis target device is set. In the constructed physical server column, the device name of the physical server having the analysis target device constructed therein is set. In the coupled storage column, the device name of the storage coupled to the analysis target device is set. In the assumed failure device column, the device name of the assumed failure device including the analysis target device in the influence range is set.

FIG. 16 illustrates an example of influence range search route information. The influence range search route information 114 is provided with columns of assumed failure device, search device type, and influence range search route. In the assumed failure device column, the type of the assumed failure device is set. In the search device type column, the type of device (storage-related device or server-related device) that is the target of the influence range search is set. In the influence range search route column, a route (coupling relation search route) is set that follows the coupling relationships between the devices for the influence range search.

The managing server 100 uses the information stored in the storage unit 110 to perform risk analysis of the analysis target device.

Figure 17:
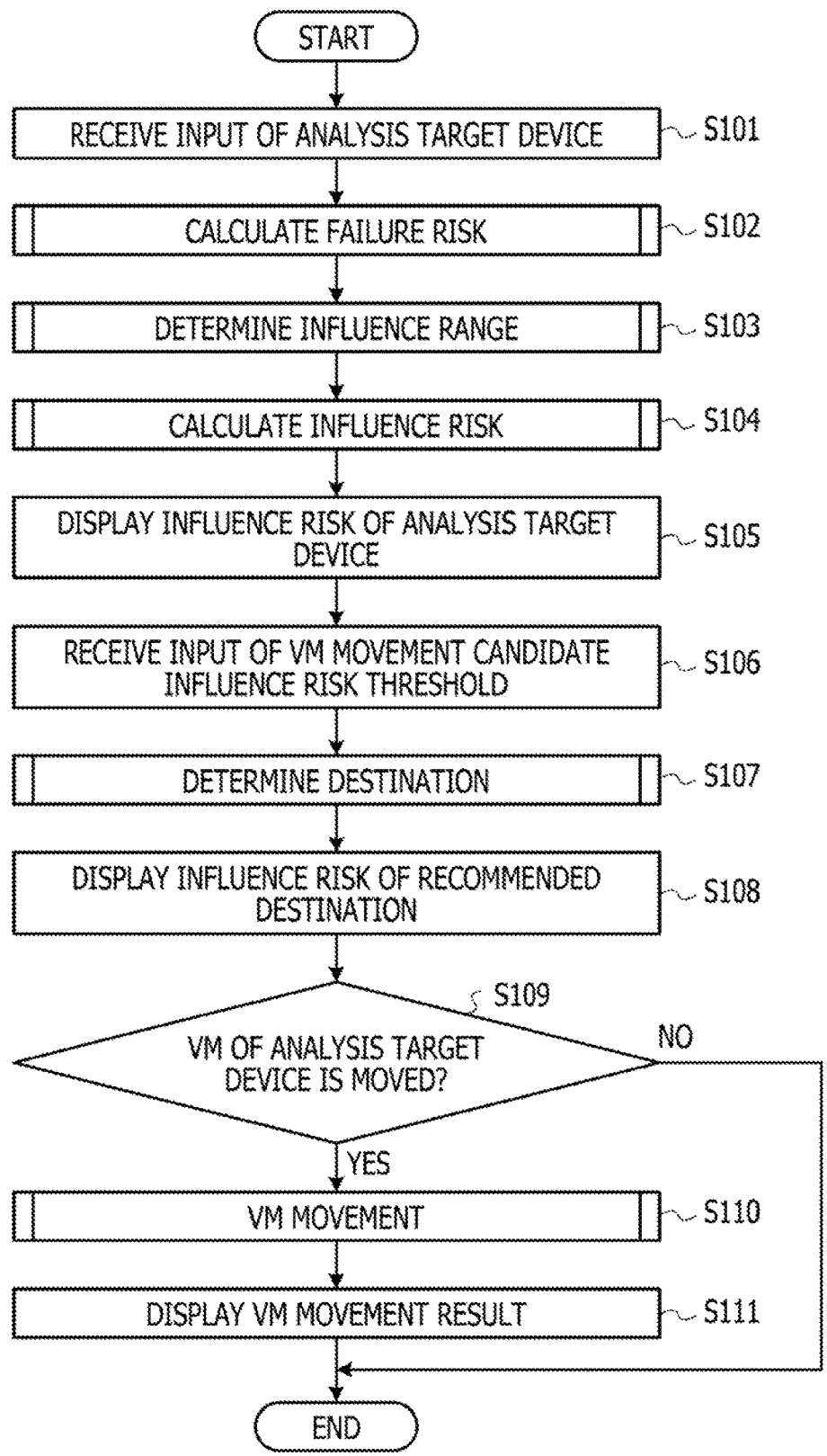
FIG. 17 is a flowchart illustrating an example of a procedure of risk analysis processing.

FIG. 17 is a flowchart illustrating an example of a procedure of risk analysis processing. The processing operations illustrated in FIG. 17 are described in order of the step numbers. [0144] [Step S101] The risk analysis control unit 170 receives input of an analysis target device. For example, the risk analysis control unit 170 transmits screen data of a risk analysis screen to the management terminal device 30. The management terminal device 30 displays the risk analysis screen based on the received screen data. An administrator refers to the displayed risk analysis screen and inputs an instruction to the management terminal device 30 to execute influence risk calculation processing with the designated analysis target device. The management terminal device 30 transmits an influence risk calculation request with the designated analysis target device to the managing server 100 upon receipt of the instruction to execute the influence risk calculation processing. Upon receipt of the influence risk calculation request, the risk analysis control unit 170 instructs the failure risk calculation unit 120 to calculate the failure risk. The risk analysis control unit 170 transmits information (for example, device name) indicating the analysis target device to the influence risk calculation unit 140.

[Step S102] The failure risk calculation unit 120 calculates the failure risk of each device according to an instruction from the risk analysis control unit 170. After the completion of the failure risk calculation processing, the failure risk calculation unit 120 instructs the influence range determination unit 130 to determine the influence range. The failure risk calculation processing is described in detail later (see FIG. 19).

[Step S103] The influence range determination unit 130 determines the influence range when a failure occurs in each device according to an instruction from the failure risk calculation unit 120. After the completion of the influence range determination processing, the influence range determination unit 130 instructs the influence risk calculation unit 140 to calculate the influence risk. The influence range determination processing is described in detail later (see FIG. 25).

[Step S104] The influence risk calculation unit 140 calculates the influence risk of the analysis target device according to the instruction from the influence range determination unit 130. After the completion of the influence risk calculation processing, the influence risk calculation unit 140 transmits the calculation result of the influence risk to the risk analysis control unit 170. The influence risk calculation processing is described in detail later (see FIG. 29).

[Step S105] The risk analysis control unit 170 displays the influence risk of the analysis target device on the screen of the management terminal device 30. The administrator recognizes the influence risk of the analysis target device from the displayed screen.

[Step S106] The risk analysis control unit 170 receives input of a VM movement candidate influence risk threshold. For example, when the administrator determines that the analysis target device is a VM and the influence risk is too high, the administrator inputs an instruction to execute the recommended destination determination processing with the designated VM movement candidate influence risk threshold to the management terminal device 30. The management terminal device 30 transmits, to the managing server 100, a request to execute the recommended destination determination processing including the VM movement candidate influence risk threshold, in response to the input from the administrator. Upon receipt of the request to execute the recommended movement destination determination processing including the VM movement candidate influence risk threshold, the risk analysis control unit 170 transmits the recommended destination determination request to the destination determination unit 150.

[Step S107] The destination determination unit 150 executes destination determination processing in response to the recommended destination determination request. Once the destination determination processing is completed, the destination determination unit 150 transmits to the risk analysis control unit 170 information indicating the recommended destination (for example, the device name of the physical server that constructs the VM and the device name of the storage coupled to the VM) and the influence risk of the recommended destination. The destination determination processing is described in detail later (see FIG. 30).

[Step S108] The risk analysis control unit 170 causes the management terminal device 30 to display a screen displaying the position of the recommended destination on the network and the influence risk of the recommended destination. When determining to move the VM by referring to the screen of the management terminal device 30, the administrator inputs an instruction to move the VM to the management terminal device 30. When determining not to move the VM, the administrator inputs an instruction to terminate the risk analysis processing to the management terminal device 30. The management terminal device 30 transmits a request to move the VM or a request to terminate the risk analysis processing to the managing server 100 in response to the input from the administrator.

[Step S109] The risk analysis control unit 170 determines whether or not the request to move the VM has been received. When receiving the request to move the VM, the risk analysis control unit 170 instructs the VM moving unit 160 to move the VM, and advances the processing to step S110. When receiving the request to terminate the risk analysis processing without receiving the request to move the VM, the risk analysis control unit 170 terminates the risk analysis processing.

[Step S110] The VM moving unit 160 moves the VM that is the analysis target device to the position set as the recommended destination. The VM moving processing is described in detail later (see FIG. 40).

[Step S111] When the VM movement is completed, the risk analysis control unit 170 causes the management terminal device 30 to display a screen displaying the VM movement result. Then, the risk analysis processing is terminated.

Through such procedures, the influence risk of the analysis target device is calculated and the VM is moved.

Next, the failure risk calculation processing is described in detail.

Figure 18:
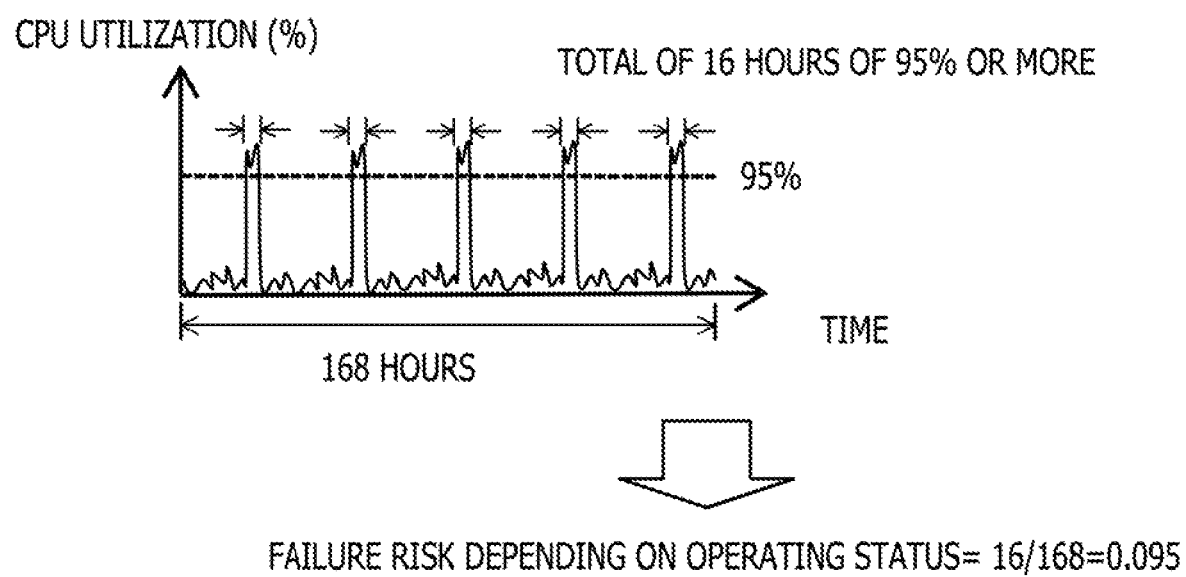
FIG. 18 illustrates a calculation example of a failure risk.

FIG. 18 illustrates a calculation example of a failure risk. The failure risk calculation unit 120 calculates the failure risk from the operating status of resources, for example. For example, when the amount of resources available for a device is scarce, the device is more likely to have a failure. Therefore, the failure risk calculation unit 120 calculates the failure risk based on the operating statuses of the CPU, the memory, and the storage. For example, the failure risk calculation unit 120 calculates the ratio of the time when the usage rate exceeds a predetermined threshold (100% or value dose to 100%) to the operating time for at least one of the CPU, the memory, and the storage, and sets the ratio as the failure risk. The failure risk calculation unit 120 may also calculate the time ratio at which the usage rate exceeds the threshold for two or more of the CPU, the memory, and the storage, and use the sum of these ratios as the failure risk.

For example, the failure risk calculation unit 120 sets the ratio of the time during which the CPU utilization is 95% or more of the operating time of one week (168 hours) as the failure risk due to the operating status. In the example of FIG. 18, the total time during which the CPU utilization is 95% or more is 16 hours. Therefore, the failure risk is 0.095 (=16/168).

The failure risk calculation unit 120 may also calculate the failure risk in consideration of the past failure situations. For example, when there is a failure due to a users operation error or setting error, the failure risk calculation unit 120 determines that a similar error may occur in the future, and provides a device managed by the same user with a certain failure risk. The failure risk calculation unit 120 may calculate the failure risk in consideration of the service life of the physical device. For example, the failure risk calculation unit 120 adds, to the failure risk, a value calculated according to the remaining life of the device up to the service life of the device and the probability of failure. The failure risk calculation unit 120 may also calculate the failure risk in consideration of the environmental temperature in the physical device. For example, the failure risk calculation unit 120 acquires the temperature distribution in the data center, and, when the device is installed in a relatively high temperature region, adds to the failure risk a value corresponding to the ratio of the temperature surrounding the device to the average temperature (or a preset temperature) of the data center. As described above, an appropriate failure risk may be calculated by adding the failure risks calculated from the resource operating status, the past failure status, the service life of the physical device, and the environmental temperature.

Figure 19:
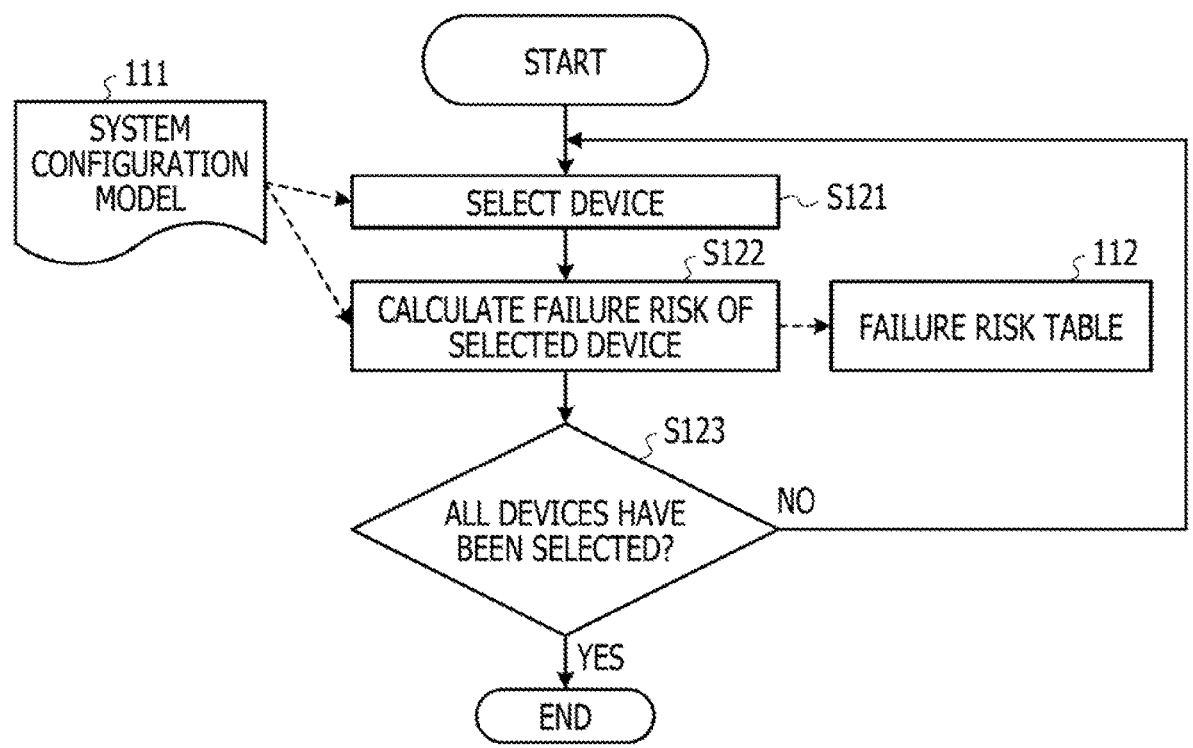
FIG. 19 is a flowchart illustrating an example of a procedure of failure risk calculation processing.

FIG. 19 is a flowchart illustrating an example of a procedure of failure risk calculation processing. The processing operations illustrated in FIG. 19 are described below in order of the step numbers.

[Step S121] The failure risk calculation unit 120 refers to the device information in the system configuration model 111 to select one device yet to be selected.

[Step S122] The failure risk calculation unit 120 calculates the failure risk of the selected device. For example, the failure risk calculation unit 120 acquires information indicating a time-series change in operating status such as the CPU utilization from the selected device, and calculates the failure risk. The failure risk calculation unit 120 sets the calculated failure risk in a record corresponding to the device name of the selected device in the failure risk table 112.

[Step S123] The failure risk calculation unit 120 determines whether or not all the devices have been selected. When all the devices have been selected, the failure risk calculation unit 120 terminates the failure risk calculation processing. When there is any device yet to be selected, the failure risk calculation unit 120 advances the processing to step S121.

The failure risks of all the devices are thus calculated, and the calculated failure risk values are set in the failure risk table 112. After the failure risk calculation is completed, the influence range determination unit 130 determines the influence range of the failure of each device. The devices included in the failure influence range are searched according to the influence range search route illustrated in FIG. 16. Hereinafter, with reference to FIGS. 20 to 24, a search example of the influence range according to the influence range search route is described.

Figure 20:
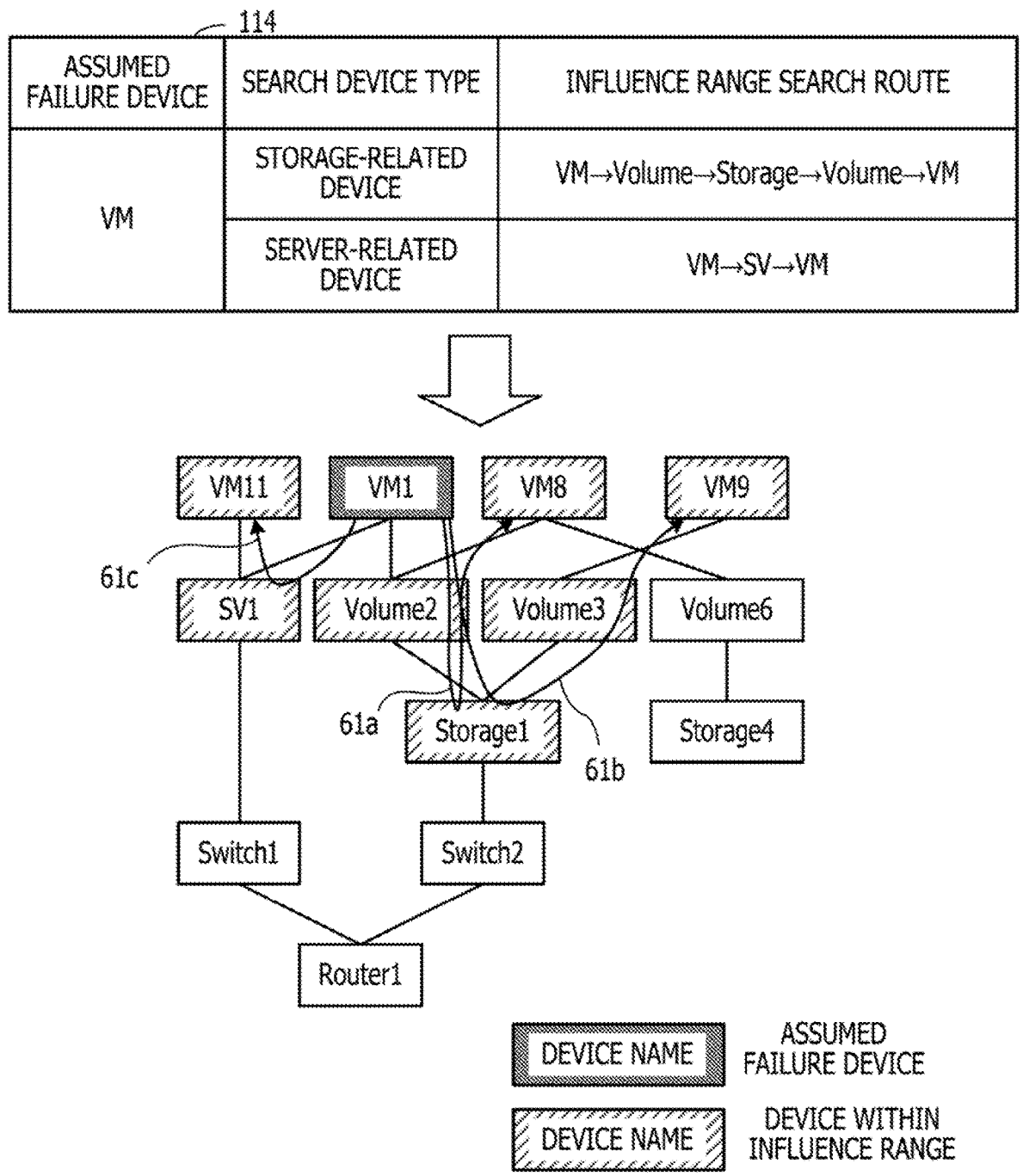
FIG. 20 illustrates a first example of influence range search.

FIG. 20 illustrates a first example of influence range search. FIG. 20 illustrates a search example of an influence range when the assumed failure device is the VM. When the assumed failure device is a VM, a storage-related device and a server-related device are searched for. The influence range search route in the search for the storage-related device is "VM→Volume→Storage→Volume→VM". This is an influence range search route to search for devices that share a storage, and devices that do not share the storage are not included in the influence range. The influence range search route in the search for the server-related device is "VM→SV→VM". This is an influence range search route to search for devices that share a physical server, and devices that do not share the physical server are not included in the influence range.

When the VM having the device name "VM1" is the assumed failure device, the influence range determination unit 130 searches for storage-related devices along routes 61a and 61b, and searches for server-related devices along a route 61c. The influence range determination unit 130 determines that the devices on the routes 61a to 61c are the devices in the influence range of "VM1". As may be seen from the route 61a, a route that passes through one device twice is allowed in the search for the influence range.

FIG. 21 illustrates a second example of influence range search. FIG. 21 illustrates a search example of an influence range when the assumed failure device is a volume. When the assumed failure device is a volume, a storage-related device is searched for. The influence range search route when the assumed failure device is a volume is "Volume→Storage→Volume→VM". This is an influence range search route to search for devices that share a storage, and devices that do not share the storage are not included in the influence range.

When the volume having the device name "Volume2" is the assumed failure device, the influence range determination unit 130 searches for storage-related devices along routes 62a and 62b. The influence range determination unit 130 determines that the devices on the routes 62a and 62b are the devices in the influence range of "Volume2". As may be seen from the route 62a, a route passing through the assumed failure device is allowed in the search for the influence range.

Figure 22:
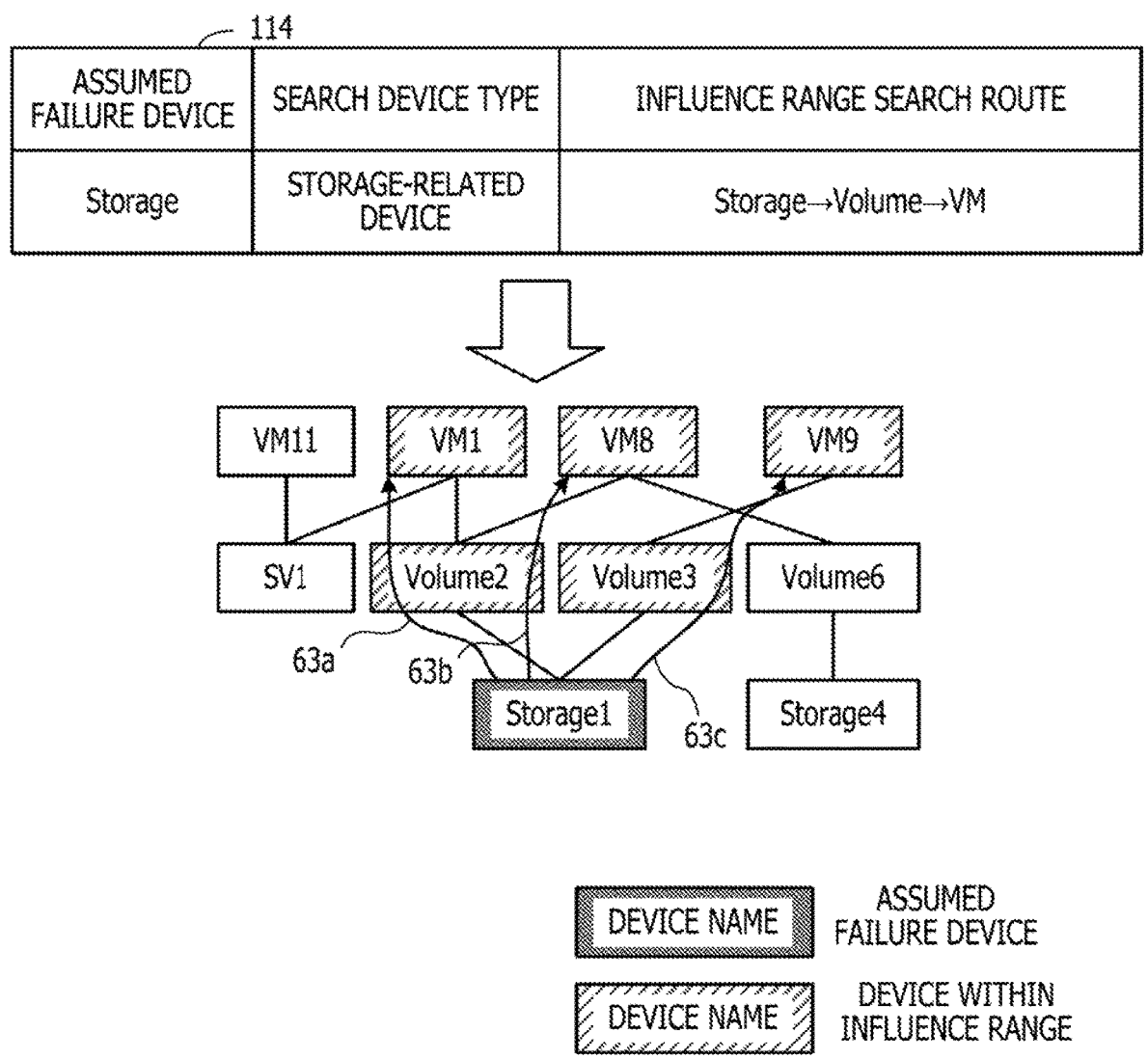
FIG. 22 illustrates a third example of influence range search.

FIG. 22 illustrates a third example of influence range search. FIG. 22 illustrates a search example of an influence range when the assumed failure device is a storage. When the assumed failure device is a storage, a storage-related device is searched for. The influence range search route when the assumed failure device is a storage is "Storage→Volume→VM". This is an influence range search route to search for devices that share a storage, and devices that do not share the storage are not included in the influence range.

When the storage having the device name "Storage1" is the assumed failure device, the influence range determination unit 130 searches for storage-related devices along routes 63a to 63c. The influence range determination unit 130 then determines that the devices on the routes 63a to 63c are the devices within the influence range of "Storage1".

Figure 23:
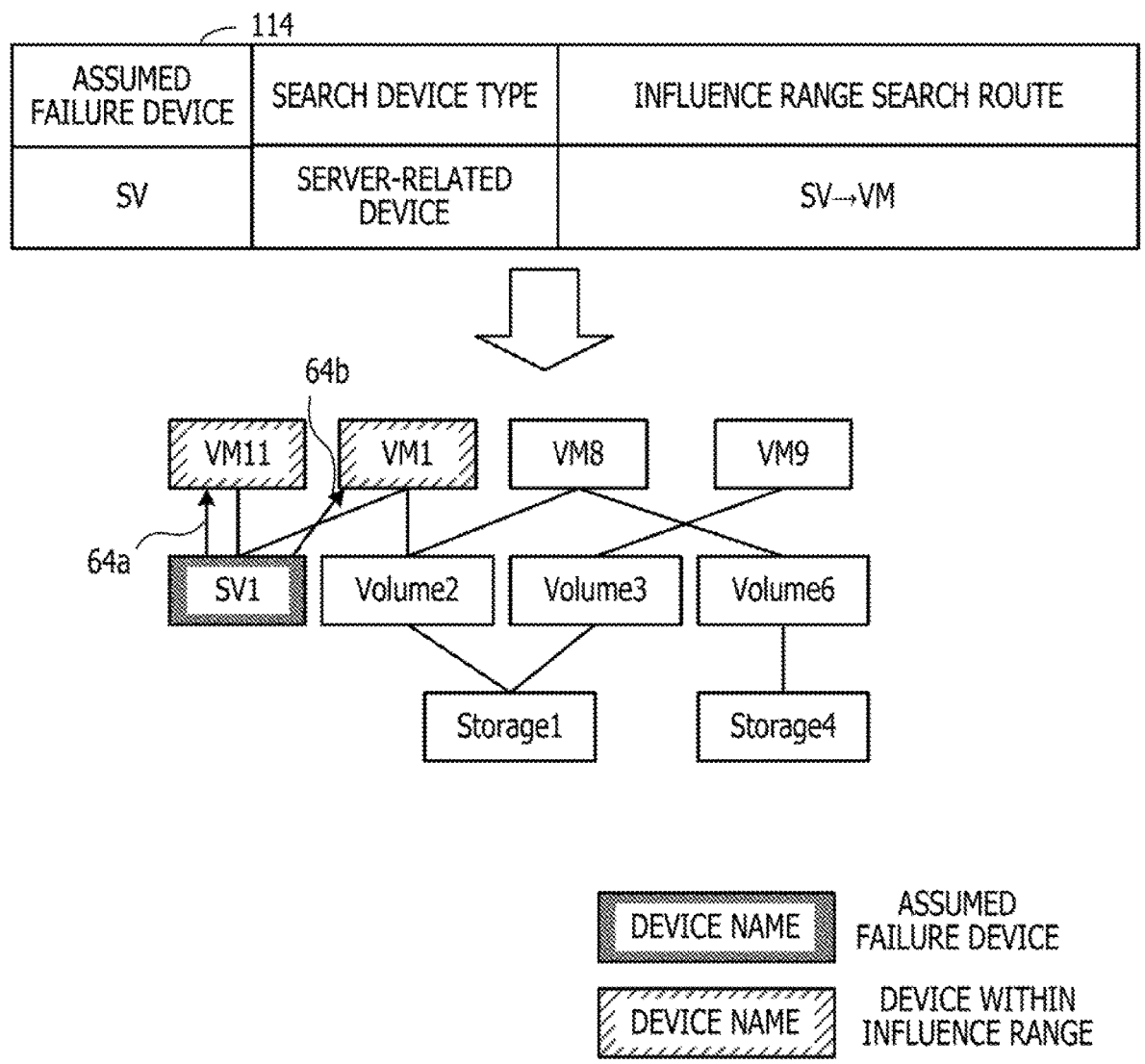
FIG. 23 illustrates a fourth example of influence range search.

FIG. 23 illustrates a fourth example of influence range search. FIG. 23 illustrates a search example of an influence range when the assumed failure device is a physical server (SV). When the assumed failure device is a physical server, a server-related device is searched for. The influence range search route when the assumed failure device is a physical server is "SV→VM". This is an influence range search route to search for devices that share a physical server, and devices that do not share the physical server are not included in the influence range.

When the physical server with the device name "SV1" is the assumed failure device, the influence range determination unit 130 searches for server-related devices along routes 64a and 64b. The influence range determination unit 130 then determines that the devices on the routes 64a and 64b are the devices within the influence range of "SV1".

Figure 24:
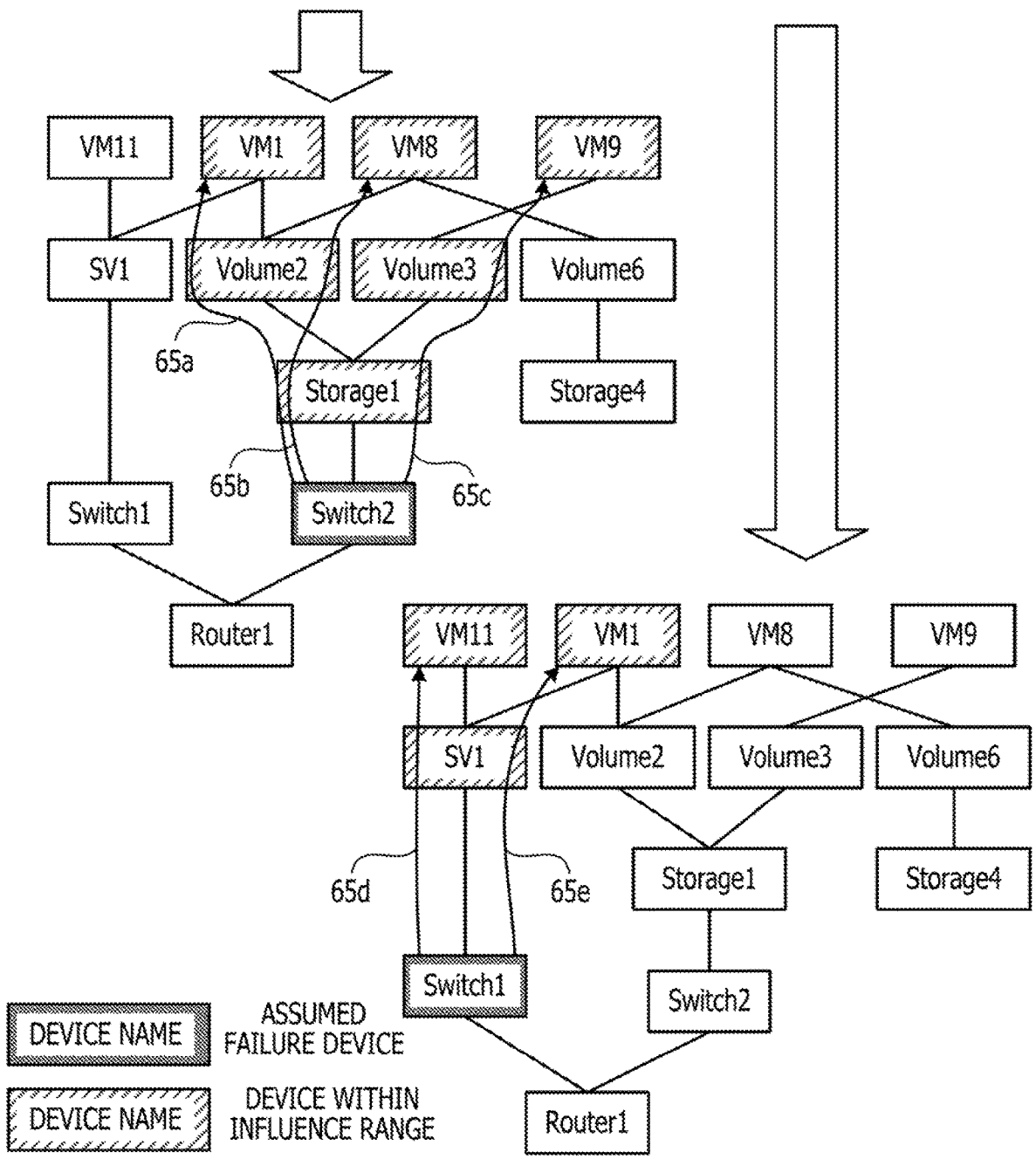
FIG. 24 illustrates a fifth example of influence range search.

FIG. 24 illustrates a fifth example of influence range search. FIG. 24 illustrates a search example of an influence range when the assumed failure device is a physical switch (Switch). When the assumed failure device is a physical switch, a storage-related device and a server-related device are searched for. The influence range search route in the search for the storage-related device is "Switch→Storage→Volume→VM". The influence range search route in the search for the server-related device is "Switch→SV→VM". These are influence range search routes to search for a device coupled through a storage coupled to a port different from a physical router or a physical server from a physical switch.

When the device with the device name "Switch2" is the assumed failure device, the influence range determination unit 130 searches for storage-related devices along routes 65a to 65c. The influence range determination unit 130 then determines that the devices on the routes 65a to 65c are the devices within the influence range of "Switch2". When the device with the device name "Switch1" is the assumed failure device, the influence range determination unit 130 searches for server-related devices along routes 65d and 65e. The influence range determination unit 130 then determines that the devices on the routes 65d and 65e are the devices within the influence range of "Switch1".

Figure 25:
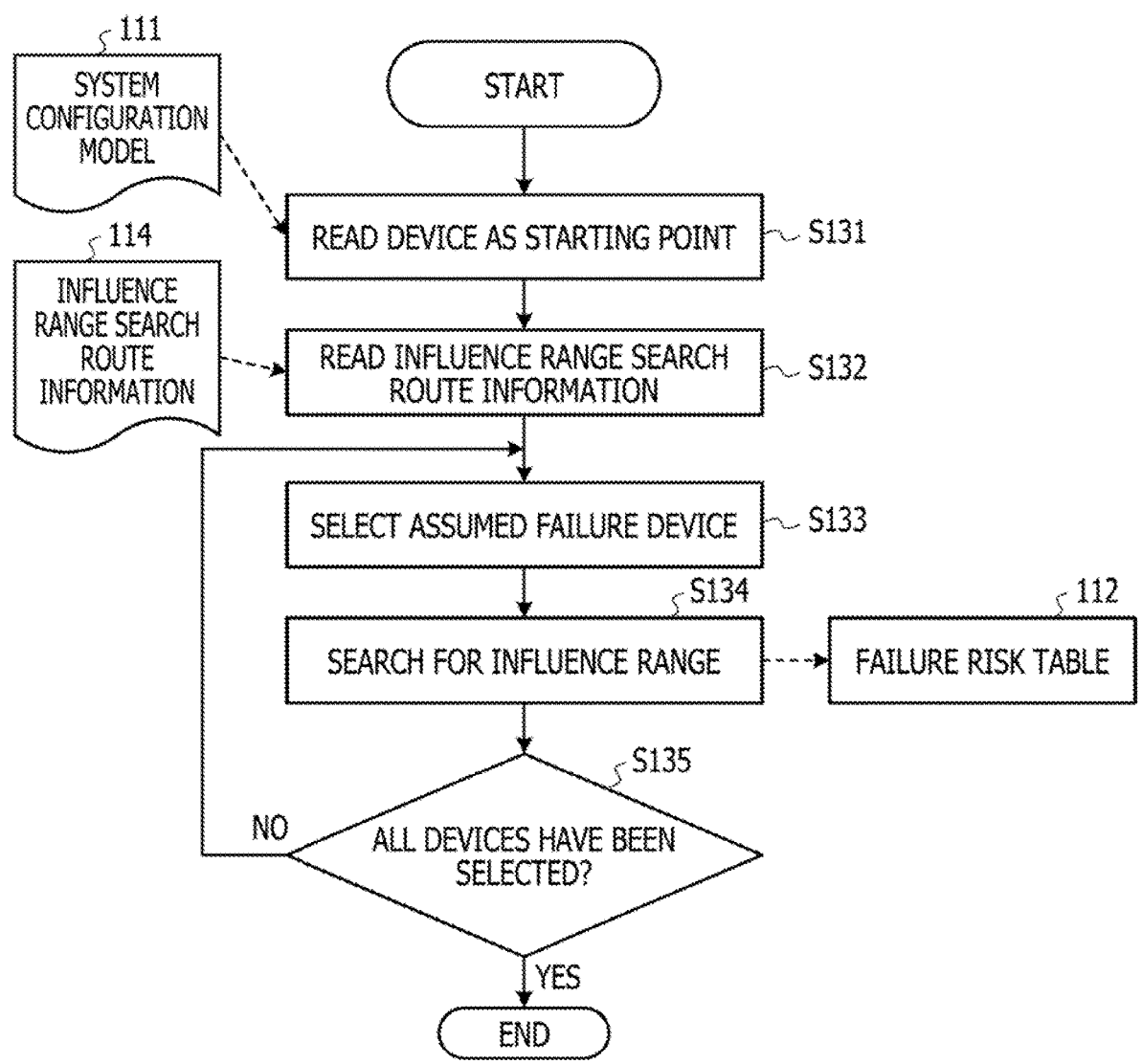
FIG. 25 is a flowchart illustrating an example of a procedure of influence range determination processing.

FIG. 25 is a flowchart illustrating an example of a procedure of influence range determination processing. The processing operations illustrated in FIG. 25 are described below in order of the step numbers.

[Step S131] The influence range determination unit 130 refers to the system configuration model 111 to read the device name and function (type) of the device (assumed failure device) that is the starting point of the influence range search. For example, the influence range determination unit 130 sets all devices depicted in the system configuration model 111 as assumed failure devices.

[Step S132] The influence range determination unit 130 reads the influence range search route for each device type from the influence range search route information 114.

[Step S133] The influence range determination unit 130 selects one assumed failure device yet to be selected.

[Step S134] The influence range determination unit 130 searches for the influence range of the selected assumed failure device according to the influence range search route corresponding to the device type. The influence range determination unit 130 sets the device name of the device determined to be within the influence range by the influence range search in the record corresponding to the device name of the selected device in the failure risk table 112.

[Step S135] The influence range determination unit 130 determines whether or not all the assumed failure devices have been selected. When all the devices have been selected, the influence range determination unit 130 terminates the influence range determination processing. When there is any device yet to be selected, the influence range determination unit 130 advances the processing to step S133.

The influence range of each device is thus determined. As a result, in the failure risk table 112, the failure risk value of each device and the device name of the device within the influence range when a failure occurs in the device are set. The influence risk calculation unit 140 detects an assumed failure device that affects the analysis target device, based on the information set in the failure risk table 112.

Figure 26:
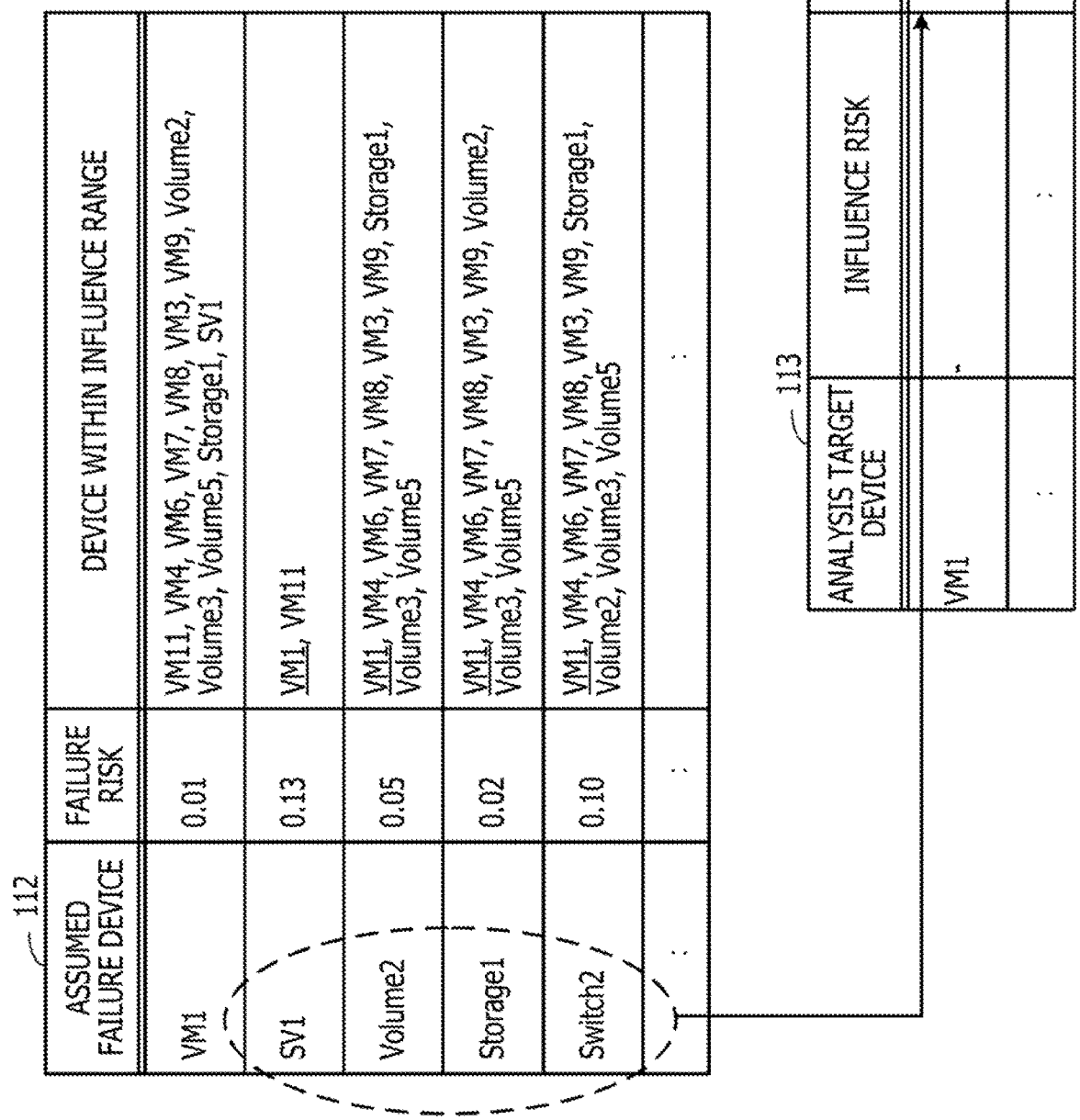
FIG. 26 illustrates an example of detecting an assumed failure device that affects an analysis target device.

FIG. 26 illustrates an example of detecting an assumed failure device that affects an analysis target device. For example, the influence risk calculation unit 140 extracts, for each analysis target device, the device name of the assumed failure device including the device in the influence range, from the failure risk table 112 and stores the device name in the influence risk table 113. Thus, a list of device names of other devices that may affect the analysis target device due to the failure is stored in the influence risk table 113.

For example, when the analysis target device is the device with the device name "VM1", the influence risk calculation unit 140 searches for "VM1" through the column of the devices in the influence range in the failure risk table 112. The influence risk calculation unit 140 registers in the influence risk table 113 the device names "SV1", "Volume2", "Storage1", and "Switch2" of the assumed failure devices including the device "VM1" in the influence range, in association with the analysis target device "VM1".

The assumed failure device that affects the analysis target device is thus extracted. The analysis target device having more assumed failure devices extracted is more likely to have a problem with the operation of the analysis target device due to the influence of the failure of another device.

Figure 27:
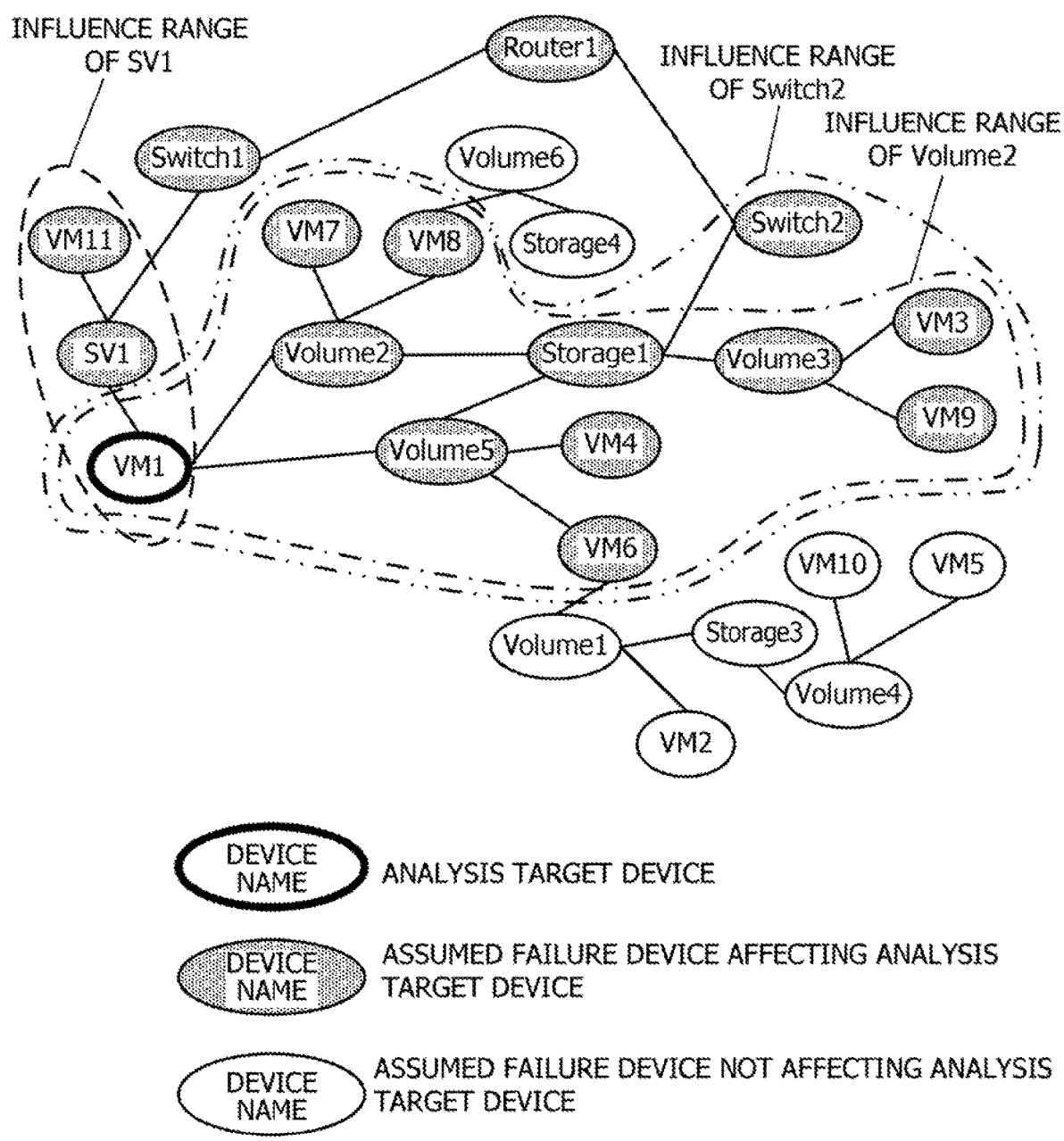
FIG. 27 illustrates an example of an analysis target device included in an influence range of a plurality of assumed failure devices.

FIG. 27 illustrates an example of an analysis target device included in an influence range of a plurality of assumed failure devices. In the example of FIG. 27, the device having the device name "VM1" is the analysis target device. There are a number of assumed failure devices that affect the analysis target device "VM1". For example, when the influence ranges of the assumed failure devices are overlapped, the influence ranges multiply overlap with each other at the position of the analysis target device "VM1". For example, the influence ranges of the assumed failure devices "SV1", "Switch2", and "Volume2" overlap with each other at the position of the analysis target device "VM1".

The influence risk calculation unit 140 calculates the influence risk of the analysis target device by reflecting the overlapping amount of the influence range of the assumed failure device at the position of the analysis target device.

Figure 28:
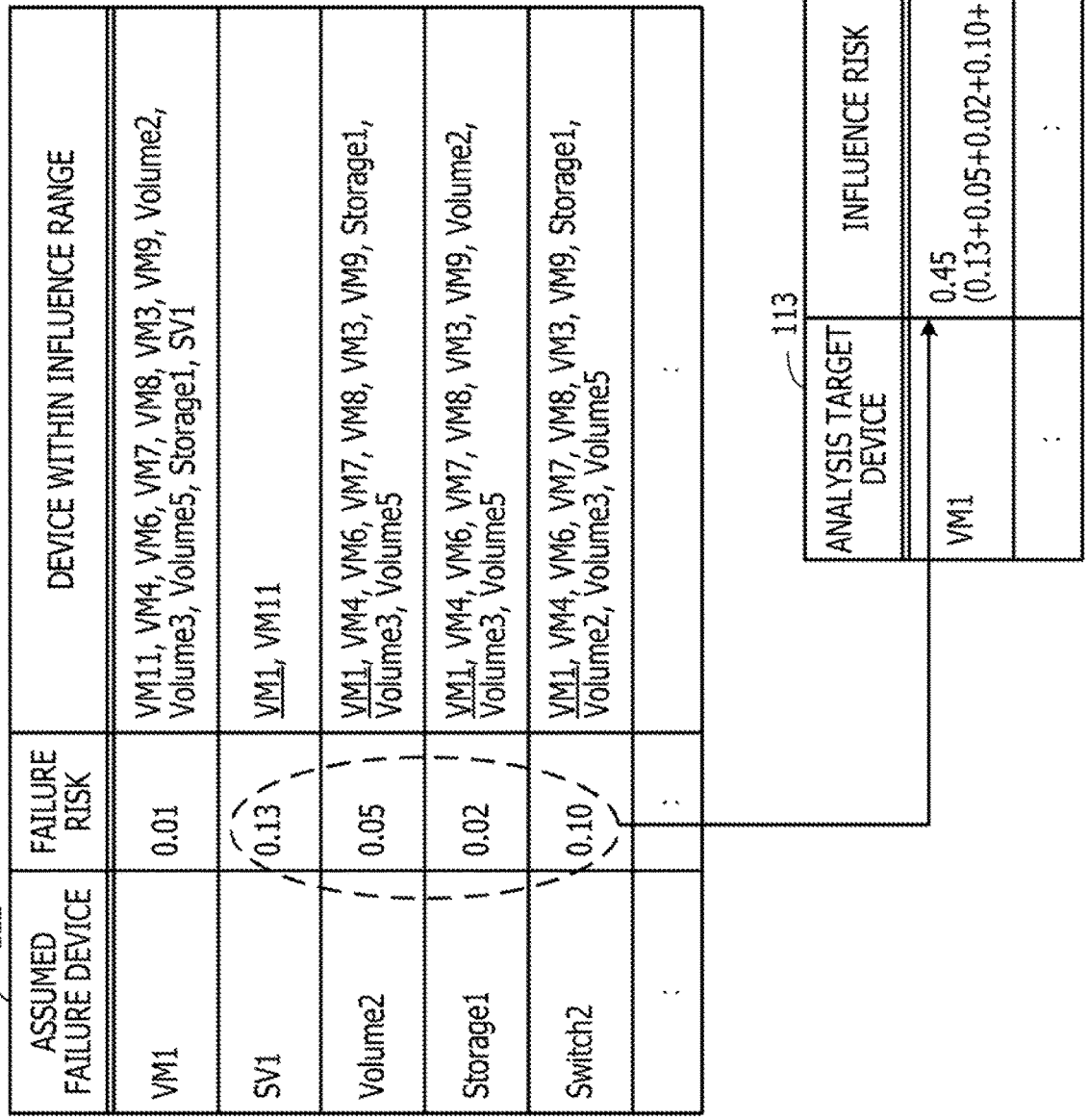
FIG. 28 illustrates a calculation example of an influence risk.

FIG. 28 illustrates a calculation example of an influence risk. For example, the influence risk calculation unit 140 sets, as the influence risk of the analysis target device, the sum of the failure risks of all the assumed failure devices including the analysis target device in the influence range. For example, the influence risk of the analysis target device is calculated by superposing the failure risks of all the devices that affect the analysis target device.

For example, when the analysis target device is the device with the device name "VM1", the influence risk calculation unit 140 adds the failure risk value of the assumed failure device including "VM1" in the influence range to the influence risk value of the analysis target device "VM1" in the influence risk table 113. In the example of FIG. 28, the influence risk calculation unit 140 sequentially adds the failure risk "0.13" of the device "SV1", the failure risk "0.05" of the device "Volume2", the failure risk "0.02" of the device "Storage1", and the failure risk "0.10" of the device "Switch2" as the influence risks.

The influence risk calculation unit 140 calculates the influence risk, for example, when there is an input specifying the analysis target device. The influence risk calculation unit 140 may regularly calculate the influence risk for all the devices and store the influence risks in the influence risk table 113.

Figure 29:
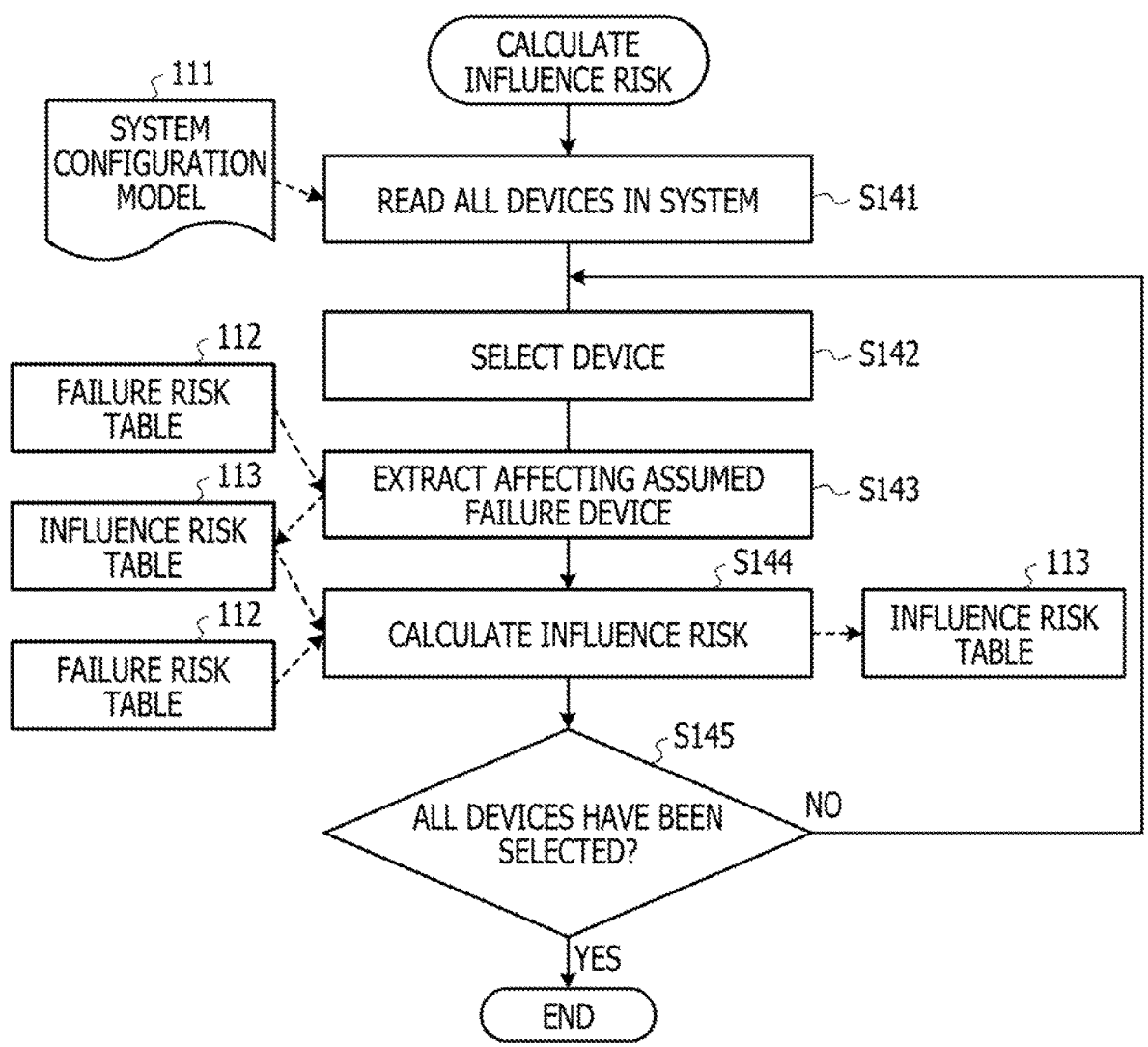
FIG. 29 is a flowchart illustrating an example of a procedure of influence risk calculation processing.

FIG. 29 is a flowchart illustrating an example of a procedure of influence risk calculation processing. The processing operations illustrated in FIG. 29 are described below in order of the step numbers.

[Step S141] The influence risk calculation unit 140 refers to the system configuration model 111 and reads the device names of all the devices in the system.

[Step S142] The influence risk calculation unit 140 selects one device yet to be selected as an analysis target device.

[Step S143] The influence risk calculation unit 140 extracts, from the failure risk table 112, a device name of an assumed failure device that affects the analysis target device. The influence risk calculation unit 140 registers the extracted device name in the influence risk table 113 in association with the device name of the analysis target device.

[Step S144] The influence risk calculation unit 140 calculates the influence risk of the analysis target device by referring to the failure risk table 112 and the influence risk table 113. For example, the influence risk calculation unit 140 extracts, from the influence risk table 113, the device names of the assumed failure devices, one by one, that affect the analysis target device. Next, the influence risk calculation unit 140 extracts a failure risk value corresponding to the extracted device name from the failure risk table 112. The influence risk calculation unit 140 adds the extracted failure risk value to the influence risk value of the analysis target device in the influence risk table 113. The influence risk calculation unit 140 terminates the calculation of the influence risk of the current analysis target device upon completion of the addition of the failure risk values of the assumed failure device affecting the analysis target device.

[Step S145] The influence risk calculation unit 140 determines whether or not all the devices have been selected. When all the devices have been selected, the influence risk calculation unit 140 terminates the influence risk calculation processing. When there is a device yet to be selected, the influence risk calculation unit 140 advances the processing to Step S142.

Thus, the influence risk of the analysis target device may be calculated. Although, in the example of FIG. 29, the influence risk when each device in the system is set as the analysis target device is calculated, the influence risk calculation unit 140 may limit the influence risk calculation target to the analysis target device designated by the administrator.

The risk analysis control unit 170 displays the calculation result of the influence risk of the analysis target device on the management terminal device 30. When referring to the calculation result of the influence risk and determining that the influence risk of the analysis target device is excessive, the administrator may notify the user using the analysis target device of the details of the risk.

For example, the administrator notifies the user that the influence risk of the device used by the user has become higher than the value (threshold) set by the administrator, and presents a method of reducing the influence risk (such as a new model and a new contract proposal) to the user. The influence risk calculation unit 140 may be normalized so that the maximum value of the influence risk is "1". This makes it easier for the administrator to set the threshold.

When the influence risk of the analysis target device exceeds the threshold, the administrator may also move the analysis target device to a physical server with reduced influence risk. For example, when the influence risk of the important device due to a contract or the like becomes larger than the set value (threshold), the important device is moved to the physical server where the influence risk is set lower than the threshold at the administrator's determination.

For example, when determining to move the analysis target device, the administrator instructs the managing server 100 to determine the recommended destination. The managing server 100 sets a temporary VM, calculates the influence risk of the VM in advance, and displays the calculation result on the screen of the management terminal device 30. Thus, the administrator may confirm the influence risk after the movement before actually moving the device, and may move the device to the physical server where the influence risk is reliably reduced.

Figure 30:
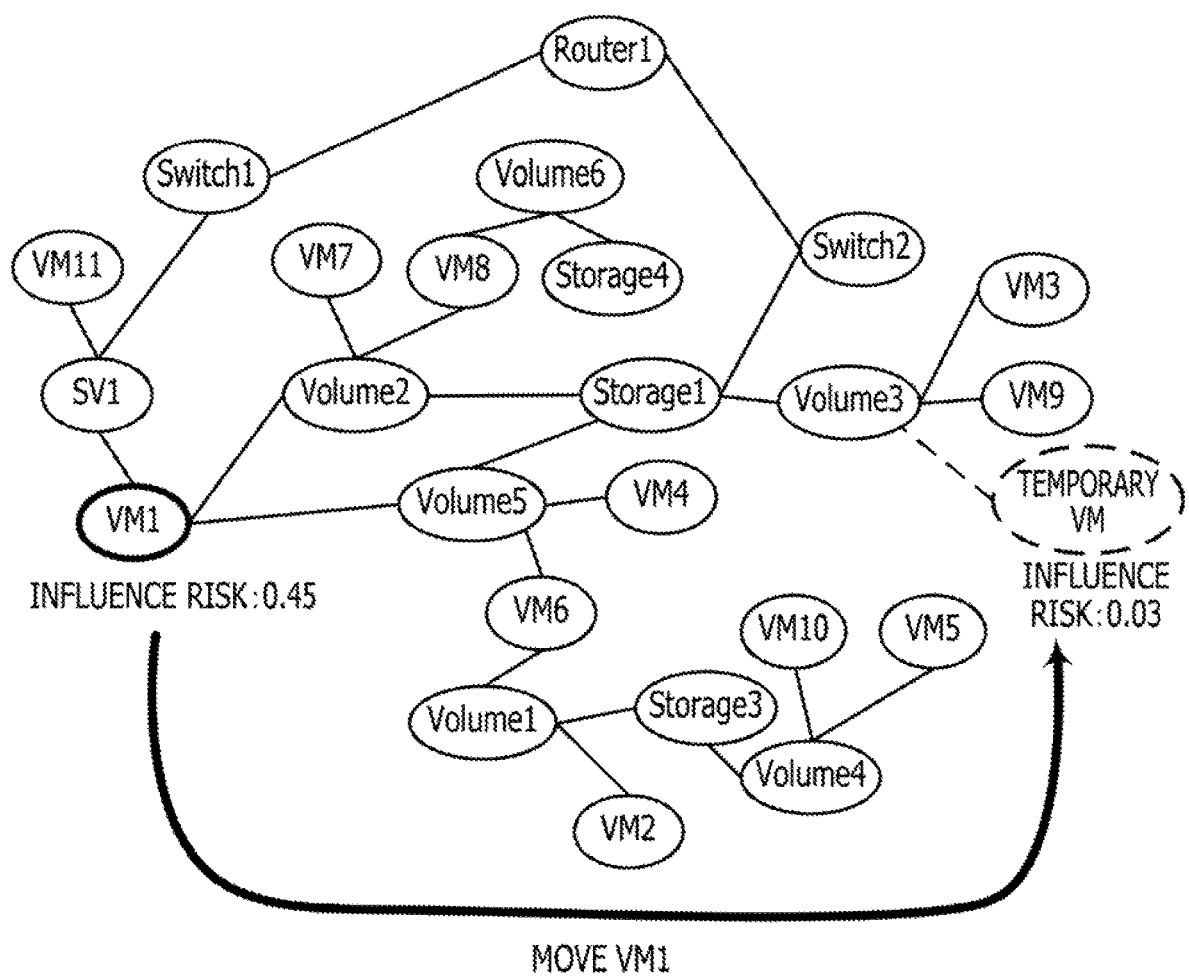
FIG. 30 illustrates an example of moving a device having a high influence risk.

FIG. 30 illustrates an example of moving a device having a high influence risk. In the example of FIG. 30, the device having the device name "VM1" has an influence risk of "0.45". When moving the device "VM1", the managing server 100 searches for a position where a temporary VM is defined and the influence risk is reduced when the device is moved by locating the temporary VM at various positions. In the example of FIG. 30, the position where the influence risk is "0.03" is detected. When the administrator determines that the device "VM1" may be moved to the position where the influence risk is "0.03" and inputs an instruction to move the device, the device "VM1" is moved to the position of the temporary VM under the control of the managing server 100.

When the influence risk becomes larger than the value (threshold) set in the preset device, the managing server 100 may automatically move the device to a physical server that reduces the influence risk.

By moving the devices as described above, a system with low influence risk is constructed. For example, calculating the influence risk in advance by the temporary VM before the system is reconstructed may ensure construction of a system with low influence risk of the important device. It is also possible to construct a system that reduces the average influence risk of the devices in the entire system.

The managing server 100 may determine a position where the influence risk of the temporary VM is minimized, for example, as the recommended destination. The managing server 100 may calculate the influence risk while changing the position of the temporary VM until the threshold (for example, 80%) set by the administrator is lower than the current influence risk, and, when a position where the influence risk is set lower than the threshold is detected, may set the position as the recommended destination. When the position of the temporary VM that satisfies the conditions for setting the recommended destination may not be detected, the managing server 100 may notify the administrator that the recommended destination may not be detected and may prompt resetting of the threshold.

The important device among the devices in the system may be determined based on the importance calculated for each device, for example. For example, the management terminal device 30 or the managing server 100 selects one of various importance indices and determines a device having the importance index not less than a predetermined value as the important device that reduces the influence risk. The management terminal device 30 or the managing server 100 may use the sum of the values of the various importance indices as the importance of the device. The following example is conceivable as a method of calculating the importance.

As a first importance calculation method, a method of setting the contracted usage amount in stages is conceivable. For example, the administrator uses the management terminal device 30 or the managing server 100 to evaluate the monthly usage amount on a five-point scale. The administrator then sets the importance higher for the device used by a customer with higher usage amount, in the management terminal device 30 or the managing server 100.

As a second importance calculation method, a method of setting importance is conceivable, assuming that similar damage amount may occur for devices used by customers of the same type of business and customer scale based on the type of business, customer scale, and damage amount of the past failure cases. For example, the administrator uses the management terminal device 30 or the managing server 100 to calculate the type of business, the customer scale, and the damage amount thereof in the past failure case. The administrator then sets the importance higher for the device used by a customer with a large damage amount and a customer with the same type of business or the same customer scale, in the management terminal device 30 or the managing server 100.

As a third importance calculation method, a method of setting the importance depending on whether the environment is a development environment or a production environment that is actually used by a customer is conceivable. For example, the administrator sets the importance higher for the device used in the production environment than for the device used in the development environment, in the management terminal device 30 or the managing server 100.

As a fourth importance calculation method, a method of adding a function of automatically calculating the number of higher-level devices coupled to each device and setting the importance according to the number of the coupled devices is conceivable. For example, the administrator evaluates the number of the coupled devices on a five-point scale and sets the importance higher for the device having more devices coupled thereto, in the management terminal device 30 or the managing server 100.

As a fifth importance calculation method, a method of setting the importance depending on the type of business of the customer who uses the device is conceivable. For example, the administrator sets the importance higher for the device used by a customer in the type of business with higher social importance such as a bank than for the device used by a customer in any other type of business, in the management terminal device 30 or the managing server 100.

Hereinafter, destination determination processing is described in detail.

Figure 31:
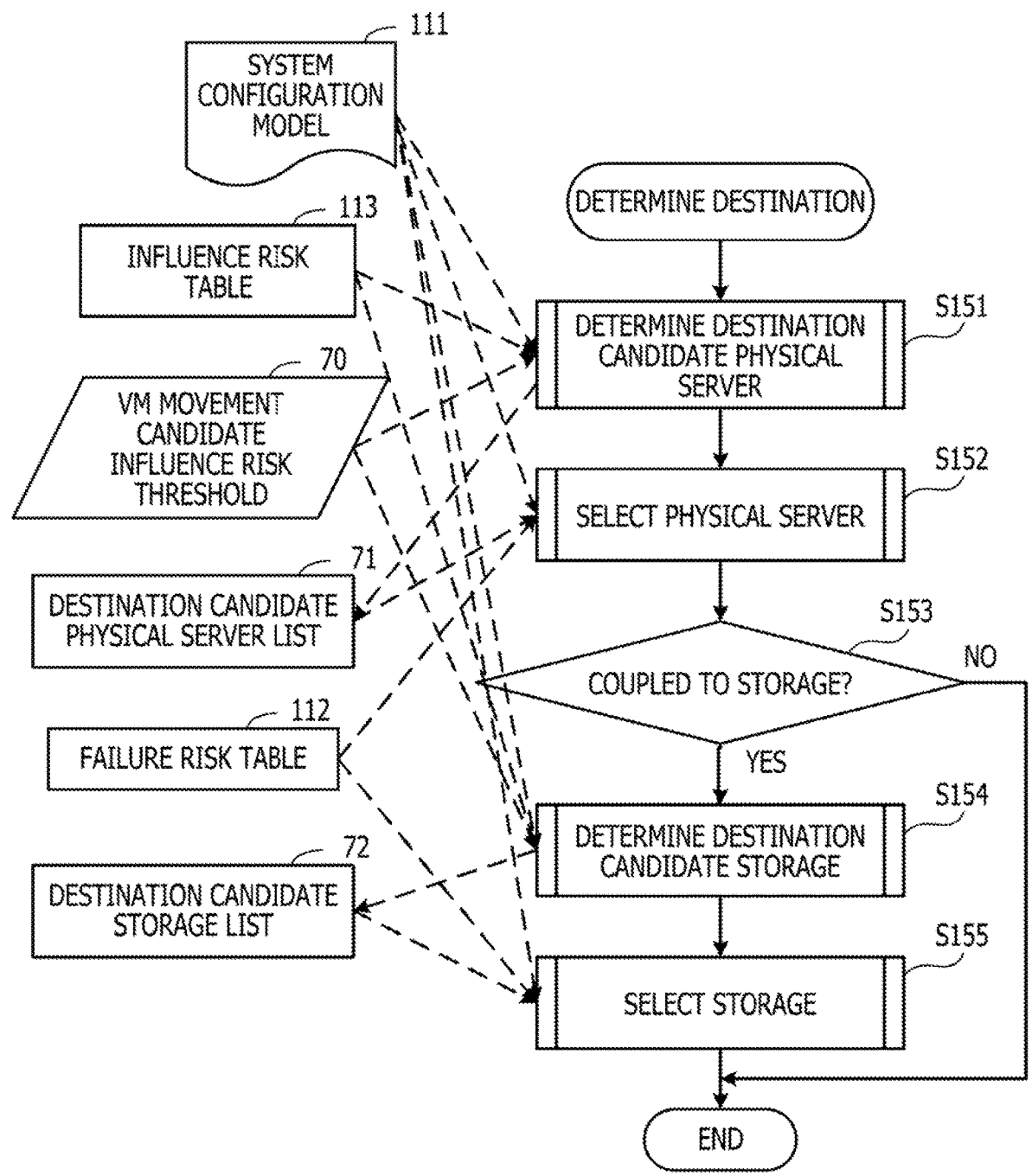
FIG. 31 is a flowchart illustrating an example of a procedure of destination determination processing.

FIG. 31 is a flowchart illustrating an example of a procedure of destination determination processing. The processing operations illustrated in FIG. 31 are described below in order of the step numbers.

[Step S151] The destination determination unit 150 determines a destination candidate physical server that may be set as a destination of the analysis target device based on the system configuration model 111, the influence risk table 113, and the VM movement candidate influence risk threshold 70. The VM movement candidate influence risk threshold 70 is a specified value in advance by the administrator. For example, when the administrator inputs the VM movement candidate influence risk threshold 70 and performs a recommended destination determination instruction operation to the management terminal device 30, the management terminal device 30 transmits a VM recommended destination determination request including the VM movement candidate influence risk threshold 70 to the managing server 100. The destination determination unit 150 sets the device name of the determined physical server in the destination candidate physical server list 71. The destination candidate physical server determination processing is described in detail later (see FIG. 32).

[Step S152] The destination determination unit 150 selects a physical server to be the recommended destination, based on the destination candidate physical server list 71 and the failure risk table 112. The physical server selection processing is described in detail later (see FIG. 34).

[Step S153] The destination determination unit 150 determines whether or not the analysis target device is coupled to the storage. When the analysis target device is coupled to the storage, the destination determination unit 150 advances the processing to step S154. When the analysis target device is not coupled to the storage, the destination determination unit 150 terminates the destination determination processing.

[Step S154] The destination determination unit 150 determines a destination candidate storage that may be set as a destination of the analysis target device, based on the system configuration model 111, the influence risk table 113, and the VM movement candidate influence risk threshold 70. The destination determination unit 150 sets the device name of the determined storage in the destination candidate storage list 72. The destination candidate storage determination processing is described in detail later (see FIG. 36).

[Step S155] The destination determination unit 150 selects a storage to be the recommended destination, based on the destination candidate storage list 72 and the failure risk table 112. The storage selection processing is described in detail later (see FIG. 38).

Next, destination candidate physical server determination processing is described in detail.

Figure 32:
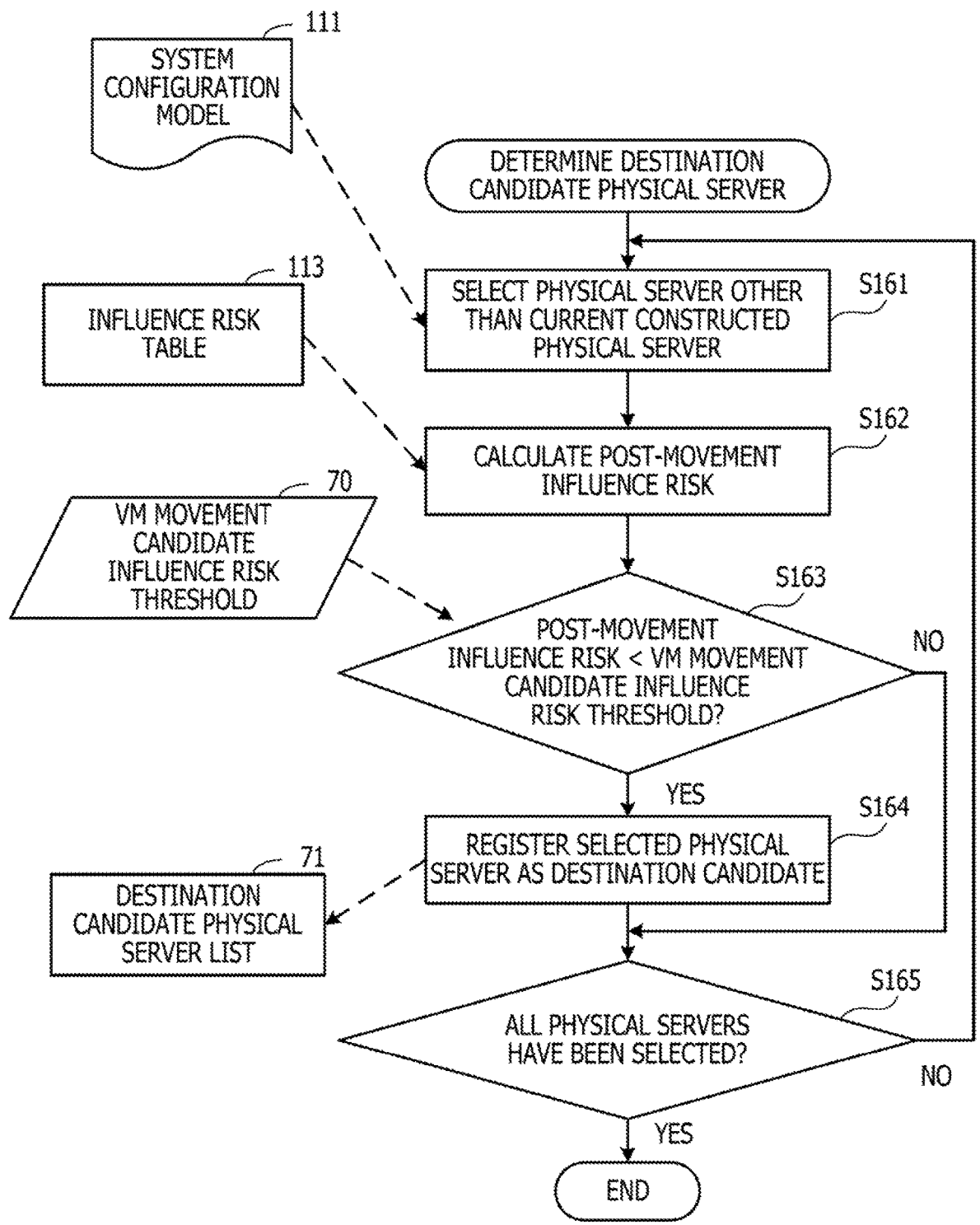
FIG. 32 is a flowchart illustrating an example of a procedure of destination candidate physical server determination processing.

FIG. 32 is a flowchart illustrating an example of a procedure of destination candidate physical server determination processing. The processing operations illustrated in FIG. 32 are described below in order of the step numbers.

[Step S161] The destination determination unit 150 refers to the system configuration model 111 to select one physical server yet to be selected from among the physical servers other than the current constructed physical server of the analysis target device.

[Step S162] The destination determination unit 150 refers to the influence risk table 113 to calculate the influence risk (post-movement influence risk) when the analysis target device is constructed in the selected physical server. For example, the destination determination unit 150 defines a temporary VM constructed in the selected physical server. The destination determination unit 150 then executes the same processing as steps S143 and S144 of the influence risk processing illustrated in FIG. 29, and calculates the influence risk of the temporary VM. The influence risk of the temporary VM is the post-movement influence risk.

[Step S163] The destination determination unit 150 determines whether or not the post-movement influence risk is less than a VM movement candidate influence risk threshold 70. When the post-movement influence risk is less than the VM movement candidate influence risk threshold 70, the destination determination unit 150 advances the processing to step S164. When the post-movement influence risk is not less than the VM movement candidate influence risk threshold 70, the destination determination unit 150 advances the processing to step S165.

[Step S164] The destination determination unit 150 registers the device name of the selected physical server and the post-movement influence risk, as a destination candidate, in the destination candidate physical server list 71.

[Step S165] The destination determination unit 150 determines whether or not all the physical servers other than the physical server having the analysis target device constructed therein have been selected. When all the physical servers other than the analysis target device have been selected, the destination determination unit 150 terminates the destination candidate physical server determination processing. When there is any physical server yet to be selected, the destination determination unit 150 advances the processing to step S161.

The destination candidate physical server list 71 corresponding to the analysis target device is thus generated.

Figure 33:
FIG. 33 illustrates an example of a destination candidate physical server list.

FIG. 33 illustrates an example of the destination candidate physical server list. The destination candidate physical server list 71 is provided with a destination candidate physical server column and a post-movement influence risk column. The device name of the physical server determined to be the destination candidate physical server is set in the destination candidate physical server column. The post-movement influence risk when the analysis target device is moved to the destination candidate physical server is set in the post-movement influence risk column. The destination candidate physical server list 71 is stored in the memory 102, for example, by the destination determination unit 150.

The destination determination unit 150 selects a physical server recommended as a destination from among the destination candidate physical server list 71.

Figure 34:
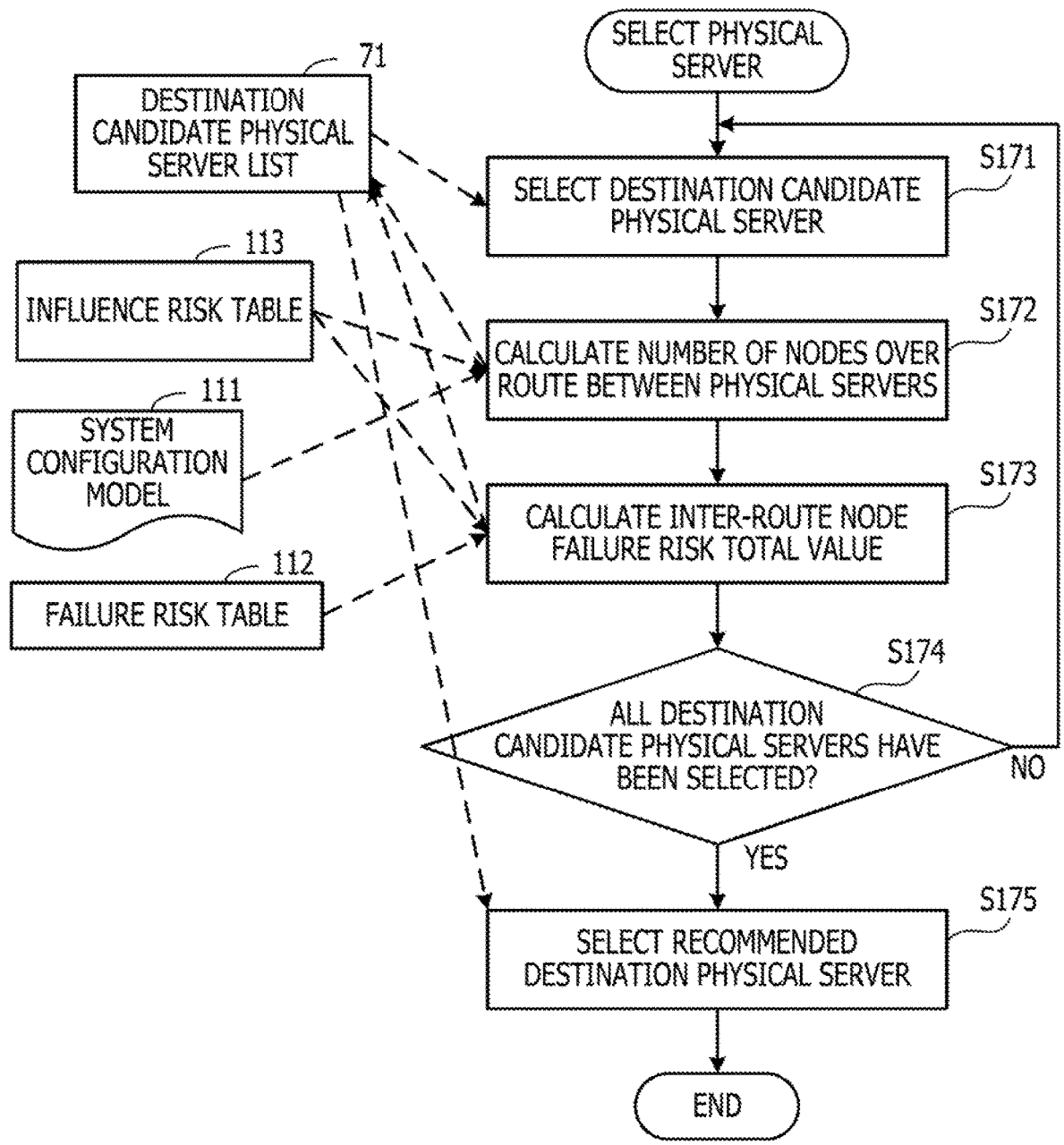
FIG. 34 is a flowchart illustrating an example of a procedure of physical server selection processing.

FIG. 34 is a flowchart illustrating an example of a procedure of physical server selection processing. The processing operations illustrated in FIG. 34 are described below in order of the step numbers.

[Step S171] The destination determination unit 150 selects one destination candidate physical server yet to be selected, from among the destination candidate physical server list 71.

[Step S172] The destination determination unit 150 calculates the number of nodes on the route between the physical server having the analysis target device constructed therein and the selected destination candidate physical server. For example, the destination determination unit 150 determines the constructed physical server of the analysis target device based on the influence risk table 113. The destination determination unit 150 refers to the system configuration model 111, and traces the shortest coupling relationship from the constructed physical server to the selected destination candidate physical server to count the number of nodes (devices) on the traced route. The destination determination unit 150 sets the calculated number of nodes in the destination candidate physical server list 71 in association with the selected destination candidate physical server.

[Step S173] The destination determination unit 150 refers to the failure risk table 112, and calculates the sum of failure risks (inter-route node failure risk total value) of the nodes (devices) on the route between the physical server having the analysis target device constructed therein and the selected destination candidate physical server. The destination determination unit 150 sets the calculated inter-route node failure risk total value in the destination candidate physical server list 71 in association with the selected destination candidate physical server.

[Step S174] The destination determination unit 150 determines whether or not all the destination candidate physical servers have been selected. When all the destination candidate physical servers have been selected, the destination determination unit 150 advances the processing to step S175. When there is any destination candidate physical server yet to be selected, the destination determination unit 150 advances the processing to step S171.

[Step S175] The destination determination unit 150 refers to the destination candidate physical server list 71, and selects the recommended destination physical server based on the post-movement influence risk of each destination candidate physical server, the number of inter-route nodes, and the inter-route node failure risk total value.

FIG. 35 illustrates an example of selecting a recommended destination physical server. FIG. 35 illustrates an example of selecting a recommended destination physical server for the analysis target device "VM1". In the destination candidate physical server list 73, the number of inter-route nodes and the inter-route node failure risk total value are additionally registered for each destination candidate physical server.

The destination determination unit 150 selects a destination candidate physical server having the smallest number of inter-route nodes as the first selection criterion, for example. When there is more than one destination candidate physical server that meets the first selection criterion, the destination determination unit 150 selects, as the second selection criterion, a destination candidate physical server having the smallest inter-route node failure risk total value from among the plurality of destination candidate physical servers that meet the first selection criterion. When there is more than one destination candidate physical server that meets the second selection criterion, the destination determination unit 150 selects, as the third selection criterion, the destination candidate physical server having the smallest post-movement influence risk from among the plurality of destination candidate physical servers that meet the second selection criterion. The order of the first to third selection criteria may be accordingly changed by the administrator such that, for example, first, the post-movement influence risk is the smallest, second, the inter-route node failure risk total value is the smallest, and, third, the number of inter-route nodes is the smallest.

In the example of FIG. 35, as the destination candidate physical servers that meet the first selection criterion, there are two destination candidate physical servers "SV11" and "SV21" having the number of inter-route nodes of "6". The inter-route node failure risk total value of the destination candidate physical server "SV11" is "0.015", which is smaller than the inter-route node failure risk total value "0.021" of the destination candidate physical server "SV21". Therefore, the destination determination unit 150 selects the destination candidate physical server "SV11" as the recommended destination physical server.

Next, destination candidate storage determination processing is described in detail.

Figure 36:
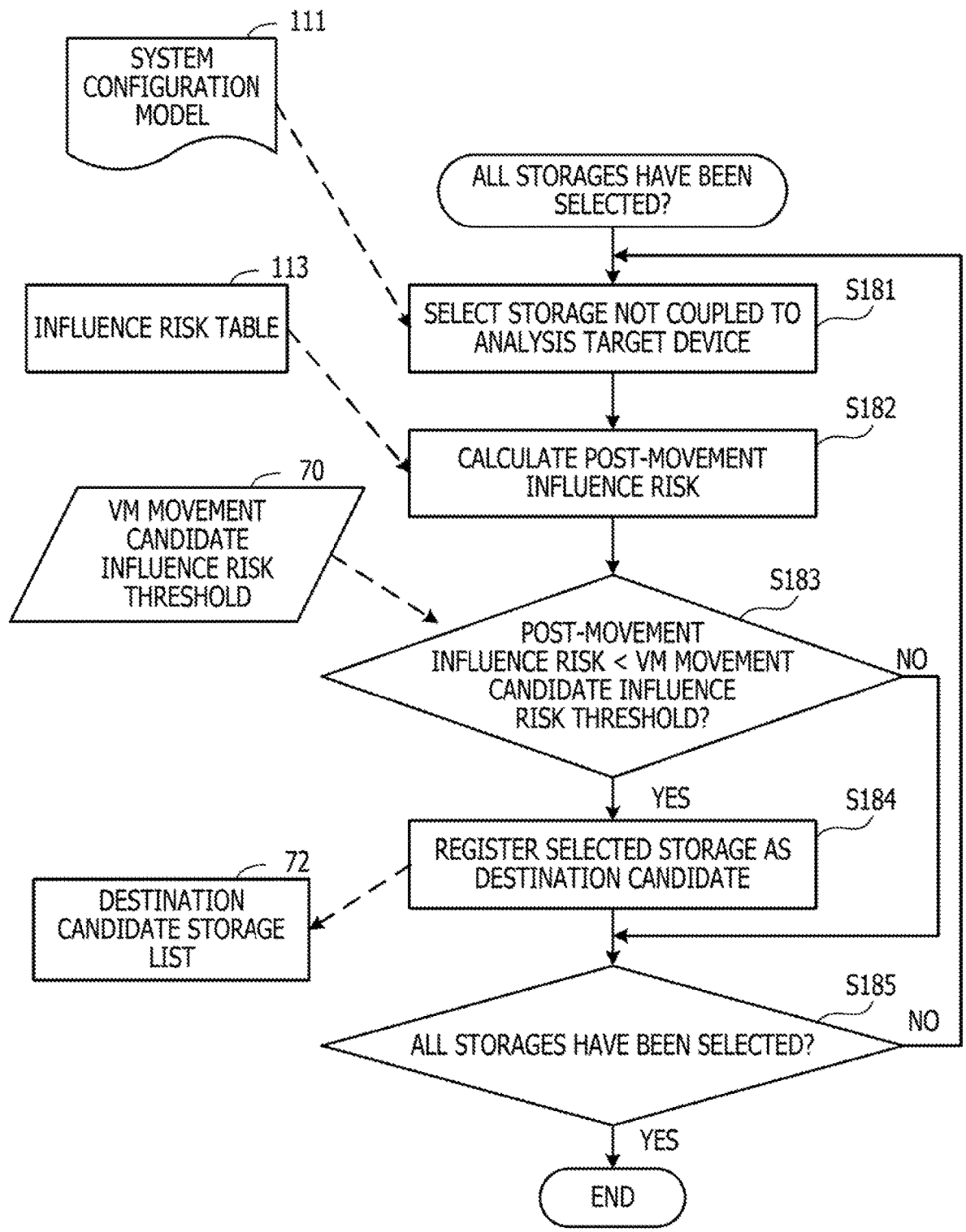
FIG. 36 is a flowchart illustrating an example of a procedure of destination candidate storage determination processing.

FIG. 36 is a flowchart illustrating an example of a procedure of destination candidate storage determination processing. The processing operations illustrated in FIG. 36 are described below in order of the step numbers.

[Step S181] The destination determination unit 150 refers to the system configuration model 111 and selects one storage yet to be selected from among the storages other than the storage coupled to the analysis target device.

[Step S182] The destination determination unit 150 refers to the influence risk table 113 and calculates the influence risk (post-movement influence risk) when the analysis target device is coupled to the selected storage. For example, the destination determination unit 150 defines a temporary VM coupled to the selected storage. The destination determination unit 150 then executes the same processing as steps S143 and S144 of the influence risk processing illustrated in FIG. 29, and calculates the influence risk of the temporary VM. The influence risk of the temporary VM is the post-movement influence risk.

[Step S183] The destination determination unit 150 determines whether or not the post-movement influence risk is less than a VM movement candidate influence risk threshold 70. When the post-movement influence risk is less than the VM movement candidate influence risk threshold 70, the destination determination unit 150 advances the processing to Step S184. When the post-movement influence risk is not less than the VM movement candidate influence risk threshold 70, the destination determination unit 150 advances the processing to Step S185.

[Step S184] The destination determination unit 150 registers the device name and the post-movement influence risk of the selected storage in the destination candidate storage list 72 as destination candidates.

[Step S185] The destination determination unit 150 determines whether or not all the storages other than the analysis target device have been selected. When all the storages other than the storages coupled to the analysis target device have been selected, the destination determination unit 150 terminates the destination candidate storage determination processing. When there is any storage yet to be selected, the destination determination unit 150 advances the processing to Step S181.

The destination candidate storage list 72 corresponding to the analysis target device is thus generated.

Figure 37:
FIG. 37 illustrates an example of a destination candidate storage list.

FIG. 37 illustrates an example of the destination candidate storage list. The destination candidate storage list 72 is provided with a destination candidate storage column and a post-movement influence risk column. In the destination candidate storage column, the device name of the storage determined as the destination candidate storage is set. In the post-movement influence risk column, the post-movement influence risk when the analysis target device is coupled to the destination candidate storage is set. The destination candidate storage list 72 is stored in the memory 102, for example, by the destination determination unit 150.

The destination determination unit 150 selects a storage recommended as a destination from among the destination candidate storage list 72.

Figure 38:
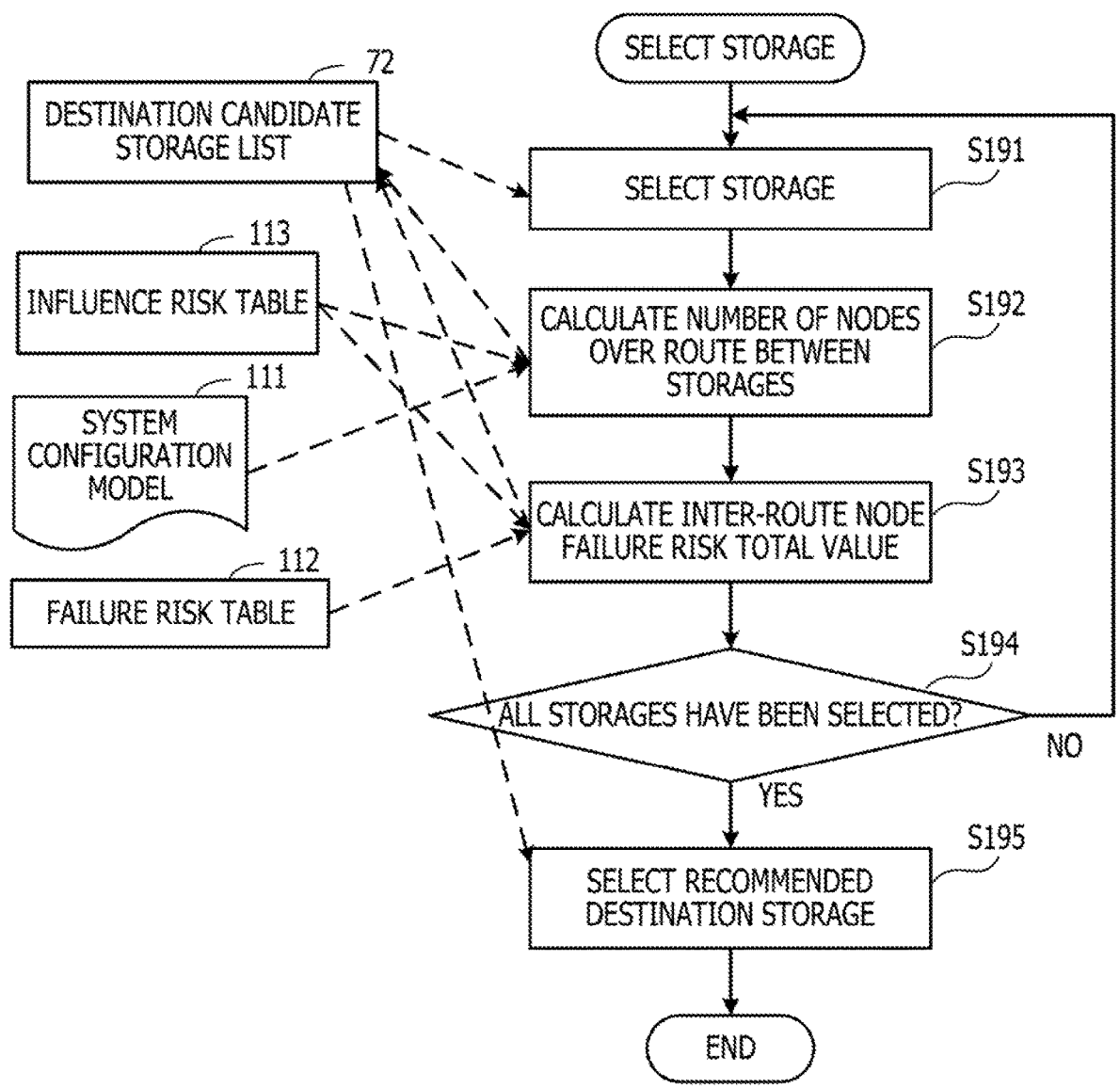
FIG. 38 is a flowchart illustrating an example of a procedure of storage selection processing.

FIG. 38 is a flowchart illustrating an example of a procedure of storage selection processing. The processing operations illustrated in FIG. 38 are described below in order of the step numbers.

[Step S191] The destination determination unit 150 selects one destination candidate storage yet to be selected from the destination candidate storage list 72.

[Step S192] The destination determination unit 150 calculates the number of nodes on the route between the storage having the analysis target device constructed therein and the selected destination candidate storage. For example, the destination determination unit 150 determines the storage coupled to the analysis target device based on the influence risk table 113. The destination determination unit 150 refers to the system configuration model 111, and traces the shortest coupling relationship from the storage coupled to the analysis target device to the selected destination candidate storage to count the number of nodes (devices) on the traced route. The destination determination unit 150 sets the calculated number of nodes in the destination candidate storage list 72 in association with the selected destination candidate storage.

[Step S193] The destination determination unit 150 refers to the failure risk table 112 to calculate the sum of failure risks (inter-route node failure risk total value) of the nodes (devices) on the route between the storage coupled to the analysis target device and the selected destination candidate storage. The destination determination unit 150 sets the calculated inter-route node failure risk total value in the destination candidate storage list 72 in association with the selected destination candidate storage.

[Step S194] The destination determination unit 150 determines whether or not all the destination candidate storages have been selected. When all the destination candidate storages have been selected, the destination determination unit 150 advances the processing to step S195. When there is any destination candidate storage yet to be selected, the destination determination unit 150 advances the processing to step S191.

[Step S195] The destination determination unit 150 refers to the destination candidate storage list 72 to select the recommended destination storage based on the post-movement influence risk of each destination candidate storage, the number of inter-route nodes, and the inter-route node failure risk total value.

FIG. 39 illustrates an example of selecting a recommended destination storage. FIG. 39 illustrates an example of selecting a recommended destination storage of the analysis target device "VM1". In the destination candidate storage list 74, the number of inter-route nodes and the inter-route node failure risk total value are additionally registered for each destination candidate storage.

The destination determination unit 150 selects a destination candidate storage with the smallest number of inter-route nodes as the first selection criterion, for example. When there is more than one destination candidate storage that meets the first selection criterion, the destination determination unit 150 selects, as the second selection criterion, a destination candidate storage having the smallest inter-route node failure risk total value from among the plurality of destination candidate storages that meet the first selection criterion. When there is more than one destination candidate storage that meets the second selection criterion, the destination determination unit 150 selects, as the third selection criterion, the destination candidate storage having the smallest post-movement influence risk from among the plurality of destination candidate storages that meet the second selection criterion. The order of the first to third selection criteria may be accordingly changed by the administrator such that, for example, first, the post-movement influence risk is the smallest, second, the inter-route node failure risk total value is the smallest, and, third, the number of inter-route nodes is the smallest.

In the example of FIG. 39, as the destination candidate storages that meet the first criterion, there are two destination candidate storages "Storage11" and "Storage21" having the number of inter-route nodes of "6". The post-movement influence risk of the destination candidate storage "Storage11" is "0.12", which is smaller than the post-movement influence risk "0.20" of the destination candidate storage "Storage21". Therefore, the destination determination unit 150 selects the destination candidate storage "Storage11" as the recommended destination storage.

Once the recommended destination physical server and the recommended destination storage are determined, the risk analysis control unit 170 causes the management terminal device 30 to move the VM to the recommended destination physical server and to display the influence risk when the VM is coupled to the recommended destination storage. When the administrator performs an operation of instructing to move the VM, a request to move the VM is transmitted from the management terminal device 30 to the managing server. In the managing server 100, the VM moving unit 160 executes processing of moving the VM that is the analysis target device in response to the request to move the VM.

Figure 40:
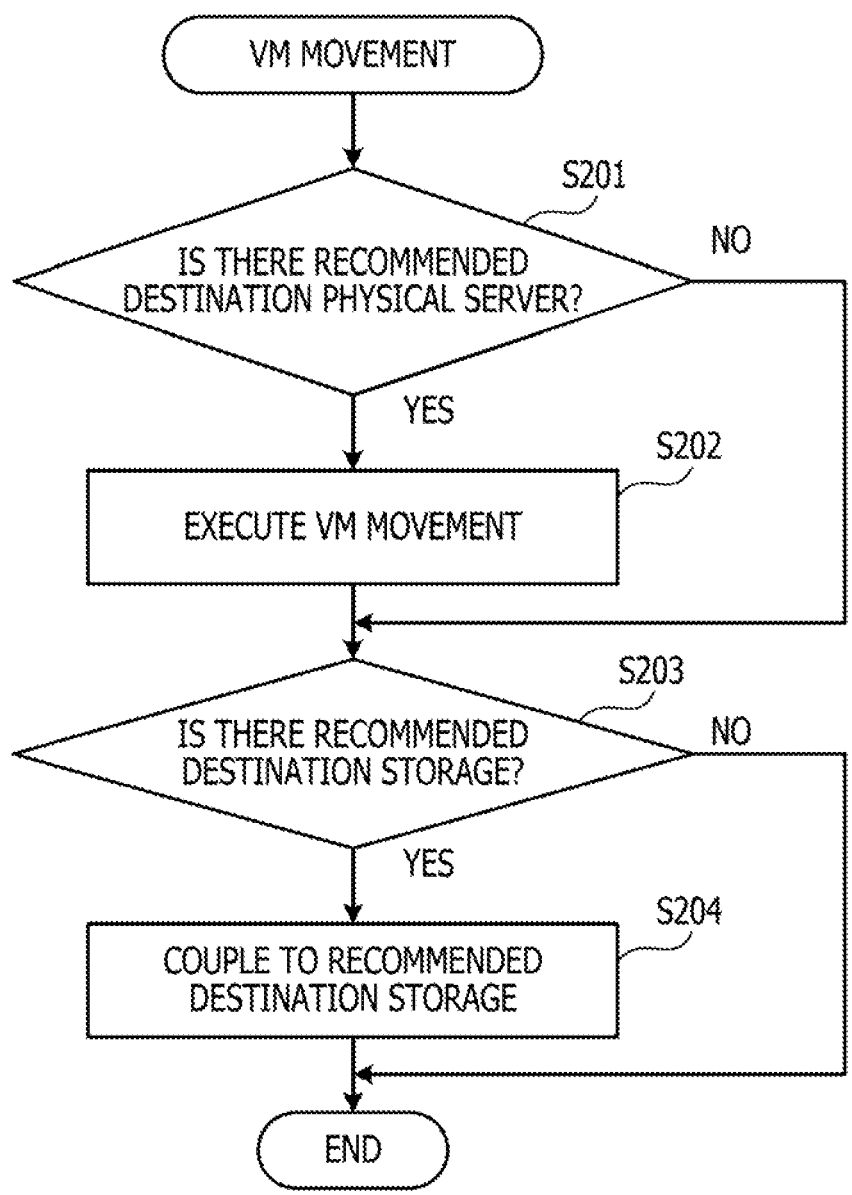
FIG. 40 is a flowchart illustrating an example of a procedure of VM moving processing.

FIG. 40 is a flowchart illustrating an example of a procedure of VM moving processing. The processing operations illustrated in FIG. 40 are described below in order of the step numbers.

[Step S201] The VM moving unit 160 determines whether or not there is a recommended destination physical server. For example, when there is a recommended destination physical server, the risk analysis control unit 170 transmits the device name of the recommended destination physical server to the VM moving unit 160. When acquiring the device name of the recommended destination physical server from the risk analysis control unit 170, the VM moving unit 160 determines that there is a recommended destination physical server. When there is a recommended destination physical server, the VM moving unit 160 advances the processing to step S202. When there is no recommended destination physical server, the VM moving unit 160 advances the processing to step S203.

[Step S202] The VM moving unit 160 moves the VM that is the analysis target device to the recommended destination physical server. For example, the VM moving unit 160 instructs the physical server having the analysis target device constructed therein to migrate the analysis target device to the recommended destination physical server.

[Step S203] The VM moving unit 160 determines whether or not there is a recommended destination storage. For example, when there is a recommended destination storage, the risk analysis control unit 170 transmits the device name of the recommended destination storage to the VM moving unit 160. When acquiring the device name of the recommended destination storage from the risk analysis control unit 170, the VM moving unit 160 determines that there is a recommended destination storage. When there is a recommended destination storage, the VM moving unit 160 advances the processing to step S204. When there is no recommended destination storage, the VM moving unit 160 terminates the VM moving processing.

[Step S204] The VM moving unit 160 couples the VM that is the analysis target device to the recommended destination storage. For example, the VM moving unit 160 performs coupling setting for the VM that is the analysis target device to be coupled to the recommended destination storage.

Thus, a VM with high influence risk may be moved to a position with low influence risk. As a result, when a failure occurs, it is possible to reduce the influence of the failure on the entire system.

The administrator may also input an instruction to the managing server 100 through the risk analysis screen displayed on the management terminal device 30, for example.

Figure 41:
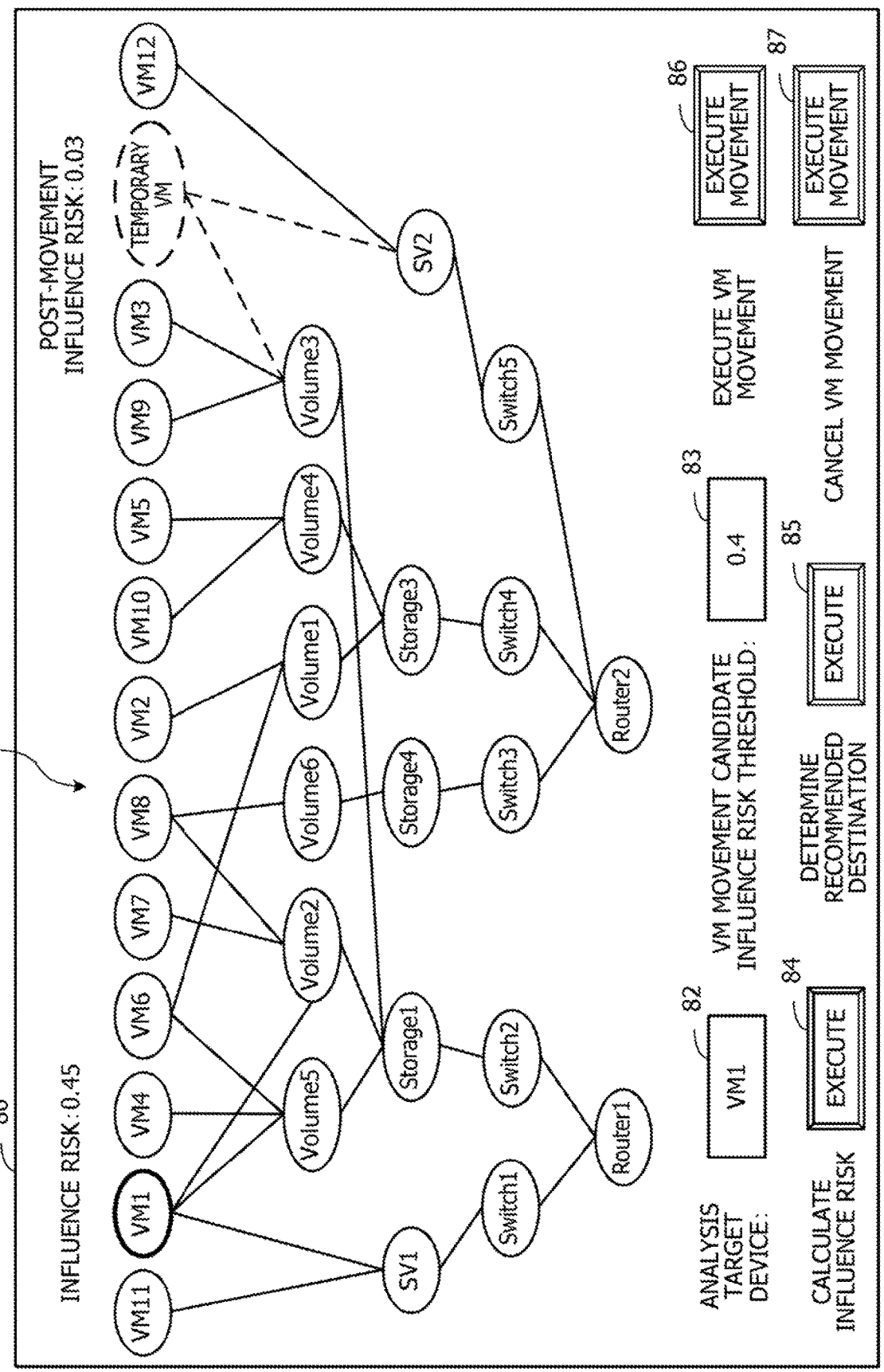
FIG. 41 illustrates an example of a risk analysis screen displayed on a management terminal device.

FIG. 41 illustrates an example of a risk analysis screen displayed on a management terminal device. A system configuration diagram 81 is displayed on a risk analysis screen 80. The system configuration diagram 81 depicts the devices included in the system to be managed and the coupling relationship between the devices. In the system configuration diagram 81, a VM having an influence risk not less than a predetermined value is highlighted, for example, and the influence risk of the VM is displayed around the VM. In the system configuration diagram 81, the temporary VM defined at the position to be the recommended destination is displayed, and the influence risk when the device is moved to the position of the temporary VM is displayed around the temporary VM.

On the risk analysis screen 80, text boxes 82 and 83 and buttons 84 to 87 are displayed. The text box 82 is a text box for inputting the device name of the analysis target device. The text box 83 is a text box for inputting a VM movement candidate influence risk threshold.

The button 84 is a button for inputting an instruction to calculate an influence risk. When the button 84 is pressed, the management terminal device 30 transmits to the managing server 100 an influence risk calculation request in which the device name set in the text box 82 is designated as the analysis target device.

The button 85 is a button for inputting an instruction to determine a recommended destination. When the button 85 is pressed, the management terminal device 30 transmits to the managing server 100 a recommended destination determination request including the VM destination candidate risk threshold set in the text box 83.

The button 86 is a button for inputting an instruction to move the VM. When the button 86 is pressed, the management terminal device 30 transmits to the managing server 100 a request to move the VM.

The button 87 is a button for canceling the movement of the VM. When the button 87 is pressed, the management terminal device 30 transmits to the managing server 100 a request to cancel VM movement. Upon receipt of the request to cancel the VM movement, the managing server 100 performs processing to return the moved VM to its original position. For example, the VM moving unit 160 of the managing server 100 instructs the physical server of the destination of the VM to migrate to the original physical server of the VM.

By referring to the risk analysis screen 80 as described above, the administrator may understand that there is a VM having an influence risk not less than a predetermined value, and that the influence risk may be reduced by moving the VM. The administrator may move the VM by performing an input operation on the risk analysis screen 80 of the management terminal device 30.

Third Embodiment

In a third embodiment, a managing server regularly monitors if there is a device having an influence risk exceeding a threshold, and automatically reduces the influence risk when such a device is found. This allows a system to autonomously maintain its low risk state without the involvement of an administrator.

Figure 42:
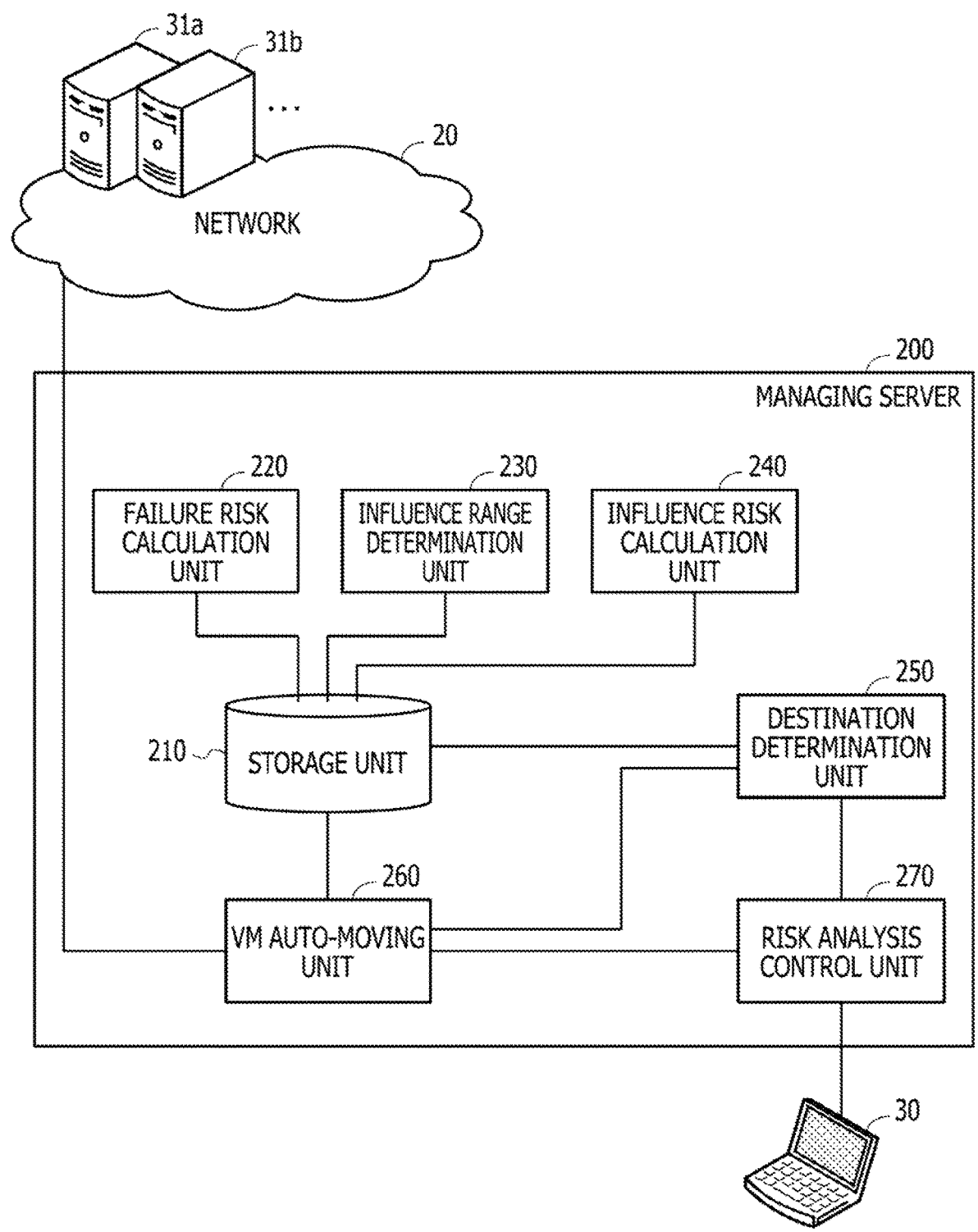
FIG. 42 is a block diagram illustrating functions of a managing server capable of automatically moving a VM.

FIG. 42 is a block diagram illustrating functions of a managing server capable of automatically moving a VM. A managing server 200 includes a storage unit 210, a failure risk calculation unit 220, an influence range determination unit 230, an influence risk calculation unit 240, a destination determination unit 250, a VM auto-moving unit 260, and a risk analysis control unit 270.

The storage unit 210 stores information used to calculate the influence risk of the devices in the system. For example, a part of the storage area of a memory or storage device in the managing server 200 is used as the storage unit 210. The information stored in the storage unit 210 is the same as the information stored in the storage unit 110 of the second embodiment illustrated in FIG. 11.

Upon receipt of an instruction to start execution of automatic VM movement from the risk analysis control unit 270, the failure risk calculation unit 220 regularly calculates a failure risk of each device in the system. The failure risk calculation unit 220 stores the calculated failure risk in the storage unit 210. The failure risk calculation unit 220 also monitors the system configuration via the network 20 and stores a system configuration model indicating the system configuration in the storage unit 210.

Once the failure risk of each device is calculated, the influence range determination unit 230 determines the influence range of each device in the system. The influence range determination unit 230 stores information on the determined influence range in the storage unit 210.

Once the influence range of each device is calculated, the influence risk calculation unit 240 calculates the influence risk when each device is set as the analysis target device. The influence risk calculation unit 240 stores the calculated influence risk in the storage unit 210.

When the influence risk of the analysis target device is not less than a predetermined threshold, the movement destination determination unit 250 determines a destination capable of reducing the influence risk of the device. The destination determination unit 250 transmits information indicating the determined destination to the risk analysis control unit 270.

When the destination having the influence risk not more than the predetermined threshold may be detected by the determination of the destination, the VM auto-moving unit 260 automatically moves the analysis target device. For example, the VM auto-moving unit 260 instructs the physical server in which the analysis target device to be moved is constructed to migrate to the physical server that is the destination of the analysis target device.

The risk analysis control unit 270 receives an input of information used for risk analysis and displays the analysis result. For example, the risk analysis control unit 270 receives inputs such as automatic execution of VM movement, a threshold of an influence risk of a VM to be automatically moved, and a threshold of an influence risk of a destination. The risk analysis control unit 270 causes the management terminal device 30 to display the VM movement result.

The lines coupling the respective elements illustrated in FIG. 42 represent some of communication routes, and communication routes other than the illustrated communication route may be set. The function of each of the elements illustrated in FIG. 42 may be realized, for example, by causing a computer to execute a program module corresponding to the element.

Figure 43:
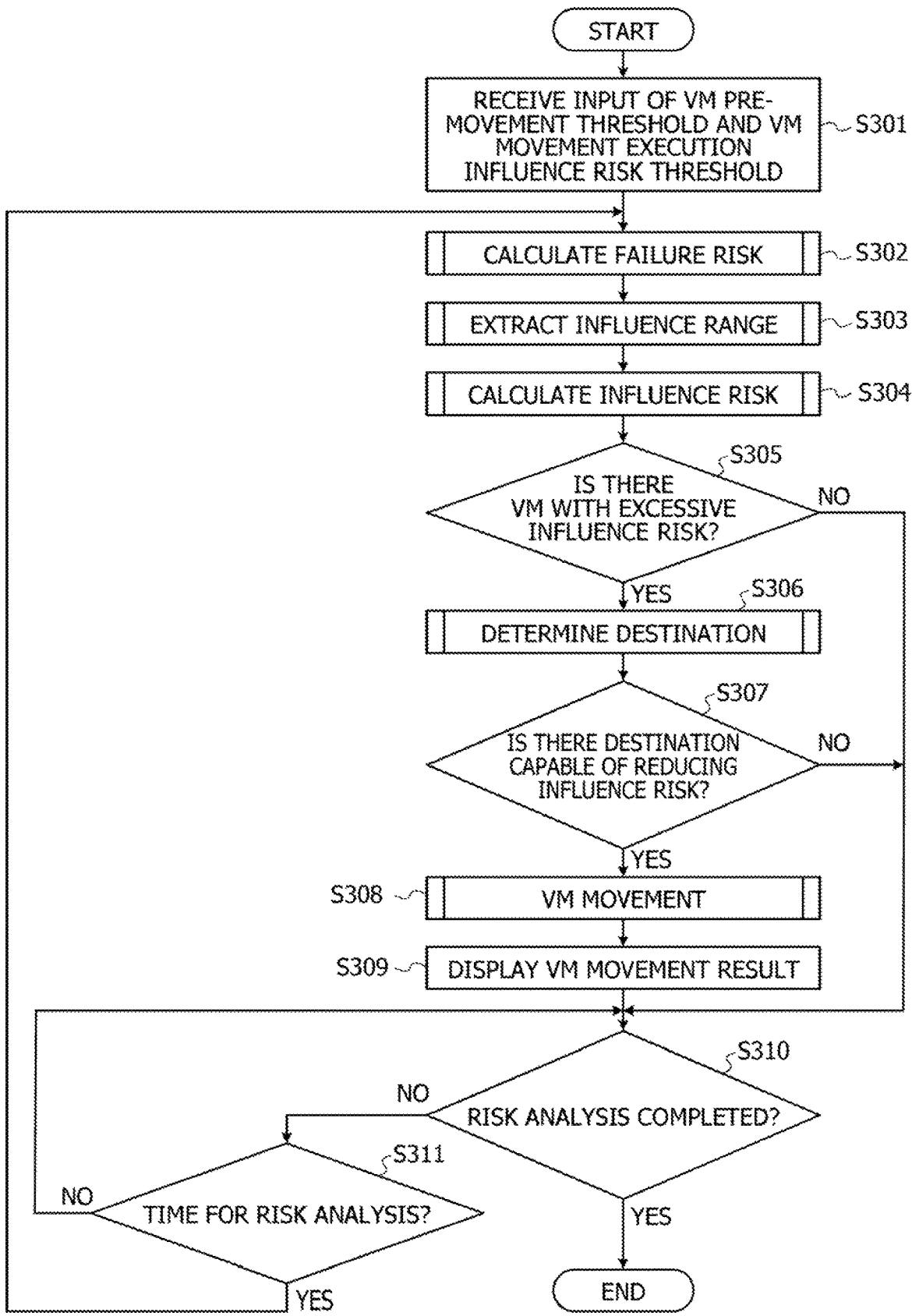
FIG. 43 is a flowchart illustrating an example of a procedure of risk analysis processing.

FIG. 43 is a flowchart illustrating an example of a procedure of risk analysis processing. The processing operations illustrated in FIG. 43 are described below in order of the step numbers.

[Step S301] The risk analysis control unit 270 receives inputs of a VM pre-movement influence risk threshold and a VM movement execution influence risk threshold. For example, the risk analysis control unit 270 transmits screen data of a risk analysis screen to the management terminal device 30. The management terminal device 30 displays the risk analysis screen based on the received screen data. The administrator refers to the displayed risk analysis screen to input the VM pre-movement influence risk threshold and the VM movement execution influence risk threshold to the management terminal device 30, and also inputs to instruct automatic execution of the VM. The management terminal device 30 transmits to the managing server 200 a VM auto-moving request including the VM pre-movement influence risk threshold and the VM movement execution influence risk threshold, in response to the input instructing the VM automatic execution. Upon receipt of the VM automatic movement request, the risk analysis control unit 270 instructs the failure risk calculation unit 220 to start automatic movement of the VM. The risk analysis control unit 270 also transmits the VM pre-movement influence risk threshold and the VM movement execution influence risk threshold to the destination determination unit 250. It is a condition for the risk analysis control unit 270 to accept an input that the VM movement execution influence risk threshold is set to a value lower than the VM pre-movement influence risk threshold.

[Step S302] The failure risk calculation unit 220 calculates the failure risk of each device. Upon completion of the failure risk calculation processing, the failure risk calculation unit 220 instructs the influence range determination unit 230 to determine the influence range. The details of the failure risk calculation processing in the third embodiment are the same as the failure risk calculation processing (see FIG. 19) in the second embodiment.

[Step S303] The influence range determination unit 230 determines the influence range when a failure occurs in each device according to the instruction from the failure risk calculation unit 220. Upon completion of the influence range determination processing, the influence range determination unit 230 instructs the influence risk calculation unit 240 to calculate the influence risk. The details of the influence range determination processing in the third embodiment are the same as the influence range determination processing (see FIG. 25) in the second embodiment.

[Step S304] The influence risk calculation unit 240 calculates the influence risk of the analysis target device according to the instruction from the influence range determination unit 230. Upon completion of the influence risk calculation processing, the influence risk calculation unit 240 transmits the calculation result of the influence risk to the risk analysis control unit 270. The details of the influence risk calculation processing in the third embodiment are the same as the influence risk calculation processing (see FIG. 29) in the second embodiment.

[Step S305] The destination determination unit 250 determines whether or not there is a VM with an excessive influence risk. For example, the destination determination unit 250 compares the VM pre-movement influence risk threshold acquired from the risk analysis control unit 270 with the influence risk threshold of each device. The destination determination unit 250 determines that there is a VM with an excessive influence risk if there is even at least one device having an influence risk exceeding the pre-movement influence risk threshold. The destination determination unit 250 advances the processing to step S306 when there is a VM with an excessive influence risk. The destination determination unit 250 advances the processing to step S310 when there is no VM with an excessive influence risk.

[Step S306] The destination determination unit 250 executes destination determination processing. The destination determination processing is described in detail later (see FIG. 44).

[Step S307] The destination determination unit 250 determines whether or not there is a destination capable of reducing an influence risk. For example, the destination determination unit 250 compares the VM movement execution influence risk threshold acquired from the risk analysis control unit 270 with the influence risk threshold of each device. The destination determination unit 250 determines that there is a destination capable of reducing the influence risk if there is even at least one device having an influence risk exceeding the pre-movement influence risk threshold. When there is a destination capable of reducing the influence risk, the destination determination unit 250 advances the processing to step S308. When there is no destination capable of reducing the Influence risk, the destination determination unit 250 advances the processing to step S310.

[Step S308] The VM auto-moving unit 260 performs VM moving processing. The VM moving processing is described in detail later (see FIG. 49).

[Step S309] When the VM movement is completed, the risk analysis control unit 270 causes the management terminal device 30 to display a screen representing the VM movement result.

[Step S310] The risk analysis control unit 270 determines whether or not an input is made to instruct the risk analysis processing to be terminated. When the input is made to instruct the risk analysis processing to be terminated, the risk analysis control unit 270 notifies the failure risk calculation unit 220 to terminate the processing, and terminates the risk analysis processing. When there is no input to terminate the risk analysis processing, the risk analysis control unit 270 advances the processing to step S311.

[Step S311] The failure risk calculation unit 220 determines whether or not it is time to perform a periodic risk analysis. When it is time to perform the risk analysis, the failure risk calculation unit 220 advances the processing to Step S302. When it is not yet time to perform the risk analysis, the failure risk calculation unit 220 advances the processing to Step S310.

Through such procedures, the VM having the excessive influence risk is automatically moved to a position where the influence risk is reduced.

Hereinafter, destination determination processing according to the third embodiment is described in detail.

Figure 44:
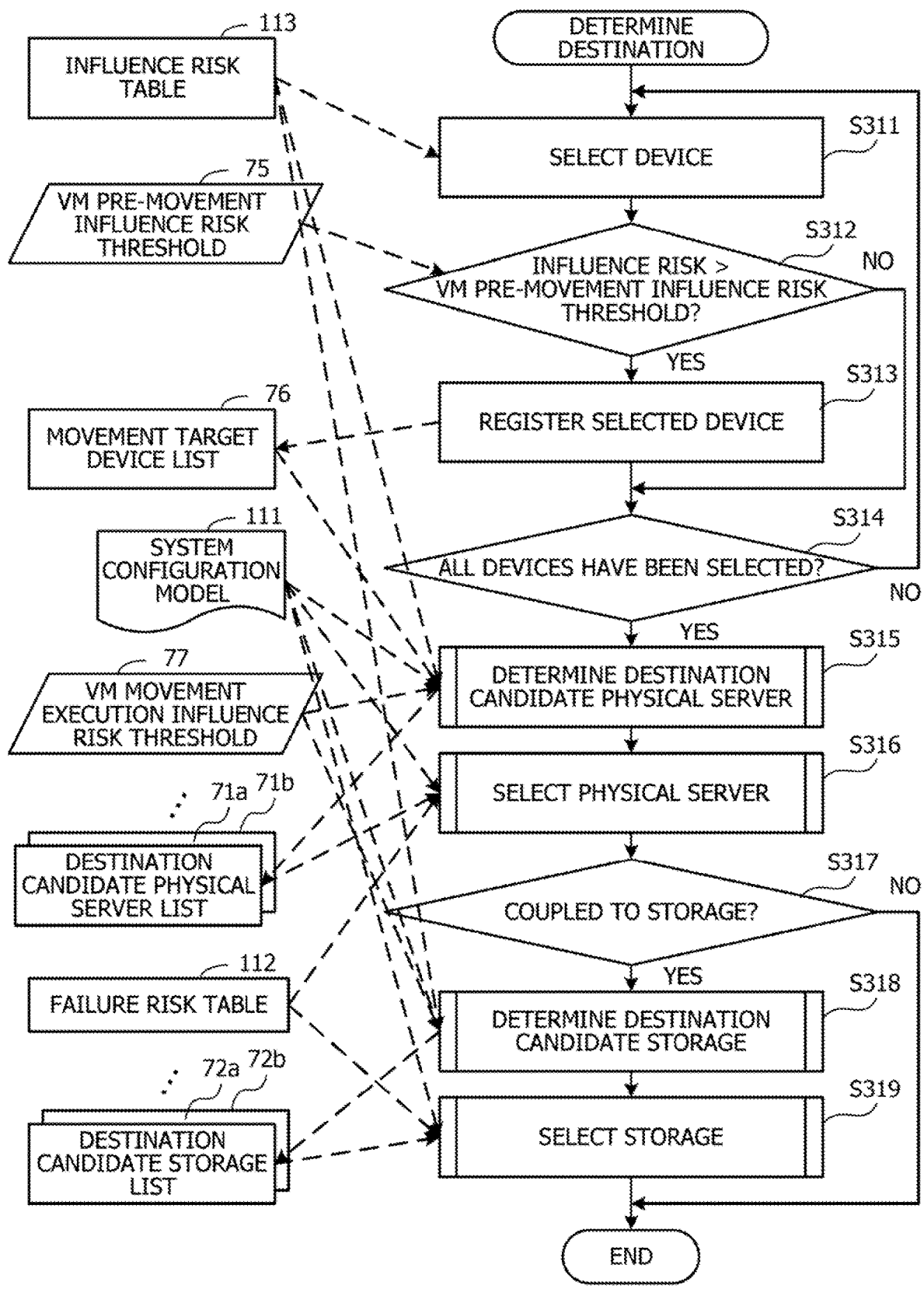
FIG. 44 is a flowchart illustrating an example of a procedure of destination determination processing.

FIG. 44 is a flowchart illustrating an example of a procedure of destination determination processing. The processing operations illustrated in FIG. 44 are described below in order of the step numbers.

[Step S311] The destination determination unit 250 refers to the influence risk table 113 and selects one device to be determined whether or not to move.

[Step S312] The destination determination unit 250 determines whether or not the influence risk of the selected device exceeds the VM pre-movement influence risk threshold 75. When the influence risk exceeds the VM pre-movement influence risk threshold 75, the destination determination unit 250 advances the processing to step S313. When the influence risk does not exceed the VM pre-movement influence risk threshold 75, the destination determination unit 250 advances the processing to step S314.

[Step S313] The destination determination unit 250 registers the selected device in the movement target device list 76.

[Step S314] The destination determination unit 250 determines whether or not all the devices registered in the influence risk table 113 have been selected. When all the devices have been selected, the movement destination determination unit 250 advances the processing to step S315. When there is any device yet to be selected, the destination determination unit 250 advances the processing to step S311.

[Step S315] The destination determination unit 250 determines a destination candidate physical server that may be set as a destination of the analysis target device to be moved, based on the movement target device list 76, the system configuration model 111, the influence risk table 113, and the VM movement execution influence risk threshold 77. For each analysis target device to be moved, the destination determination unit 250 sets the device name of the determined physical server in the destination candidate physical server list 71a, 71b, . . . . The destination candidate physical server determination processing is described in detail later (see FIG. 45).

[Step S316] The destination determination unit 250 selects a physical server as a recommended destination based on the destination candidate physical server lists 71a, 71b, . . . , the system configuration model 111, and the failure risk table 112. The physical server selection processing is described in detail later (see FIG. 46).

[Step S317] The destination determination unit 250 determines whether or not the analysis target device to be moved is coupled to the storage. When the analysis target device to be moved is coupled to the storage, the destination determination unit 250 advances the processing to step S318. When the analysis target device to be moved is not coupled to the storage, the destination determination unit 250 terminates the destination determination processing.

[Step S318] The destination determination unit 250 determines a destination candidate storage that may be set as a destination of the analysis target device to be moved, based on the system configuration model 111, the influence risk table 113, and the VM movement execution influence risk threshold 77. For each analysis target device to be moved, the destination determination unit 250 sets the determined device name of the storage in the destination candidate storage lists 72a, 72b, . . . . The destination candidate storage determination processing is described in detail later (see FIG. 47).

[Step S319] The destination determination unit 250 selects a recommended destination storage based on the destination candidate storage lists 72a, 72b, . . . , the system configuration model 111, and the failure risk table 112. The storage selection processing is described in detail later (see FIG. 48).

Next, destination candidate physical server determination processing is described in detail.

Figure 45:
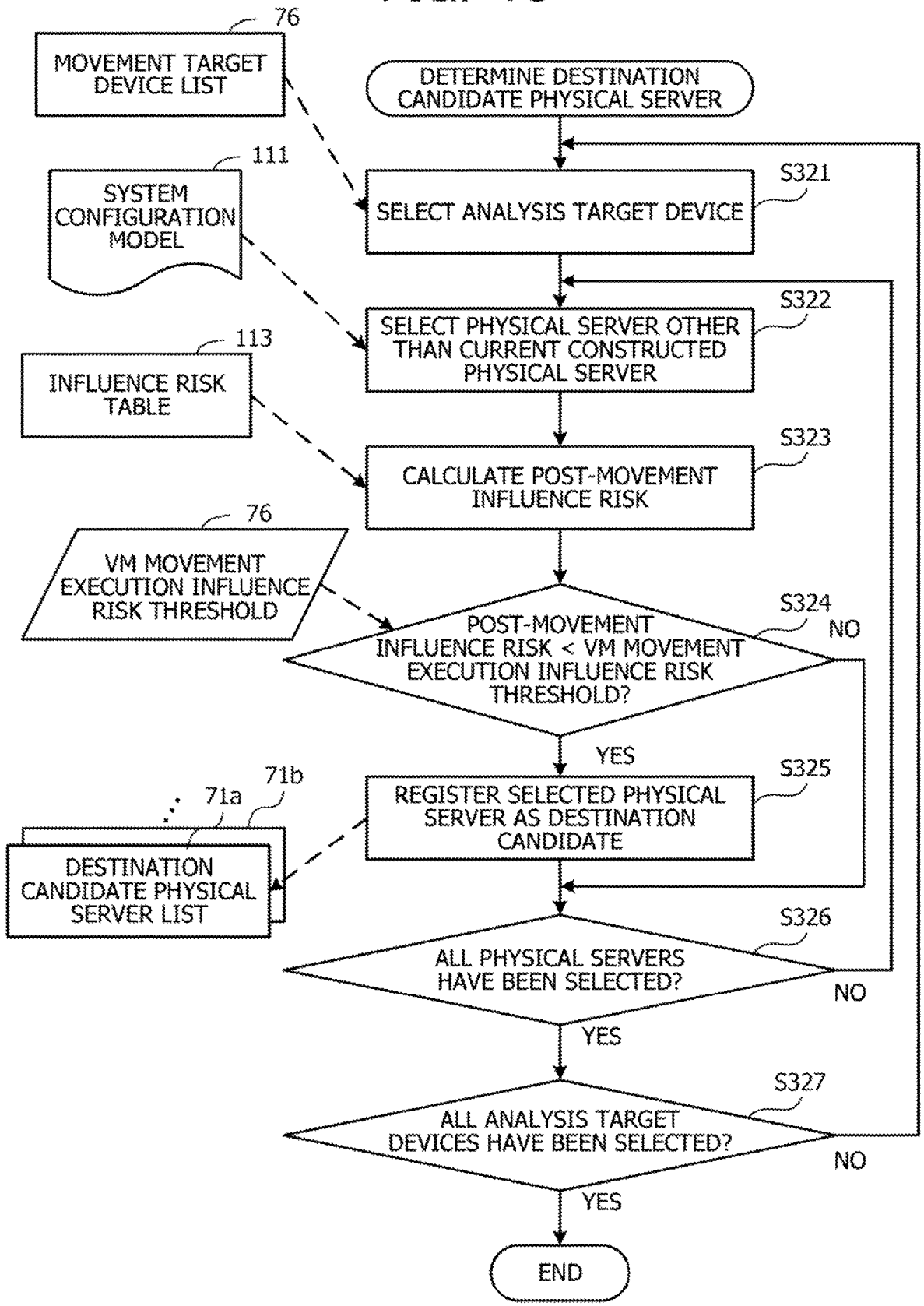
FIG. 45 is a flowchart illustrating an example of a procedure of destination candidate physical server determination processing.

FIG. 45 is a flowchart illustrating an example of a procedure of destination candidate physical server determination processing. In the processing illustrated in FIG. 45, steps S322 to S326 are identical to steps S161 to S165 in the second embodiment illustrated in FIG. 32. The processing of steps S321 and S327 in FIG. 45 different from the second embodiment is described below.

[Step S321] The destination determination unit 250 selects one analysis target device yet to be selected from among the analysis target devices to be moved in the movement target device list 76. Thereafter, the destination determination unit 250 creates a destination candidate physical server list for the selected analysis target device through the processing of steps S322 to S326.

[Step S327] The destination determination unit 250 determines whether or not all the analysis target devices listed in the movement target device list 76 have been selected. When all the analysis target devices to be moved have been selected, the destination determination unit 250 terminates the destination candidate physical server determination processing. When there is any analysis target device yet to be selected, the destination determination unit 250 advances the processing to step S321.

Thus, destination candidate physical server lists 71*a*, 71*b*, . . . corresponding to the analysis target devices to be moved, respectively, are generated. For each of the analysis target devices to be moved, the destination determination unit 250 selects a physical server recommended as a destination from among the destination candidate physical server lists 71*a*, 71*b*, . . . .

Figure 46:
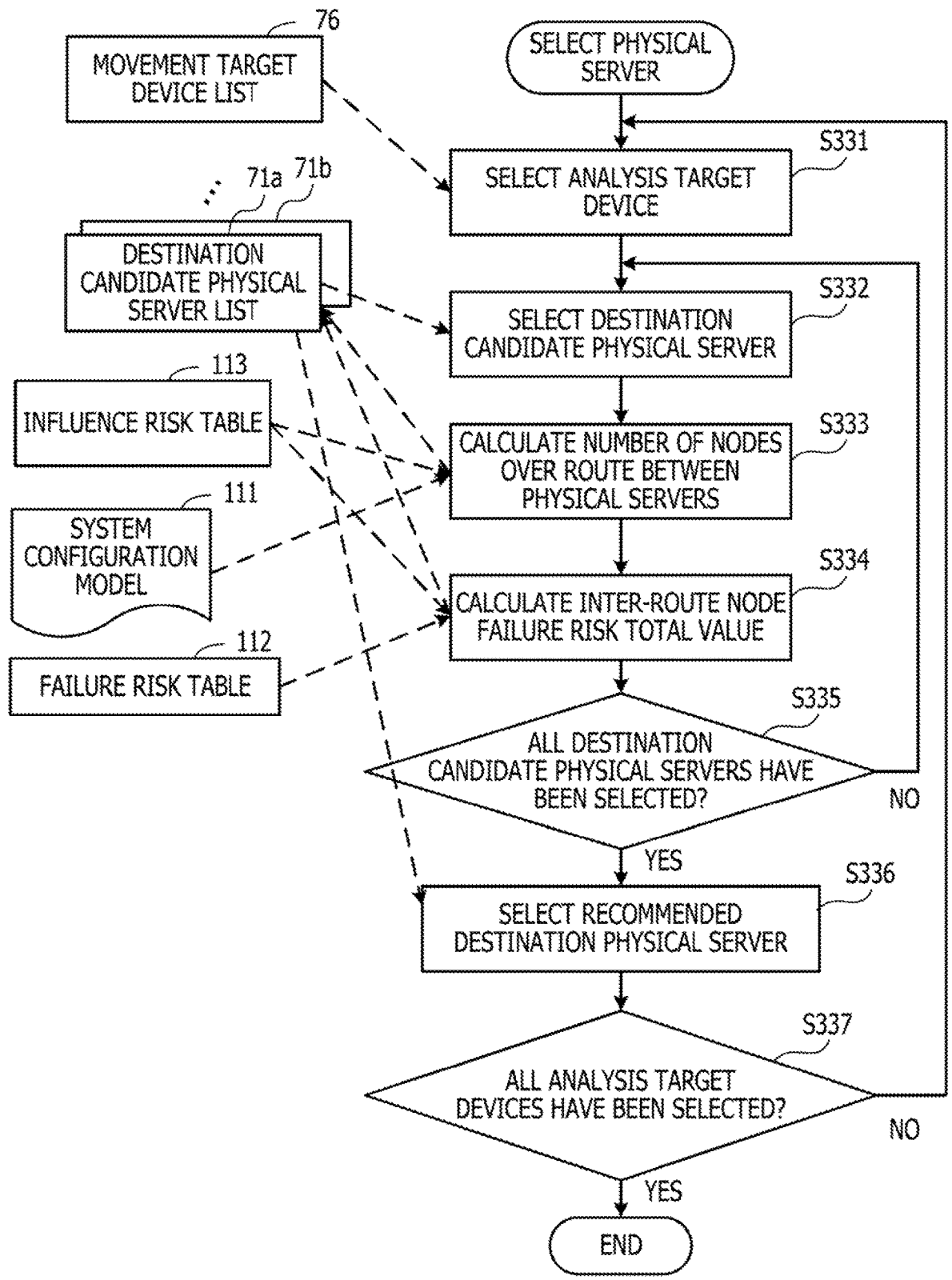
FIG. 46 is a flowchart illustrating an example of a procedure of physical server selection processing.

FIG. 46 is a flowchart illustrating an example of a procedure of physical server selection processing. In the processing illustrated in FIG. 46, steps S332 to S336 are identical to steps S171 to S175 in the second embodiment illustrated in FIG. 34. The processing of steps S331 and S337 in FIG. 46 different from the second embodiment is described below.

[Step S331] The destination determination unit 250 selects one analysis target device yet to be selected, from among the analysis target devices to be moved in the movement target device list 76. Thereafter, the destination determination unit 250 selects a recommended destination physical server of the selected analysis target device through the processing of steps S332 to S336.

[Step S337] The destination determination unit 250 determines whether or not all the analysis target devices listed in the movement target device list 76 have been selected. When all the analysis target devices to be moved have been selected, the destination determination unit 250 terminates the destination candidate physical server determination processing. When there is any analysis target device yet to be selected, the destination determination unit 250 advances the processing to step S331.

Next, destination candidate storage determination processing is described in detail.

Figure 47:
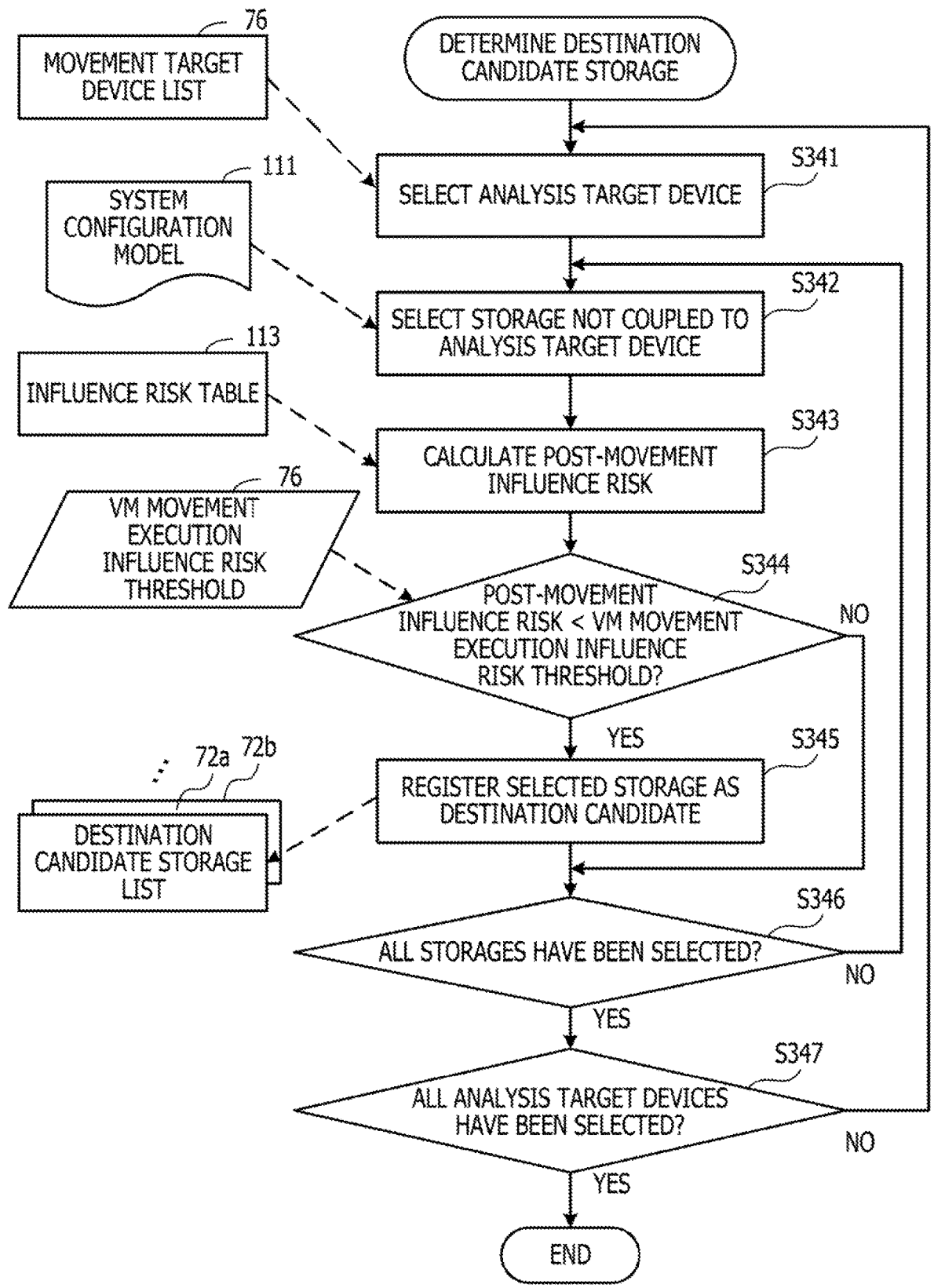
FIG. 47 is a flowchart illustrating an example of a procedure of destination candidate storage determination processing.

FIG. 47 is a flowchart illustrating an example of a procedure of destination candidate storage determination processing. In the processing illustrated in FIG. 47, steps S342 to S346 are identical to steps S181 to S185 in the second embodiment illustrated in FIG. 36. The processing of steps S341 and S347 in FIG. 47 different from the second embodiment is described below.

[Step S341] The destination determination unit 250 selects one analysis target device yet to be selected, from among the analysis target devices to be moved in the movement target device list 76. Thereafter, the destination determination unit 250 creates a destination candidate storage list for the selected analysis target device through the processing of steps S342 to S346.

[Step S347] The destination determination unit 250 determines whether or not all the analysis target devices listed in the movement target device list 76 have been selected. When all the analysis target devices to be moved have been selected, the destination determination unit 250 terminates the destination candidate storage determination processing.

When there is any analysis target device yet to be selected, the destination determination unit 250 advances the processing to step S341.

Thus, destination candidate storage lists 72*a*, 72*b*, . . . corresponding to the analysis target devices to be moved, respectively, are generated. For each of the analysis target devices to be moved, the destination determination unit 250 selects a storage recommended as a destination from among the destination candidate storage lists 72*a*, 72*b*, . . . .

Figure 48:
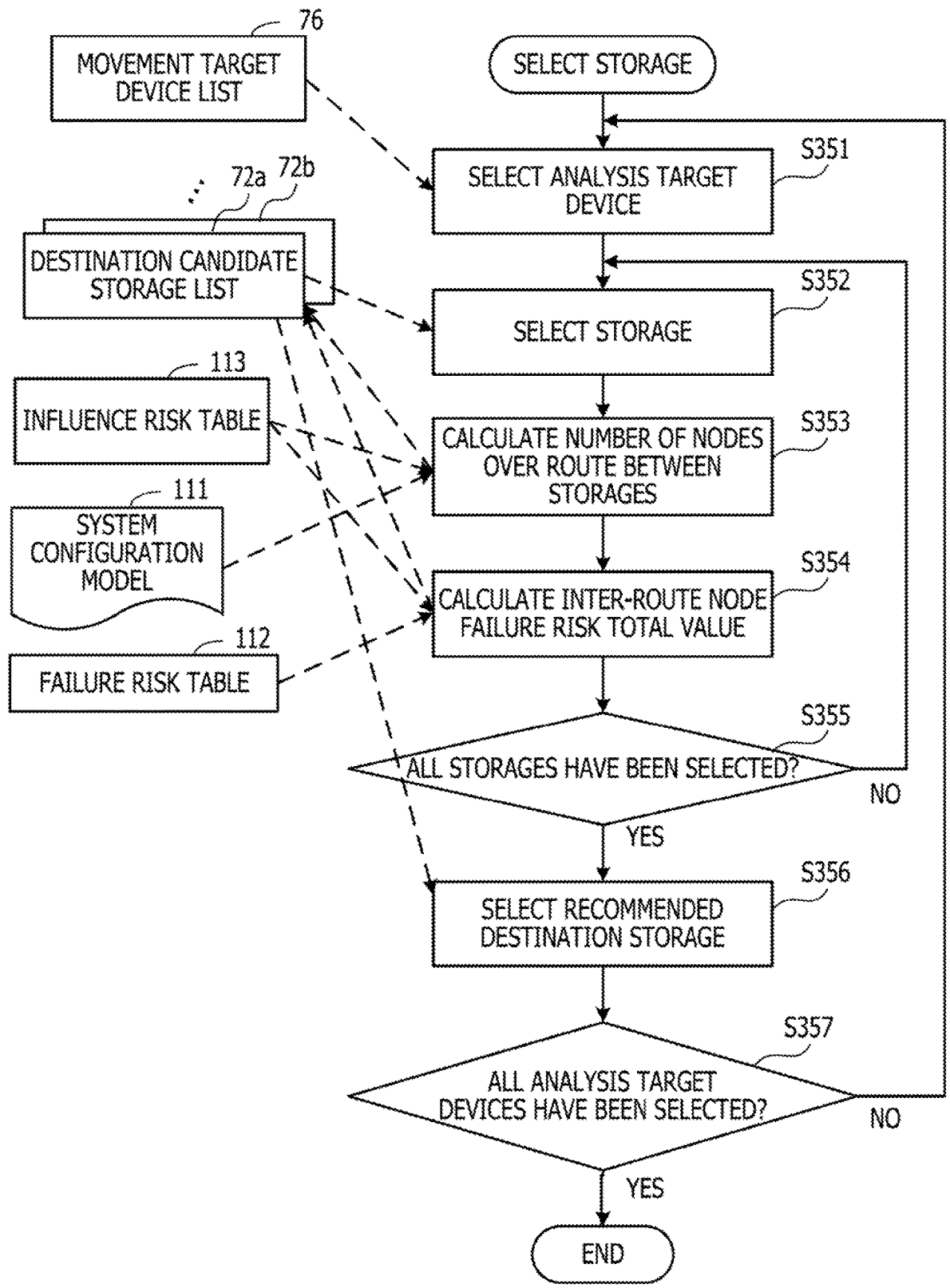
FIG. 48 is a flowchart illustrating an example of a procedure of storage selection processing.

FIG. 48 is a flowchart illustrating an example of a procedure of storage selection processing. In the processing illustrated in FIG. 48, steps S352 to S356 are identical to steps S191 to S195 in the second embodiment illustrated in FIG. 38. The processing of steps S351 and S357 in FIG. 48 different from the second embodiment is described below.

[Step S351] The destination determination unit 250 selects one analysis target device yet to be selected, from among the analysis target devices to be moved in the movement target device list 76. Thereafter, the destination determination unit 250 selects a recommended destination storage of the selected analysis target device through the processing of steps S352 to S356.

[Step S357] The destination determination unit 250 determines whether or not all the analysis target devices listed in the movement target device list 76 have been selected. When all the analysis target devices to be moved have been selected, the destination determination unit 250 terminates the storage selection processing. When there is any analysis target device yet to be selected, the destination determination unit 250 advances the processing to step S351.

Thus, the recommended destination physical server and the recommended destination storage are determined for each analysis target device to be moved. The destination determination unit 250 transmits the recommended destination physical server and the recommended destination storage for each analysis target device to be moved to the VM auto-moving unit 260. The VM auto-moving unit 260 executes the VM moving processing.

Figure 49:
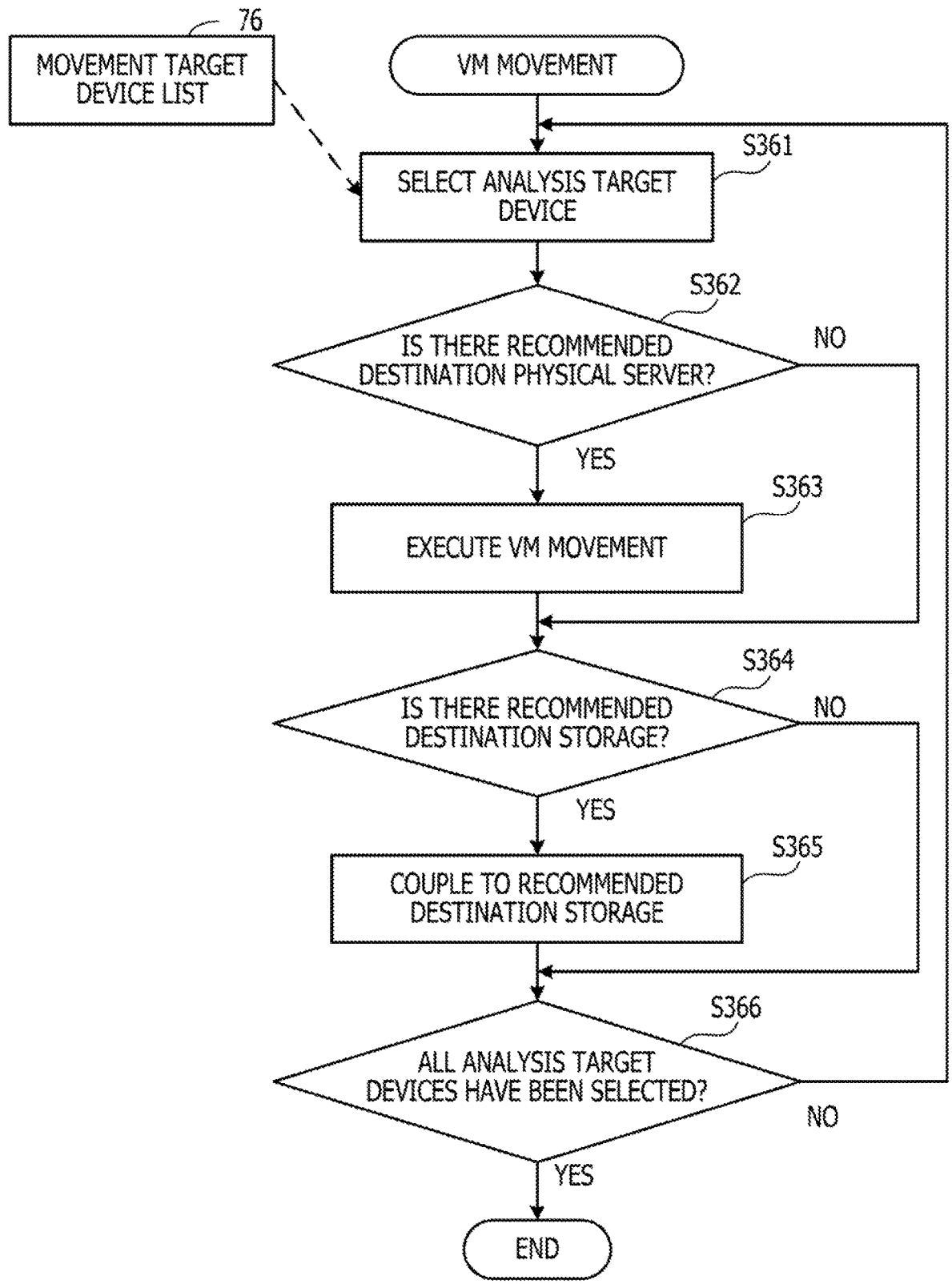
FIG. 49 is a flowchart illustrating an example of a procedure of VM moving processing.

FIG. 49 is a flowchart illustrating an example of a procedure of VM moving processing. In the processing illustrated in FIG. 49, steps S362 to S365 are identical to steps S201 to S204 in the second embodiment illustrated in FIG. 40. The processing of steps S361 and S366 in FIG. 49 different from the second embodiment is described below.

[Step S361] The destination determination unit 250 selects one analysis target device yet to be selected, from among the analysis target devices to be moved in the movement target device list 76. Thereafter, the destination determination unit 250 executes the processing of steps S362 to S365 to move the VM that is the selected analysis target device to the recommended destination physical server and to couple the VM to the recommended destination storage.

[Step S366] The destination determination unit 250 determines whether or not all the analysis target devices listed in the movement target device list 76 have been selected. When all the analysis target devices to be moved have been selected, the destination determination unit 250 terminates the VM moving processing. When there is any analysis target device yet to be selected, the destination determination unit 250 advances the processing to step S361.

Thus, the managing server 200 may regularly perform risk analysis and automatically move a VM having an excessive influence risk to a position where the influence risk is reduced. The VM movement result is displayed on the risk analysis screen of the management terminal device 30 by the risk analysis control unit 270.

Figure 50:
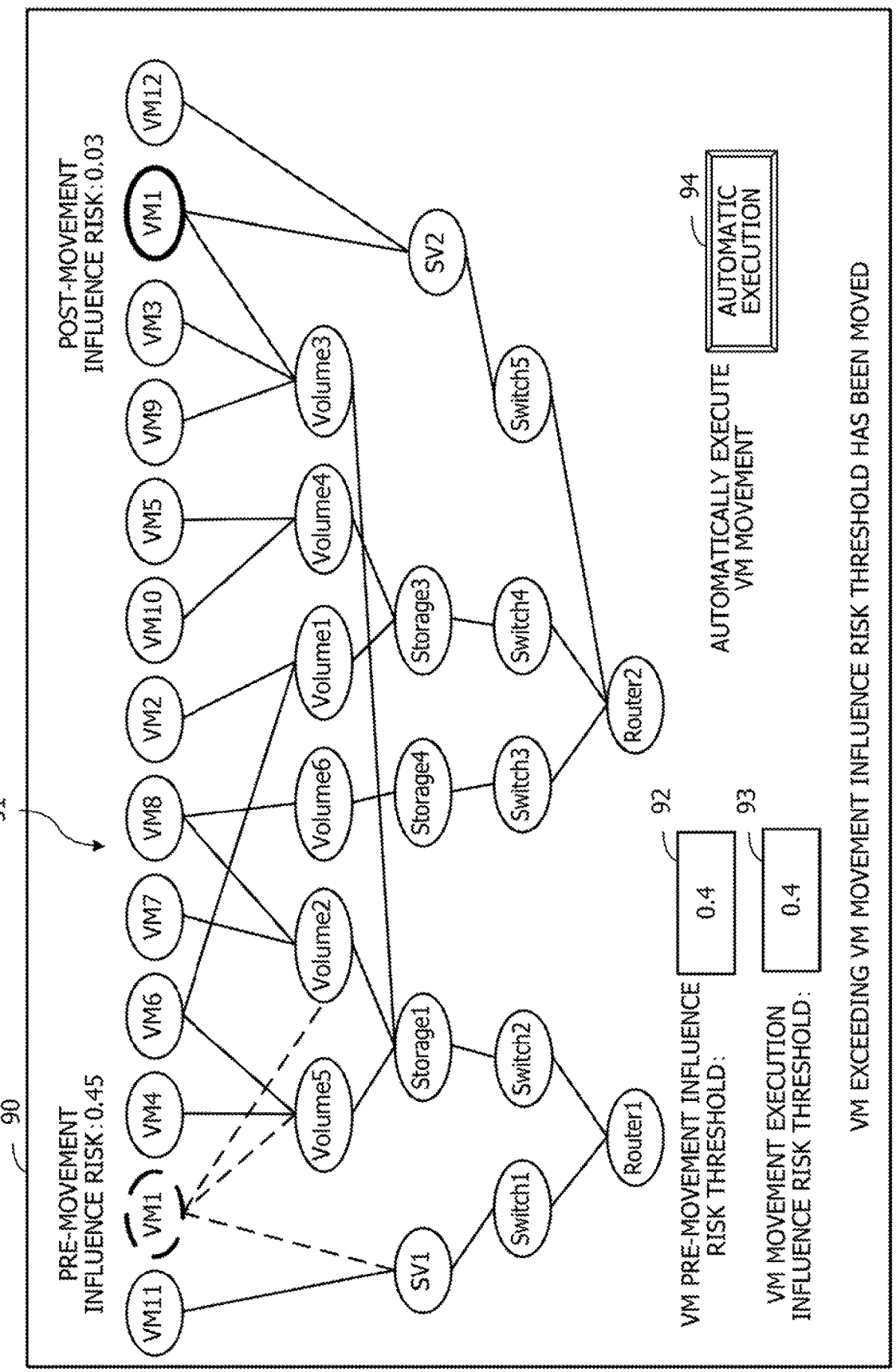
FIG. 50 illustrates an example of a risk analysis screen in the case of automatically moving a VM.

FIG. 50 illustrates an example of a risk analysis screen in the case of automatically moving a VM. A system configuration diagram 91 is displayed on a risk analysis screen 90. The system configuration diagram 91 depicts the devices included in the system to be managed and the coupling relationship between the devices. In the system configuration diagram 91, the ore-movement position of the automatically moved VM is highlighted, for example, and the pre-movement influence risk of the VM is displayed around that position. In the system configuration diagram 91, the moved VM is displayed at the post-movement position of the moved VM, and the post-movement influence risk is displayed around the VM.

On the risk analysis screen 90, text boxes 92 and 93 and a button 94 are displayed. The text box 92 is a text box for inputting a VM pre-movement influence risk threshold. The text box 93 is a text box for inputting a VM movement execution influence risk threshold. The VM movement execution influence risk threshold may be set only to a value lower than the VM pre-movement influence risk threshold.

The button 94 is a button for instructing to start the processing of automatically moving the VM. When the button 94 is pressed, the management terminal device 30 transmits a request to automatically move the VM, including the values set in the text boxes 92 and 93, to the managing server 200.

The administrator may grasp the execution status of the influence risk reduction processing by referring to the risk analysis screen 90 as described above.

OTHER EMBODIMENTS

While the example of moving the VM having the excessive influence risk has been described in the second and third embodiments, a volume having an excessive influence risk may be moved through the same processing.

In the second and third embodiments, when the influence risk of the device already constructed in the system is excessive, the destination of the device is determined, but the managing servers 100 and 200 are newly added to the system. With respect to the device added to, the appropriate construction place may be determined through the same processing. The managing servers 200 and 300 may construct a new device at a position (physical server or storage) having the lowest influence risk. For example, the managing server 100 executes a destination determination processing (see FIG. 31) in response to a request to add a device. The managing server constructs a new device (for example, VM) in the recommended destination physical server acquired through the destination determination processing, and couples the constructed device to the recommended destination storage acquired through the destination determination processing.

Although the embodiments are exemplified, the configuration of each of the sections described in the embodiments may be replaced with another configuration having the same functions as those described in the embodiments. Another arbitrary constituent section and another arbitrary process may be added. Arbitrary two or more configurations (characteristics) among the configurations described in the embodiments may be combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A system management method implemented by a computer, the method comprising:
    acquiring, based on operation status information, a failure risk for each of a plurality of devices coupled to a network, the plurality of devices including a plurality of physical devices and a plurality of virtual machines, each of the plurality of virtual machines being operated on any of the plurality of physical devices, the operation status information indicating the operation statuses of the plurality of devices, the failure risk indicating a possibility of failure;
    acquiring an influence range for each of the plurality of devices by using search route information associated with the each of the plurality of devices, the search route information indicating a link in a range to be affected by the failure, the influence range corresponding to a range based on the link indicated by search route information;
    acquiring a first influence risk based on the failure risk acquired for a first device among the plurality of devices, the first device being a device that is any one of the plurality of devices and that is associated with an analysis target device in the influence range acquired for the first device, the analysis target device being a virtual device operated on a first physical device, the first influence risk indicating a possibility of the analysis target device being affected by a failure in another device, the first physical device being any of the plurality of physical devices;
    acquiring, based on an assumption that the analysis target device is moved from the first physical device to a second physical device, a second influence risk for the second physical device among the plurality of devices by using the failure risk acquired for a second device, the second physical device being a device other than the first physical device among the plurality of physical devices, the second device being a device that is any one of the plurality of devices other than the first device and that is associated with the analysis target device in the influence range acquired for the second device based on the assumption that the analysis target device is moved from the first physical device to the second physical device, the second influence risk indicating a possibility of the analysis target device being affected by a failure in another device after being moved; and
    in response to the acquired second influence risk being lower than the acquired first influence risk, determining the second physical devices as a destination candidate of the analysis target.

2. The system management method according to claim 1, wherein the determining is configured to determine, as the destination of the analysis target device, one of the second physical devices having the second influence risk not more than a threshold set to a value lower than the first influence risk.

3. The system management method according to claim 1, wherein the determining is configured to determine the second physical device that is the destination of the analysis target device based on the number of a plurality of third physical devices, each of the plurality of third physical devices being another physical device in a communication route between the first physical device and the second physical device having the second influence risk lower than the first influence risk.

4. The system management method according to claim 1, the determining being configured to determine the second physical device that is the destination of the analysis target device based on the failure risk of a third physical device, the third physical device being another physical device in a communication route between the first physical device and the second physical device having the second influence risk lower than the first influence risk.

5. The system management method according to claim 1, the acquiring of the first influence risk being configured to calculate the first influence risk of each of the plurality of virtual machines as the analysis target device, the determining being configured to determine a destination of the analysis target device having the first influence risk exceeding a pre-movement influence risk threshold.

6. The system management method according to claim 1, the acquiring of the first influence risk being configured to, when the plurality of devices includes a plurality of first devices, calculate sum of a plurality of failure risks, each of the plurality of failure risks being the failure risk acquired for any of the plurality of first devices, each of the plurality of first devices being a device that is any one of the plurality of devices and that includes the analysis target device within the influence range acquired for the each of the plurality of first device.

7. A non-transitory computer-readable storage medium for storing a system management program which causes a processor to perform processing, the processing comprising: acquiring, based on operation status information, a failure risk for each of a plurality of devices coupled to a network, the plurality of devices including a plurality of physical devices and a plurality of virtual machines, each of the plurality of virtual machines being operated on any of the plurality of physical devices, the operation status information indicating the operation statuses of the plurality of devices, the failure risk indicating a possibility of failure; acquiring an influence range for each of the plurality of devices by using search route information associated with the each of the plurality of devices, the search route information indicating a link in a range to be affected by the failure, the influence range corresponding to a range based on the link indicated by search route information; acquiring a first influence risk based on the failure risk acquired for a first device among the plurality of devices, the first device being a device that is any one of the plurality of devices and that is associated with an analysis target device in the influence range acquired for the first device, the analysis target device being a virtual device operated on a first physical device, the first influence risk indicating a possibility of the analysis target device being affected by a failure in another device, the first physical device being any of the plurality of physical devices; acquiring, based on an assumption that the analysis target device is moved from the first physical device to a second physical device, a second influence risk for the second physical device among the plurality of devices by using the failure risk acquired for a second device, the second physical device being a device other than the first physical device among the plurality of physical devices, the second device being a device that is any one of the plurality of devices other than the first device and that is associated with the analysis target device in the influence range acquired for the second device based on the assumption that the analysis target device is moved from the first physical device to the second physical device, the second influence risk indicating a possibility of the analysis target device being affected by a failure in another device after being moved; and in response to the acquired second influence risk being lower than the acquired first influence risk, determining the second physical devices as a destination candidate of the analysis target device.

8. A system management device comprising: a memory; and a processor coupled to the memory, the processor being configured to execute a process comprising: acquiring, based on operation status information, a failure risk for each of a plurality of devices coupled to a network, the plurality of devices including a plurality of physical devices and a plurality of virtual machines, each of the plurality of virtual machines being operated on any of the plurality of physical devices, the operation status information indicating the operation statuses of the plurality of devices, the failure risk indicating a possibility of failure; acquiring an influence range for each of the plurality of devices by using search route information associated with the each of the plurality of devices, the search route information indicating a link in a range to be affected by the failure, the influence range corresponding to a range based on the link indicated by search route information; acquiring a first influence risk based on the failure risk acquired for a first device among the plurality of devices, the first device being a device that is any one of the plurality of devices and that is associated with an analysis target device in the influence range acquired for the first device, the analysis target device being a virtual device operated on a first physical device, the first influence risk indicating a possibility of the analysis target device being affected by a failure in another device, the first physical device being any of the plurality of physical devices; acquiring, based on an assumption that the analysis target device is moved from the first physical device to a second physical device, a second influence risk for the second physical device among the plurality of devices by using the failure risk acquired for a second device, the second physical device being a device other than the first physical device among the plurality of physical devices, the second device being a device that is any one of the plurality of devices other than the first device and that is associated with the analysis target device in the influence range acquired for the second device based on the assumption that the analysis target device is moved from the first physical device to the second physical device, the second influence risk indicating a possibility of the analysis target device being affected by a failure in another device after being moved; and in response to the acquired second influence risk being lower than the acquired first influence risk, determining the second physical devices as a destination candidate of the analysis target device.

* * * * *